(12) United States Patent
Ko et al.

(10) Patent No.: US 12,189,880 B2
(45) Date of Patent: Jan. 7, 2025

(54) DISPLAY DEVICE INCLUDING AN INPUT SENSOR AND ELECTRONIC APPARATUS INCLUDING THE SAME

(71) Applicant: SAMSUNG DISPLAY CO., LTD., Yongin-si (KR)

(72) Inventors: Gwang-Bum Ko, Yongin-si (KR); Kyowon Ku, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/474,197

(22) Filed: Sep. 25, 2023

(65) Prior Publication Data
US 2024/0192791 A1 Jun. 13, 2024

(30) Foreign Application Priority Data
Dec. 13, 2022 (KR) .................. 10-2022-0173857

(51) Int. Cl.
*G06F 3/041* (2006.01)
*G06F 1/16* (2006.01)
*G06F 3/046* (2006.01)

(52) U.S. Cl.
CPC .......... *G06F 3/0412* (2013.01); *G06F 1/1652* (2013.01); *G06F 3/04164* (2019.05); *G06F 3/046* (2013.01); *G06F 2203/04107* (2013.01)

(58) Field of Classification Search
CPC .. G06F 3/0412; G06F 1/1652; G06F 3/04164; G06F 3/046; G06F 2203/04107
See application file for complete search history.

(56) References Cited

U.S. PATENT DOCUMENTS

| 5,134,689 A | 7/1992 | Murakami et al. |
| 10,761,671 B2 | 9/2020 | Lee et al. |
| 2003/0062889 A1* | 4/2003 | Ely .......................... G06F 3/046 324/207.17 |
| 2008/0158848 A1* | 7/2008 | Free ........................ G06F 3/046 361/818 |
| 2009/0207150 A1* | 8/2009 | Obi .......................... G06F 3/046 345/174 |
| 2012/0306824 A1* | 12/2012 | Horie ....................... G06F 3/046 345/179 |

(Continued)

FOREIGN PATENT DOCUMENTS

| KR | 10-157253081 | 11/2015 |
| KR | 10-2027246 B1 | 10/2019 |

(Continued)

*Primary Examiner* — Hong Zhou
(74) *Attorney, Agent, or Firm* — F. CHAU & ASSOCIATES, LLC

(57) ABSTRACT

A display device includes a display panel that includes a display region on which a pixel is disposed and a non-display region around the display region. An input sensor is disposed on the display panel and is configured to detect an electromagnetically induced current. A conductive layer is disposed below the display panel and overlaps the display region. The conductive layer includes a first unit pattern. The first unit pattern includes a first extension part, and a plurality of second extension parts that extend from the first extension part in a direction intersecting a direction of the first extension part and are disposed on one side of the first extension part.

28 Claims, 31 Drawing Sheets

(56) References Cited

U.S. PATENT DOCUMENTS

| | | | |
|---|---|---|---|
| 2014/0002313 A1* | 1/2014 | Yang ....................... | H04W 4/80 |
| | | | 343/702 |
| 2016/0139701 A1* | 5/2016 | Wang ...................... | G06F 3/046 |
| | | | 345/174 |
| 2021/0072864 A1* | 3/2021 | Park ....................... | G06F 3/0412 |
| 2021/0125922 A1* | 4/2021 | Lee ........................ | H01F 27/24 |
| 2022/0011868 A1* | 1/2022 | Junus ..................... | G06F 3/045 |

FOREIGN PATENT DOCUMENTS

| KR | 10-2022-0110053 A | 8/2022 |
|---|---|---|
| KR | 10-2022-0118534 A | 8/2022 |

* cited by examiner

FIG. 23

| | #1 | #2 | #3 | #4 |
|---|---|---|---|---|
| F1 | 50% | | 100% | 0% |
| F2 | 8 | 8 | – | – |
| Stack Structure | DM / FRL / FRL / UP1(CPL) UP2(SPL) | DM / FRL / Film / UP1(CPL) UP2(SPL) | DM / FRL / CTL | DM / FRL |
| Magnetic Flux | | | | |

DISPLAY DEVICE INCLUDING AN INPUT SENSOR AND ELECTRONIC APPARATUS INCLUDING THE SAME

CROSS-REFERENCE TO RELATED APPLICATION

This U.S. nonprovisional application claims priority under 35 U.S.C. § 119 to Korean Patent Application No. 10-2022-0173857 filed on Dec. 13, 2022 in the Korean Intellectual Property Office, the disclosure of which is hereby incorporated by reference in its entirety.

TECHNICAL FIELD

The present disclosure relates to a display device and, more particularly, to a display device having an input sensor and an electronic apparatus including the same.

DISCUSSION OF THE RELATED ART

A variety of display devices have been developed for use with multimedia such as televisions, mobile phones, tablet computers, navigation systems, and game consoles. A keyboard or a mouse may be used as input devices in conjunction with the display devices. In addition, display devices may be provided with an incorporated input sensor.

The input sensor may use a capacitance or self-capacitance method to detect a user's touch inputs. The input sensor may also use an electromagnetic induction method to detect the input of a stylus pen.

SUMMARY

A display device includes a display panel that includes a display region on which a pixel is disposed and a non-display region at least partially surrounding the display region. An input sensor is disposed on the display panel and is configured to detect an electromagnetically induced current. A conductive layer is disposed below the display panel and at least partially overlaps the display region. The conductive layer includes a first unit pattern. The first unit pattern includes a first extension part and a plurality of second extension parts that extend from the first extension part in a direction intersecting that of the first extension part and are disposed on one side of the first extension part.

A width of each of two adjacent ones of the plurality of second extension parts may be greater than a spacing between the two adjacent second extension parts.

The width of each of the two second extension parts may be equal to or less than about 8 mm. The spacing between the two second extension parts may be equal to or less than about 1 mm.

The conductive layer may include a plurality of first unit patterns. The plurality of first unit patterns may be spaced apart from each other.

The conductive layer may further include a second unit pattern. The second unit pattern may have a shape obtained by rotating a shape of the first unit pattern.

The input sensor may include a first electrode that extends in a first direction, a second electrode that extends in a second direction intersecting the first direction and is capacitively coupled to the first electrode of first group, a third electrode that extends in the first direction and detects the electromagnetically induced current, a fourth electrode that extends in the second direction and detects the electromagnetically induced current, a first signal line connected to one end of the first electrode, a second signal line connected to one end of the third electrode, a second group of 1-$1^{st}$ signal line connected to one end of the third electrode; a second group of 1-$2^{nd}$ signal line connected to another end of the third electrode, and a second group of second signal line connected to one end of the fourth electrode.

The plurality of second extension parts may each extend in the first direction. The first extension part may extend in the second direction. The first extension part may be closer to the one end of the third electrode than to the another end of the third electrode.

The first extension part may at least partially overlap the one end of the third electrode.

The first electrode may include a 1-$1^{st}$ extension part that extends in the first direction, a 1-$2^{nd}$ extension part that extends in the first direction and is spaced apart in the second direction from the 1-$1^{st}$ extension part, and a first intermediate part disposed between one end of the 1-$1^{st}$ extension part and one end of the 1-$2^{nd}$ extension part. The first electrode of second group may be disposed between the 1-$1^{st}$ extension part and the 1-$2^{nd}$ extension part.

The fourth electrode may include a 2-$1^{st}$ extension part that extends in the second direction, a 2-$2^{nd}$ extension part that extends in the second direction and is spaced apart in the first direction from the 2-$1^{st}$ extension part, and a second intermediate part disposed between one end of the 2-$1^{st}$ extension part and one end of the 2-$2^{nd}$ extension part. The fourth electrode may be disposed between the 2-$1^{st}$ extension part and the 2-$2^{nd}$ extension part.

The first unit pattern may further include a plurality of third extension parts that extend from the first extension part and are disposed on another side of the first extension part.

The conductive layer may further include a second unit pattern. The second unit pattern may include a first extension part and a plurality of second extension parts that extend from the first extension part of the second unit pattern in a direction intersecting the first extension part of the second unit pattern and are disposed on one side of the first extension part of the second unit pattern. Each of the plurality of second extension parts of the second unit pattern may be disposed between the second extension parts of two adjacent ones of the plurality of second extension parts.

The display device may further include a ferrite layer disposed between the display panel and the conductive layer.

The display device may further include a cushion layer disposed between the display panel and the conductive layer.

The display device may further include a sub-conductive layer disposed below the conductive layer and a ferrite layer and/or an insulating layer disposed between the conductive layer and the sub-conductive layer.

The sub-conductive layer may include a second unit pattern. The second unit pattern may include a first extension part and a plurality of second extension parts that extend from the first extension part of the second unit pattern in a direction intersecting the first extension part of the second unit pattern and are disposed on one side of the first extension part of the second unit pattern. Each of the plurality of second extension parts of the second unit pattern may be disposed between the second extension parts of two adjacent ones of the plurality of second extension parts.

The first unit pattern and the second unit pattern may be electrically connected to each other.

A display device includes a display panel that includes a display region on which a pixel is disposed and a non-display region at least partially surrounding the display region. An input sensor is disposed on the display panel and is configured to detect an electromagnetically induced current. A conductive layer is disposed below the display panel and at least partially overlaps the display region. The conductive layer includes a unit pattern. The unit pattern includes a plurality of first slits each of which extends in a first direction and which are spaced apart from each other in a second direction intersecting the first direction and a plurality of second slits that connect to each other adjacent ones of the plurality of first slits.

The plurality of first slits and the plurality of second slits may define one continuous slit.

The plurality of second slits may include a 2-$1^{st}$ slit and a 2-$2^{nd}$ slit. The 2-$1^{st}$ slit may connect one end of an $n^{th}$ one of the plurality of first slits to one end of an $(n+1)^{th}$ one of the plurality of first slits, where n is a positive integer. The 2-$2^{nd}$ slit may connect another end of the $(n+1)^{th}$ one of the plurality of first slits to another end of an $(n+2)^{th}$ one of the plurality of first slits.

The unit pattern may further include a dummy slit that connects an outside of the unit pattern to a first or last one of the plurality of first slits.

the unit pattern may further include a first dummy slit that connects an outside of the unit pattern to a first one of the plurality of first slits and a second dummy slit that connects the outside of the unit pattern to a last one of the plurality of first slits.

A length in the first direction of the plurality of first slits may be equal to or greater than about 80% of a length in the first direction of the unit pattern.

A display device includes a display panel that includes a display region on which a pixel is disposed and a non-display region at least partially surrounding the display region. An input sensor is disposed on the display panel and is configured to detect an electromagnetically induced current. A conductive layer is disposed below the display panel and at least partially overlaps the display region. The conductive layer includes a unit pattern. The unit pattern includes a plurality of first slits. A length in a first direction of the plurality of first slits is equal to or greater than about 80% of a length in the first direction of the unit pattern. The plurality of first slits is connected to an outside of the unit pattern.

The plurality of first slits may extend from a first edge of the unit pattern toward the inside of the unit pattern. The unit pattern may further include a plurality of second slits that extend from a second edge of the unit pattern toward the inside of the unit pattern. The second edge may face in the first direction toward the first edge.

The plurality of first slits and the plurality of second slits may be disposed alternately in a second direction intersecting the first direction.

The unit pattern may further include at least one second slit that extends in a second direction intersecting the first direction.

In an embodiment, the at least one second slit may be connected to at least one of the plurality of first slits.

An electronic apparatus includes a housing, an electronic module disposed in the housing, a display device that at least partially overlaps the electronic module, and a stylus pen that includes a resonance circuit. The display device includes a display panel that includes a display region on which a pixel is disposed and a non-display region at least partially surrounding the display region, an input sensor disposed on the display panel and configured to detect a resonance signal that is output from the stylus pen, and a conductive layer disposed below the display panel and at least partially overlapping the display region. The conductive layer may include a first unit pattern. The first unit pattern may include a first extension part and a plurality of second extension parts that extend from the first extension part in a direction intersecting the first extension part and are disposed on one side of the first extension part.

BRIEF DESCRIPTION OF DRAWINGS

FIG. 23 is a variation in magnetic flux in accordance with changes of a conductive layer and a sub-conductive layer.

DETAILED DESCRIPTION OF EMBODIMENTS

Figure 1A:
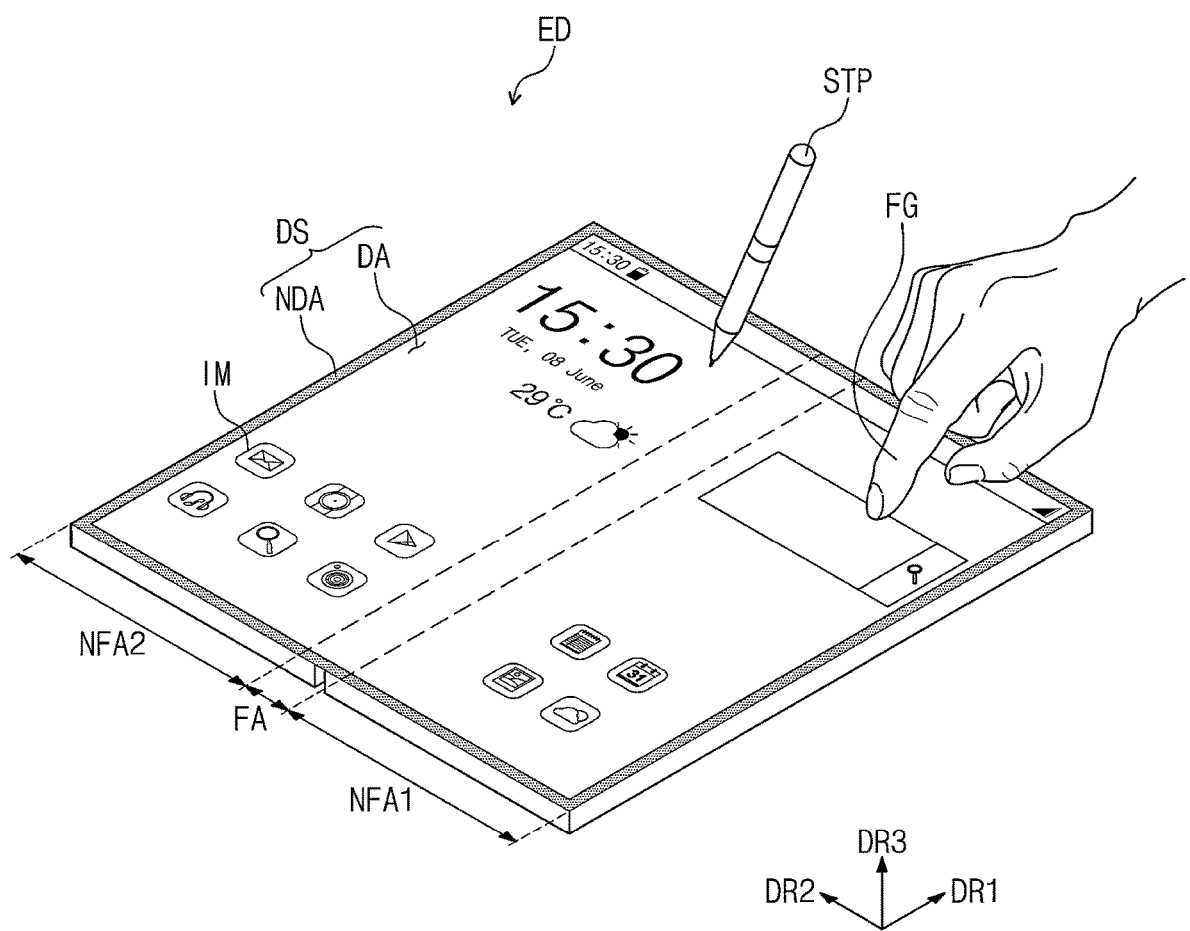
FIG. 1A is a perspective view showing an electronic apparatus according to an embodiment of the present invention.

In describing embodiments of the present disclosure illustrated in the drawings, specific terminology is employed for sake of clarity. However, the present disclosure is not necessarily intended to be limited to the specific terminology so selected, and it is to be understood that each specific element includes all technical equivalents which operate in a similar manner.

In this disclosure, when a certain component (or region, layer, portion, etc.) is referred to as being "on", "connected to", or "coupled to" other component(s), the certain component may be directly on, directly connected to, or directly coupled to the other component(s) or at least one intervening component may be present therebetween.

Like numerals may indicate like components throughout the specification and the drawings. Moreover, in the drawings, thicknesses, ratios, and dimensions of components may be exaggerated for effectively explaining the technical contents. The term "and/or" includes one or more combinations defined by associated components.

It will be understood that, although the terms first, second, etc. may be used herein to describe various components, these components should not necessarily be limited by these terms. These terms are used to distinguish one component from another component. For example, a first component could be termed a second component, and vice versa without departing from the scope of the present invention. Unless the context clearly indicates otherwise, the singular forms are intended to include the plural forms as well.

In addition, the terms "beneath", "lower", "above", "upper", and the like are used herein to describe one component's relationship to other component(s) illustrated in the drawings. The relative terms are intended to encompass different orientations in addition to the orientation depicted in the drawings.

It should be understood that the terms "comprise", "include", "have", and the like are used to specify the presence of stated features, integers, steps, operations, components, elements, or combinations thereof, but do not preclude the presence or addition of one or more other features, integers, steps, operations, components, elements, or combinations thereof.

The following will now describe some embodiments of the present invention in conjunction with the accompanying drawings.

Figure 1B:
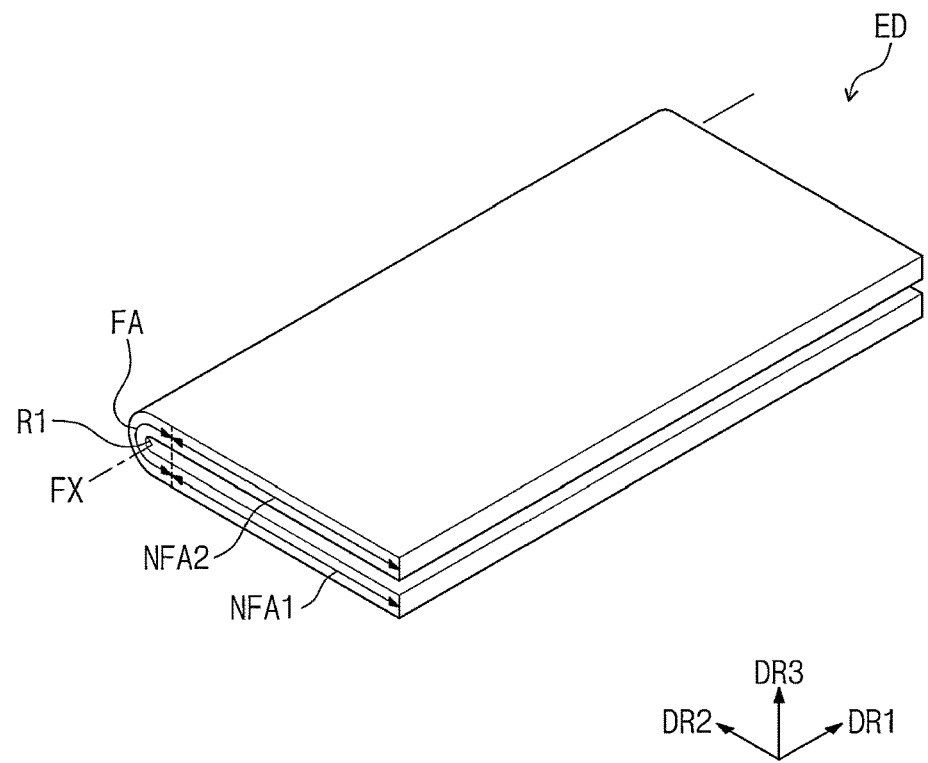
FIGS. 1B and 1C are perspective views showing a folding state of the electronic apparatus depicted in FIG. 1A.
Figure 1C:
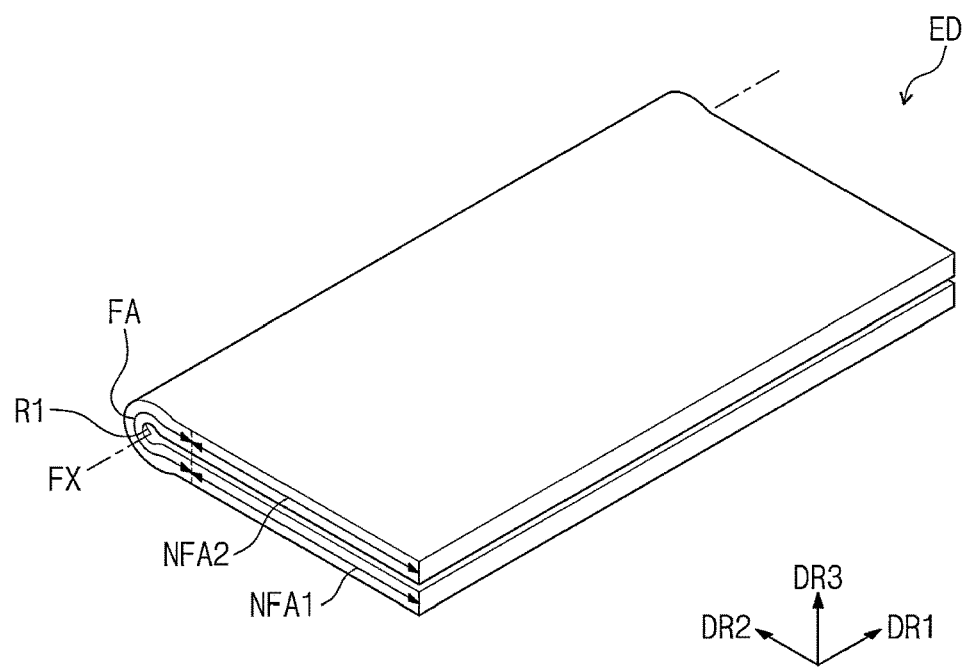

FIGS. 1A to 1C are perspective views showing an electronic apparatus ED according to an embodiment of the present invention. FIG. 1A depicts an unfolding state, and FIGS. 1B and 1C depict a folding state.

Referring to FIGS. 1A to 1C, the electronic apparatus ED, according to an embodiment of the present invention, may include a display surface DS defined by a first direction DR1 and a second direction DR2 that intersects the first direction DR1. The electronic apparatus ED may use the display surface DS to provide users with an image IM.

The display surface DS may include a display region DA and a non-display region NDA at least partially surrounding the display region DA. The display region DA may display the image IM, and the non-display region NDA might not display the image IM. The non-display region NDA may surround the display region DA. The present invention, however, is not necessarily limited thereto, and the display region DA and the non-display region NDA may be changed in shape.

A third direction DR3 is defined below as a direction that substantially vertically intersects a plane defined by the first direction DR1 and the second direction DR2. The third direction DR3 is used as a reference that distinguishes a front surface and a rear surface of each component. In this disclosure, the phrase "in a plan view" may indicate the meaning of "when viewed in the third direction DR3." Hereinafter, the first, second, and third directions DR1, DR2, and DR3 may be directions indicated by first, second, and third directional axes, and the same symbols are allocated thereto.

The electronic apparatus ED may include a folding region FA and a plurality of non-folding regions NFA1 and NFA2. The non-folding regions NFA1 and NFA2 may include a first non-folding region NFA1 and a second non-folding region NFA2. When viewed in the second direction DR2, the folding region FA may be disposed between the first non-folding region NFA1 and the second non-folding region NFA2. A foldable electronic apparatus ED is illustrated by way of example in the present embodiment, but the present invention is not necessarily limited thereto. The electronic apparatus ED may be of bar type, rollable type, or slidable type.

The electronic apparatus ED may detect an input by a stylus pen STP or an input by a user's body FG. A finger is illustrated by way of example as the user's body FG. The electronic apparatus ED may be driven in time-division driving to detect the input by the stylus pen STP during a first mode period and the input by the user's body FG during a second mode period.

As illustrated in FIG. 1B, the folding region FA may be folded about a folding axis FX that extends in the first direction DR1. The folding region FA may have a certain curvature and a curvature radius (i.e., radius of curvature) R1. The first non-folding region NFA1 and the second non-folding region NFA2 may face each other, and the electronic apparatus ED may be in-folded such that the display surface DS might not be externally exposed.

In an embodiment of the present invention, the display device DD may be out-folded such that the display surface DS may be externally exposed. In an embodiment of the present invention, the electronic apparatus ED may be configured to reciprocally repeat the in-folding and/or out-folding from an unfolding state, but the present invention is not necessarily limited thereto. In an embodiment of the present invention, the electronic apparatus ED may be configured to select one of an unfolding operation, an in-folding operation, and an out-folding operation.

As illustrated in FIG. 1B, a distance between the first non-folding region NFA1 and the second non-folding region NFA2 may be substantially the same as twice the curvature radius R1. However, as shown in FIG. 1C, the distance between the first non-folding region NFA1 and the second non-folding region NFA2 may be less than twice the curvature radius R1. FIGS. 1B and 1C depict the electronic apparatus ED seen from the display surface DS, and a housing (see HM of FIG. 2A) that constitutes an appearance of the electronic apparatus ED may be in contact with each other at ends of the first and second non-folding regions NFA1 and NFA2.

Figure 2:
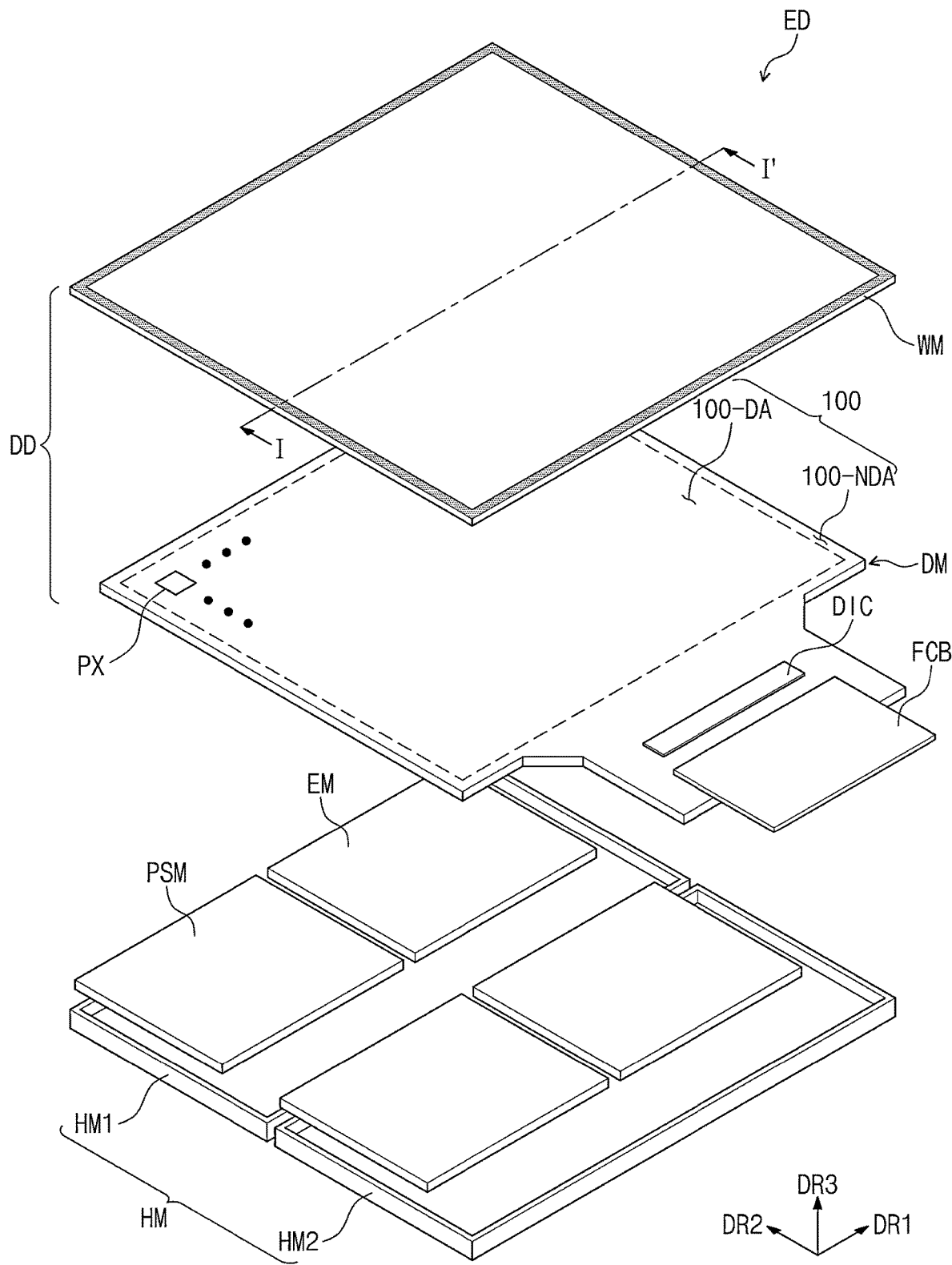
FIG. 2 is an exploded perspective view showing the electronic apparatus depicted in FIG. 1A.

FIG. 2 is an exploded perspective view showing the electronic apparatus ED according to an embodiment of the present invention.

As illustrated in FIG. 2, the electronic apparatus ED may include a display device DD, an electronic module EM, a power module PSM, and a housing HM. The electronic apparatus ED may include a mechanism structure for controlling a folding operation of the display device DD. FIG. 2 omits an illustration of an adhesion layer through which components are coupled to each other.

The display device DD may generate an image and may detect an external input. The display device DD may include a window WM and a display module DM. The window WM may provide a front surface of the electronic apparatus ED. The window WM will be further discussed in detail below. The display device DD may further include an additional component either between the window WM and the display module DM or below the display module DM.

The display module DM may include at least a display panel 100. FIG. 2 depicts only the display panel 100 selected from a stack structure of the display module DM, but the display module DM may further include a plurality of components disposed on the display panel 100. The stack structures of the display module DM will be discussed in detail below.

The display panel 100 may be an emissive display panel, such as an organic light-emitting display panel or an inorganic light-emitting display panel, but the present invention is not necessarily particularly limited thereto.

The display panel 100 may include a display region 100-DA and a non-display region 100-NDA that respectively correspond to the display region (see DA of FIG. 1A) and the non-display region (see NDA of FIG. 1A) of the electronic apparatus ED. The display region 100-DA may include a pixel PX. The non-display region 100-NDA might not include the pixel PX, but may include a signal line that provides the pixel PX with voltage. In this disclosure, the phrase "a region/part corresponds to a region/part" may mean "a region/part overlaps a region/part", which interpretation is not necessarily limited to the meaning of "a region/part has the same area as that of a region/part."

As illustrated in FIG. 2, a driver chip DIC may be disposed on the non-display region 100-NDA of the display panel 100. A flexible circuit board FCB may be coupled to the non-display region 100-NDA of the display panel 100. The flexible circuit board FCB may be connected to a main circuit board. The main circuit board may be one electronic component included in the electronic module EM. In addition, the electronic module EM may further include a control module (e.g., application processor), a wireless communication module, and a video input module.

The driver chip DIC may include driving elements, such as a data driving circuit, for driving the pixel PX of the display panel DP. FIG. 2 depicts a structure in which the driver chip DIC is mounted on the display panel 100, but the present invention is not necessarily limited thereto. For example, the driver chip DIC may be mounted on the flexible circuit board FCB.

Referring to FIG. 2, the electronic module EM may be disposed on each of a first housing HM1 and a second housing HM2, and the power module PSM may be disposed on each of the first housing HM1 and the second housing HM2. The electronic module EM disposed on the first housing HM1 and the electronic module EM disposed on the second housing HM2 may be electrically connected to each other through the flexible circuit board FCB. The housing HM may be combined with the display device DD, for example, with the window WM to accommodate other modules. The housing HM is illustrated to include the first and second housings HM1 and HM2 that are separated from each other, but the present invention is not necessarily limited thereto. The electronic apparatus ED may further include a hinge structure for connecting the first and second housings HM1 and HM2 to each other.

Figure 3:
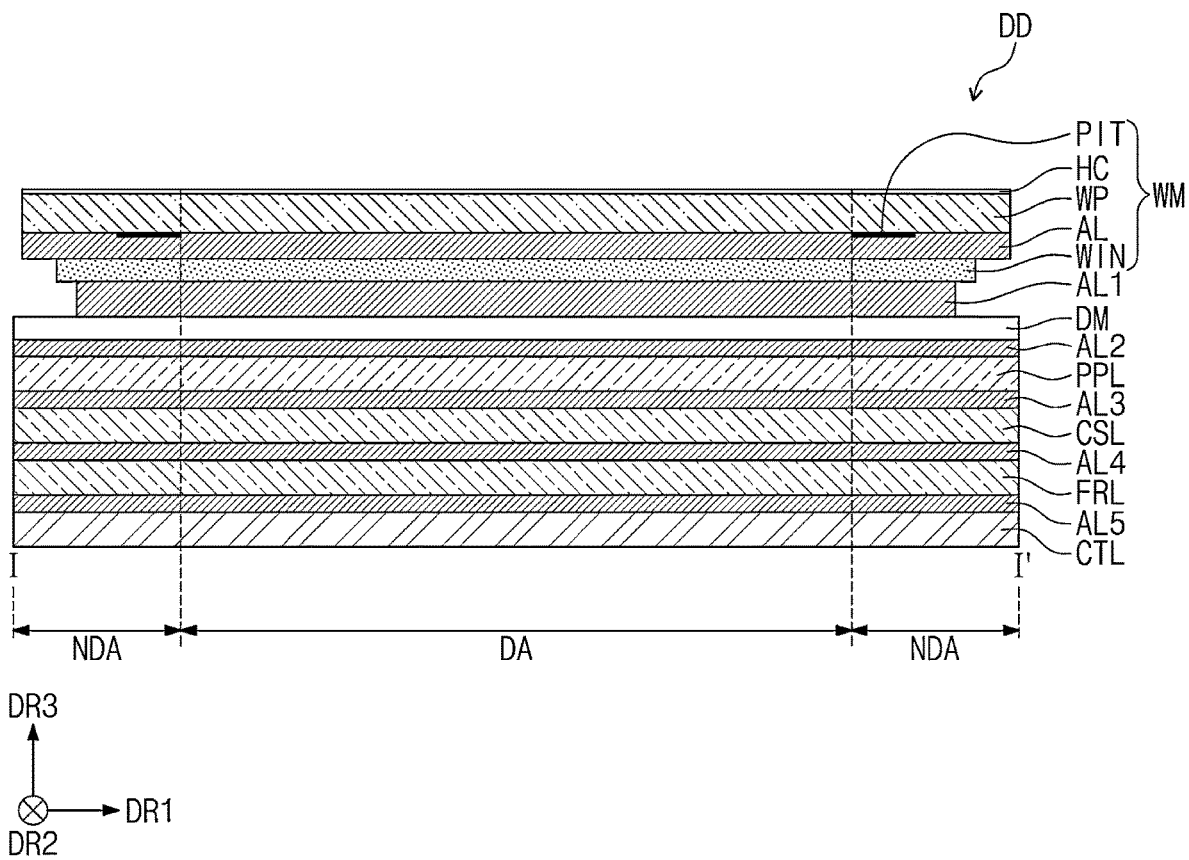
FIG. 3 is a cross-sectional view showing a display device taken along line I-I' of FIG. 2.

FIG. 3 is a cross-sectional view showing the display device DD taken along line I-I' of FIG. 2.

Referring to FIG. 3, the display device DD may include a window WM, a display module DM, a panel protection layer PPL, a cushion layer CSL, a ferrite layer FRL, a conductive layer CTL, and first to fifth adhesion layers AL1 to AL5. Each of the first to fifth adhesion layers AL1 to AL5 may couple two adjacent stacked ones of the components discussed above. The first to fifth adhesion layers AL1 to AL5 may each include a pressure sensitive adhesive (PS A) or an optically clear adhesive (OCA), but the kind of adhesion layer is not necessarily limited thereto.

The window WM may provide an outer appearance of the display device DD. The window WM may include a base layer BS, a window protection layer WP, a hard coating layer HC, and a print layer PIT (or a black matrix layer). The base layer BS may have optically transparent characteristics. The base layer BS may include glass or a synthetic resin film. The window protection layer WP may be attached through an adhesion layer AL onto the base layer BS. The window protection layer WP may include a flexible plastic material, such as polyimide or polyethylene terephthalate. The hard coating layer HC may be disposed on a bottom surface of the window protection layer WP.

The print layer PIT may be disposed on a bottom surface of the window protection layer WP. The print layer PIT may be a black matrix layer. The print layer PIT may have a black color, but no limitation is imposed on the color of the print layer PIT. The print layer PIT may be adjacent to an edge of the window protection layer WP. The print layer PIT may at least partially overlap the non-display region NDA. However, the stack structure of the window WM is not necessarily limited to the structure discussed above.

The panel protection layer PPL may be disposed below the display module DM. The panel protection layer PPL may protect a lower portion of the display panel DP. The panel protection layer PPL may include a flexible plastic material. For example, the panel protection layer PPL may include polyethylene terephthalate (PET). In an embodiment of the present invention, the panel protection layer PPL may be omitted.

The cushion layer CSL may be disposed below the panel protection layer PPL. The cushion layer CSL may absorb external impact. The cushion layer CSL may include foamed plastics. In an embodiment of the present invention, the cushion layer CSL may be omitted.

The ferrite layer FRL may be disposed below the cushion layer CSL. The ferrite layer FRL may include a material with high magnetic permeability. The ferrite layer FRL may include a ferromagnetic material. The ferrite layer FRL may include a magnetic metal powder layer. The magnetic metal powder layer may include base resin and magnetic metal powder suspended in the base resin. In an embodiment of the present invention, the ferrite layer FRL may be omitted.

The conductive layer CTL may be disposed below the ferrite layer FRL. The conductive layer CTL may shield electromagnetic waves to prevent the display module DM from being interfered by electromagnetic waves generated from the electronic module EM of FIG. 2 (noise shield effect). The conductive layer CTL may include a diamagnetic material. The conductive layer CTL may radiate heat generated from the display module DM or the driver chip DIC of FIG. 2 (thermal radiation effect).

The conductive layer CTL may include a metal layer including copper, aluminum, gold, and/or titanium. The conductive layer CTL may include a metal oxide layer, such as indium tin oxide (ITO) or indium zinc oxide (IZO). The conductive layer CTL may include carbon nano-tube, conductive polymer-coated carbon nano-tube, or graphite.

Figure 4:
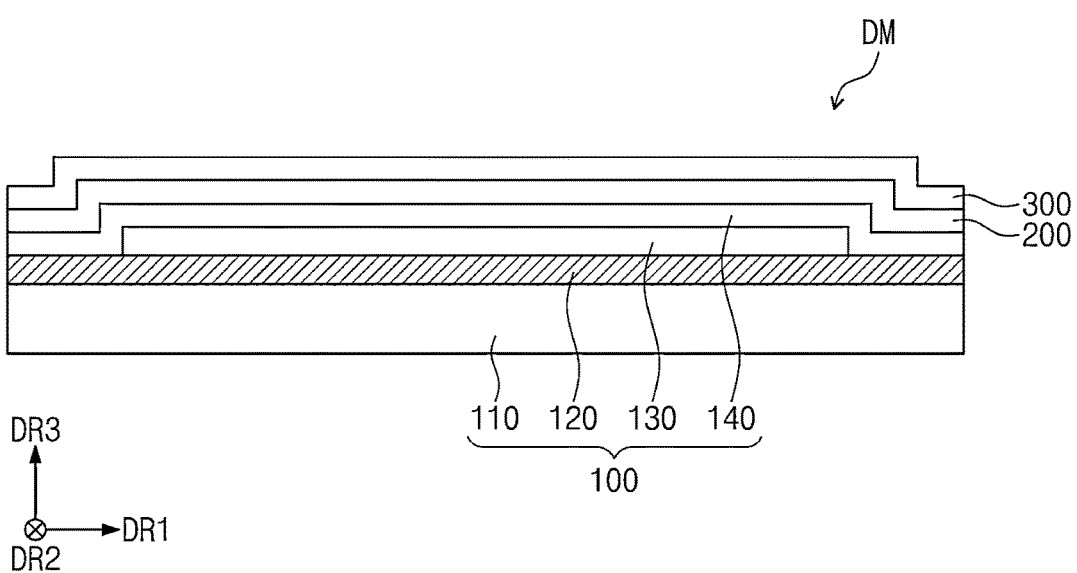
FIG. 4 is a cross-sectional view showing a display module according to an embodiment of the present invention.

FIG. 4 is a cross-sectional view showing the display module DM according to an embodiment of the present invention. Referring to FIG. 4, the display module DM may include a display panel 100, an input sensor 200, and an anti-reflector 300.

The display panel 100 may include a base layer 110, a driving element layer 120, a light-emitting element layer 130, and an encapsulation layer 140. The base layer 110 may provide a base surface on which the driving element layer 120 is disposed. The base layer 110 may be a rigid substrate or a flexible substrate that can be bendable, foldable, or rollable. The base layer 110 may be a glass substrate, a metal substrate, or a polymer substrate. The present invention, however, is not necessarily limited thereto, and the base layer 110 may be an inorganic layer, an organic layer, or a composite material layer.

The base layer 110 may have a multi-layered structure. For example, the base layer 110 may include a first synthetic resin layer, an inorganic layer having a multi-layered or single-layered structure, and a second synthetic resin layer disposed on the inorganic layer having a multi-layered or single-layered structure. Each of the first and second synthetic resin layers may include polyimide-based resin, but the present invention is not necessarily limited thereto.

The driving element layer 120 may be disposed on the base layer 110. The driving element layer 120 may include an insulating layer, a semiconductor pattern, a conductive pattern, and a signal line. The driving element layer 120 may include a driving circuit of the pixel PX discussed with reference to FIG. 2. The light-emitting element layer 130 may be disposed on the driving element layer 120. The light-emitting element layer 130 may include a light-emitting element of the pixel PX discussed in FIG. 2.

The encapsulation layer 140 may be disposed on the light-emitting element layer 130. The encapsulation layer 140 may protect the light-emitting element layer 130 against moisture, oxygen, and foreign substances such as dust particles. The encapsulation layer 140 may include at least one inorganic layer. The encapsulation layer 140 may include a stack structure in which an inorganic layer, an organic layer, and an inorganic layer are stacked on each other.

The input sensor 200 may be disposed on the display panel 100. The input sensor 200 may detect an input by the stylus pen STP or an input by the user's body FG. A series of processes may be employed to form the input sensor 200 on the display panel 100. In this case, the input sensor 200 may be directly disposed on the display panel 100. In this disclosure, the phrase "A is directly disposed on B" means that no separate adhesion layer is disposed between A and B.

The anti-reflector 300 may be disposed on the input sensor 200. The anti-reflector 300 may reduce a reflectance of external light. A series of processes may be employed to directly place the anti-reflector 300 on the input sensor 200.

The anti-reflector 300 may include a color filter. The color filter may have color that corresponds to that of source light. For example, a red color filter may be disposed on a light-emitting element that produces red light. The anti-reflector 300 may further include a light-shield pattern disposed between the color filters.

Figure 5:
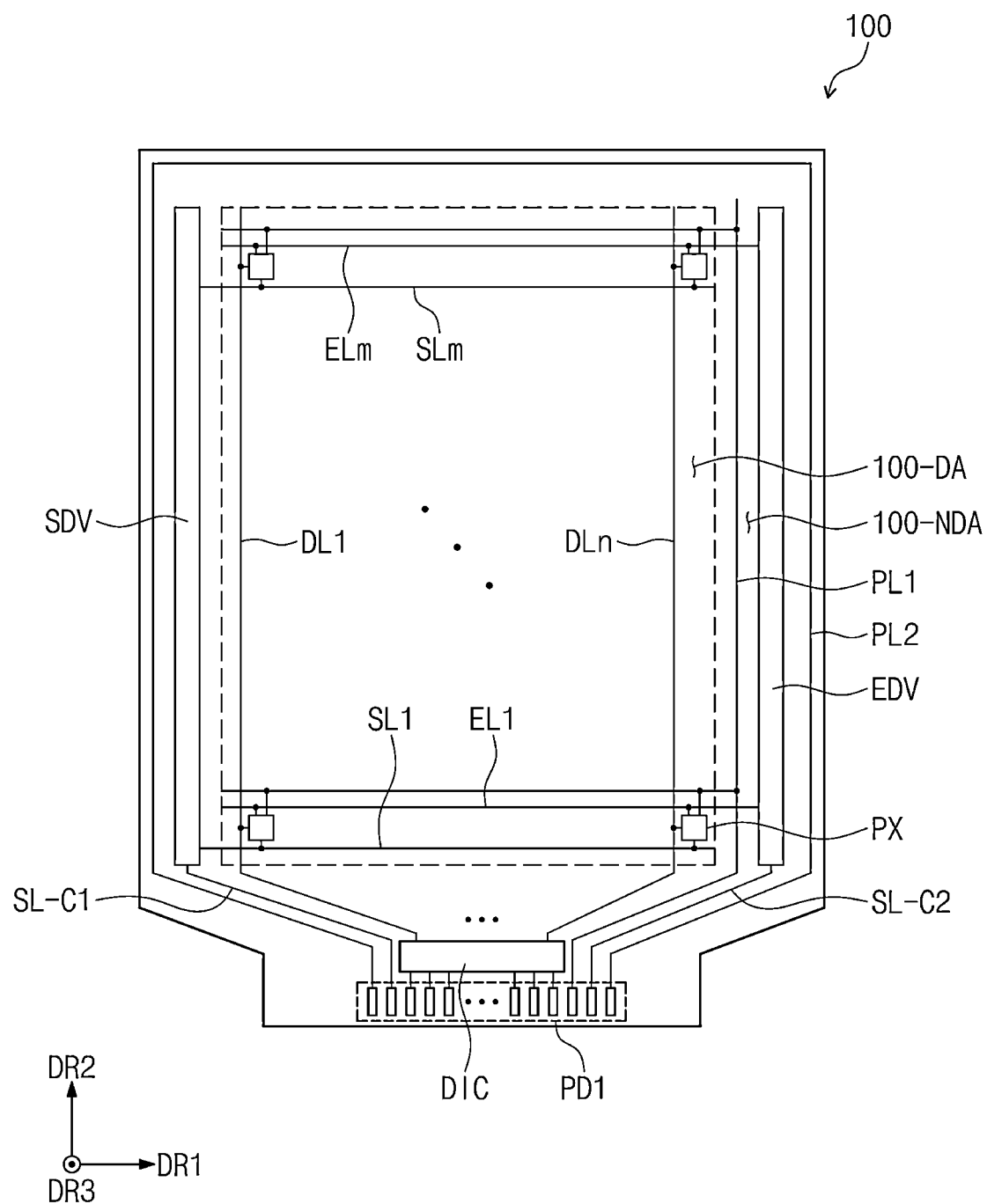
FIG. 5 is a plan view showing a display panel according to an embodiment of the present invention.

FIG. 5 is a plan view showing the display panel 100 according to an embodiment of the present invention.

Referring to FIG. 5, the display panel 100 may include a plurality of pixels PX, a scan driving circuit SDV, an emission driving circuit EDV, a plurality of signal lines, and a plurality of first pads PD1. A data driving circuit may be included in the driver chip DIC mounted on the non-display region 100-NDA. In an embodiment of the present invention, likewise the scan driving circuit SDV and the emission driving circuit EDV, the data driving circuit may also be integrated on the display panel 100.

The plurality of signal lines may include a plurality of scan lines SL1 to SLm, a plurality of data lines DL1 to DLn, a plurality of emission lines EL1 to Elm, first and second control lines SL-C1 and SL-C2, and first and second power lines PL1 and PL2. The subscripts "m" and "n" are integers of at least 2.

The scan lines SL1 to SLm may extend in the second direction DR2 to be connected to the pixels PX and the scan driving circuit SDV. The data lines DL1 to DLn may extend in the first direction DR1 to be connected to the pixels PX and the driver chip DIC. The emission lines EL1 to ELm may extend in the second direction DR2 to be connected to the pixels PX and the emission driving circuit EDV.

The first power line PL1 may receive a first power voltage, and the second power line PL2 may receive a second power voltage that is less than the first power voltage. A second electrode (or a cathode) of the light-emitting element may be connected to the second power line PL2.

The first control line SL-C1 may be connected to the scan driving circuit SDV and may extend toward a bottom end of the display panel 100. The second control line SL-C2 may be connected to the emission driving circuit EDV and may extend toward the bottom end of the display panel 100. The first pads PD1 may be disposed on the non-display region 100-NDA adjacent to the bottom end of the display panel 100, and may be closer than the driver chip DIC to the bottom end of the display panel 100. The first pads PD1 may be connected to the driver chip DIC and some of the signal lines.

The scan driving circuit SDV may generate a plurality of scan signals, and the scan signals may be applied through the scan lines SL1 to SLm to the pixels PX. The driver chip DIC may generate a plurality of data voltages, and the data voltages may be applied through the data lines DL1 to DLn to the pixels PX. The emission driving circuit EDV may generate a plurality of emission signals, and the emission signals may be applied through the emission lines EL1 to ELn to the pixels PX.

In response to the scan signals, the pixels PX may be provided with the data voltages. In response to the emission signals, the pixels PX may emit light whose brightness corresponds to the data voltages, thereby displaying an image.

Figure 6:
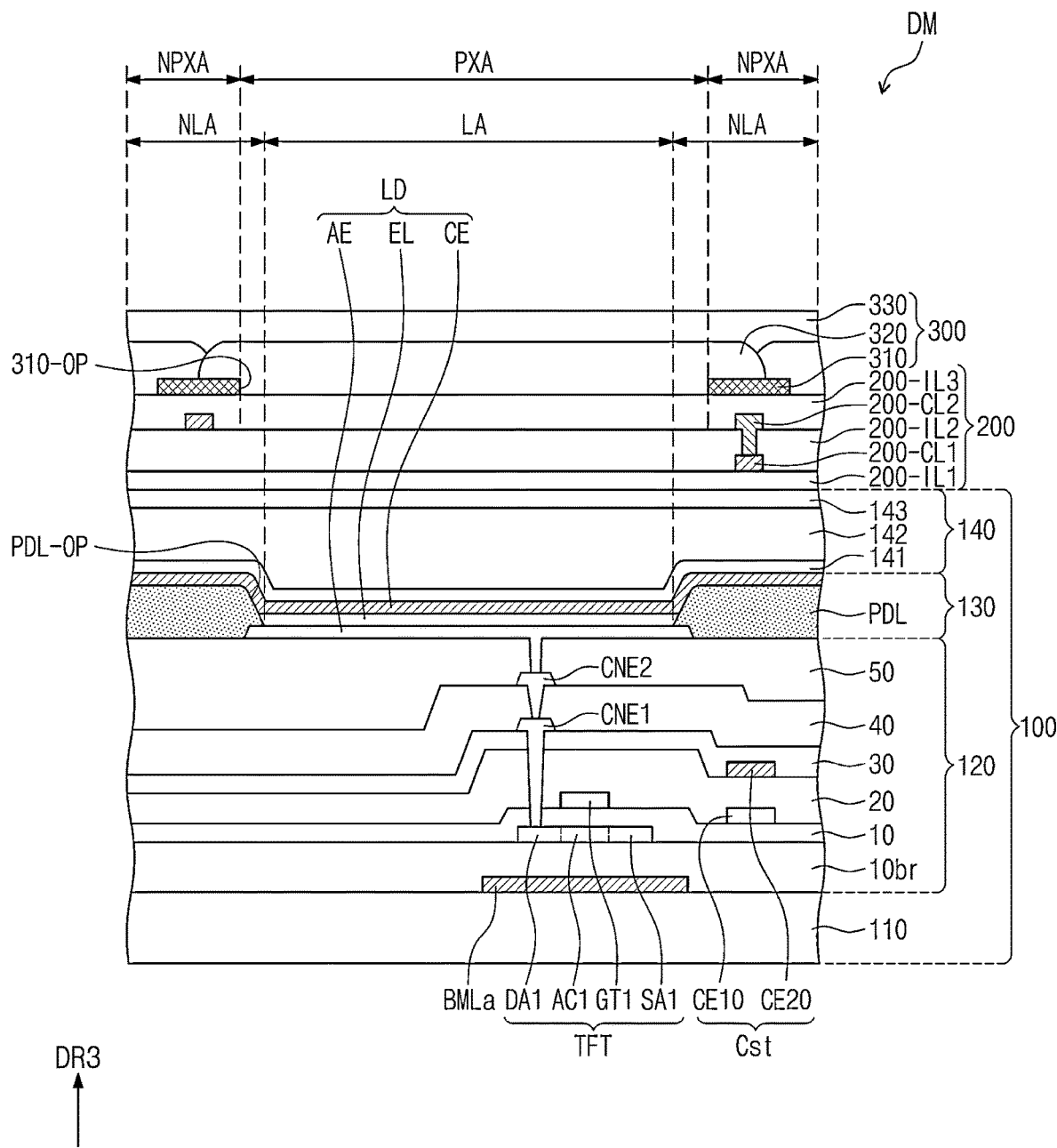
FIG. 6 is an enlarged cross-sectional view showing a display module according to an embodiment of the present invention.

FIG. 6 is an enlarged cross-sectional view showing the display module DM according to an embodiment of the present invention.

FIG. 6 depicts a cross-section of one emission region LA and a non-emission region NLA around the emission region LA. FIG. 6 also depicts a light-emitting element LD and a transistor TFT connected to the light-emitting element LD. The transistor TFT may be one of a plurality of transistors included in a driving circuit of the pixel PX. In the present embodiment, the transistor TFT is explained as a silicon transistor, but the transistor TFT may be a metal oxide transistor or another suitable type of transistor.

A buffer layer 10br may be disposed on the base layer 110. The buffer layer 10br may prevent metal elements or impurities from diffusing from the base layer 110 toward its overlying semiconductor pattern. The semiconductor pattern may include an active section AC1 of the transistor TFT.

A backside metal layer BMLa may be disposed below the transistor TFT. The backside metal layer BMLa may prevent external light from reaching the transistor TFT. The backside metal layer BMLa may be disposed between the base layer 110 and the buffer layer 10br. In an embodiment of the present invention, an inorganic barrier layer may further be disposed between the backside metal layer BMLa and the buffer layer 10br. The backside metal layer BMLa may be connected to an electrode or a wiring line, and may receive a constant voltage or a signal from the electrode or the wiring line.

The semiconductor pattern may be disposed on the buffer layer 10br. The semiconductor pattern may include a silicon semiconductor. For example, the silicon semiconductor may include amorphous silicon or polycrystalline silicon. The semiconductor pattern may include, for example, low-temperature polycrystalline silicon.

The semiconductor pattern may include a first section whose electrical conductivity is relatively high and a second section whose electrical conductivity is relatively low. The first section may be doped with n-type or p-type impurities. A p-type transistor may include a doped section implanted with p-type impurities, and an n-type transistor may include a doped section implanted with n-type impurities. The second section may be an undoped section or may be a doped section implanted with impurities whose concentration is less than that of impurities doped in the first section.

The first section may have an electrical conductivity that is greater than that of the second section, and may substantially serve as an electrode or a signal line. The second section may substantially correspond to an active section (or channel) of a transistor. For example, a portion of the semiconductor pattern may be an active section of a transistor, another portion of the semiconductor pattern may be a source or drain of the transistor, and still another portion of the semiconductor pattern may be a connection electrode or a connection signal line.

The transistor TFT may include a source section SA1 (or source), an active section AC1 (or channel), and a drain section DA1 (or drain) that are formed from the semiconductor pattern. When viewed in vertical section, the source section SA1 and the drain section DA1 may extend in opposite directions from the active section AC1.

A first insulating layer 10 may be disposed on the buffer layer 10br. The first insulating layer 10 may at least partially cover the semiconductor pattern, while commonly overlapping a plurality of pixels (see PX of FIG. 5). The first insulating layer 10 may include one or both of an inorganic layer and an organic layer, and may have a single-layered or multi-layered structure. The inorganic layer may include aluminum oxide, titanium oxide, silicon oxide, silicon nitride, silicon oxynitride, zirconium oxide, and/or hafnium oxide. In the present embodiment, the first insulating layer 10 may be a single-layered silicon oxide layer. Likewise the first insulating layer 10, a subsequently described insulating layer of the driving element layer 120 may be one or both of an inorganic layer and an organic layer, and may have a single-layered or multi-layered structure. The inorganic layer may include at least one of the materials mentioned above, but the present invention is not necessarily limited thereto.

The transistor TFT may include a gate GT1 disposed on the first insulating layer 10. The gate GT1 may be a portion of a metal pattern. The gate GT1 may at least partially overlap the active section AC1. The gate GT1 may serve as a mask in a process in which the semiconductor pattern is doped. The gate GT1 may include titanium (Ti), silver (Ag), a silver-containing alloy, molybdenum (Mo), a molybdenum-containing alloy, aluminum (Al), a aluminum-containing alloy, aluminum nitride (AlN), tungsten (W), tungsten nitride (WN), copper (Cu), indium tin oxide (ITO), and/or indium zinc oxide (IZO), but the present invention is not necessarily particularly limited thereto.

The first insulating layer 10 may be disposed thereon with a second insulating layer 20 that covers the gate GT1. A third insulating layer 30 may be disposed on the second insulating layer 20. The second insulating layer 20 and the third insulating layer 30 may be disposed therebetween with a second electrode CE20 of a storage capacitor Cst. In addition, a first electrode CE10 of the storage capacitor Cst may be disposed between the first insulating layer 10 and the second insulating layer 20.

A first connection electrode CNE1 may be disposed on the third insulating layer 30. The first connection electrode CNE1 may be coupled to the drain section DA1 of the transistor TFT through a contact hole that penetrates the first, second, and third insulating layers 10, 20, and 30.

A fourth insulating layer 40 may be disposed on the third insulating layer 30. A second connection electrode CNE2 may be disposed on the fourth insulating layer 40. The second connection electrode CNE2 may be coupled to the first connection electrode CNE1 through a contact hole that penetrates the fourth insulating layer 40. The fourth insulating layer 40 may be disposed thereon with a fifth insulating layer 50 that covers the second connection electrode CNE2. There is illustrated merely by way of example a stack structure in which the first to fifth insulating layers 10 to 50 are stacked, but additional conductive and insulating layers may further be disposed in addition to the first to fifth insulating layers 10 to 50.

Each of the fourth and fifth insulating layers 40 and 50 may be an organic layer. For example, the organic layer may include a general universal polymer such as benzocyclobutene (BCP), polyimide, hexamethyldisiloxane (HMDSO), polymethylmethacrylate (PMMA), and polystyrene (PS), a polymer derivative having a phenol group, an acryl-based polymer, an imide-based polymer, an aryl ether-based polymer, an amide-based polymer, a fluoride-based polymer, a p-xylene-based polymer, a vinyl alcohol-based polymer, or any blend thereof.

The light-emitting element LD may include a first electrode AE (a pixel electrode), an emission layer EL, and a second electrode CE (or a common electrode). The first electrode AE may be disposed on the fifth insulating layer 50. The first electrode AE may be a transmissive electrode, transflective electrode, or a reflective electrode. The first electrode AE may include a reflective layer formed of Ag, Mg, Al, Pt, Pd, Au, Ni, Nd, Ir, Cr, or any compound thereof, and a transmissive or transflective electrode layer formed on the reflective layer. The transmissive or transflective electrode layer may include indium tin oxide (ITO), indium zinc oxide (IZO), indium gallium zinc oxide (IGZO), zinc oxide (ZnO), indium oxide (In2O3), and/or aluminum-doped zinc oxide (AZO). For example, the first electrode AE may include a stack structure of ITO/Ag/ITO.

A pixel definition layer PDL may be disposed on the fifth insulating layer 50. According to an embodiment, the pixel definition layer PDL may exhibit light-absorbing properties and may have a black color. The pixel definition layer PDL may include a black coloring agent. The black coloring agent may include a black dye or a black pigment. The black coloring agent may include carbon black, metal such as chromium, or oxide thereof. The pixel definition layer PDL may correspond to a light-shield pattern having light-shield properties.

The pixel definition layer PDL may cover a portion of the first electrode AE (or an anode). For example, the pixel definition layer PDL may have therein an opening PDL-OP that exposes a portion of the first electrode AE. The opening PDL-OP of the pixel definition layer PDL may define the emission region LA.

The pixel definition layer PDL may increase a distance between the second electrode CE (or a cathode) and an edge of the first electrode AE. Therefore, the pixel definition layer PDL may serve to prevent the occurrence of arc at the edge of the first electrode AE.

A hole control layer may be disposed between the first electrode AE and the emission layer EL. The hole control layer may include a hole transport layer and may further include a hole injection layer. An electrode control layer may be disposed between the emission layer EL and the second electrode CE. The electrode control layer may include an electrode transport layer and may further include an electrode injection layer.

The encapsulation layer 140 may be disposed on the light-emitting element layer 130. The encapsulation layer 140 may include an inorganic layer 141, an organic layer 142, and an inorganic layer 143 that are sequentially stacked, but layers included in the encapsulation layer 140 are not necessarily limited thereto.

The inorganic layers 141 and 143 may protect the light-emitting element layer 130 against moisture and oxygen, and the organic layer 142 may protect the light-emitting element layer 130 against foreign substances such as dust particles. The inorganic layers 141 and 143 may include a silicon nitride layer, a silicon oxynitride layer, a silicon oxide layer, a titanium oxide layer, or an aluminum oxide layer. The organic layer 142 may include an acryl-based organic layer, but the present invention is not necessarily limited thereto.

The input sensor 200 may be disposed on the display panel 100. The input sensor 200 may include a first insulating layer 200-IL1, a first conductive pattern layer 200-CL1, a second insulating layer 200-IL2, a second conductive pattern layer 200-CL2, and a third insulating layer 200-IL3. The first insulating layer 200-IL1 may be directly disposed on the encapsulation layer 140.

In an embodiment of the present invention, one or both of the first and third insulating layers 200-IL1 and 200-L3 may be omitted. When the first insulating layer 200-IL1 is omitted, the first conductive pattern layer 200-CL1 may be disposed on an uppermost insulating layer of the encapsulation layer 140. The third insulating layer 200-IL3 may be replaced with an adhesion layer or an insulating layer of the anti-reflector 300 disposed on the input sensor 200.

The first conductive pattern layer 200-CL1 may include first conductive patterns, and the second conductive pattern layer 200-CL2 may include second conductive patterns. The first conductive pattern layer 200-CL1 may be disposed on the first insulating layer 200-ILL. The second conductive pattern layer 200-CL2 may be disposed on the second insulating layer 200-IL2. In this disclosure, the same reference numeral is allocated to the first conductive pattern layer 200-CL1 and the first conductive patterns, and the same reference numeral is allocated to the second conductive pattern layer 200-CL2 and the second conductive patterns.

The first conductive patterns 200-CL1 and the second conductive patterns 200-CL2 may have a single-layered structure or a multi-layered structure in which layers or patterns are stacked along the third direction DR3. A conductive pattern having the multi-layered structure may include at least two selected from transparent conductive layers and metal layers. The conductive pattern having the multi-layered structure may include metal layers including different metals from each other. The transparent conductive layer may include indium tin oxide (ITO), indium zinc oxide (IZO), zinc oxide (ZnO), indium tin zinc oxide (ITZO), poly(3,4-ethylenedioxythiophene) (PEDOT), metal nanowires, or graphene. The metal layer may include molybdenum, silver, titanium, copper, aluminum, or an alloy thereof.

In the present embodiment, each of the first to third insulating layers 200-IL1 to 200-IL3 may include an inorganic layer or an organic layer. In the present embodiment, the first to third insulating layers 200-IL1 to 200-IL3 may include an inorganic layer. The inorganic layer may include silicon oxide, silicon nitride, or silicon oxynitride.

In an embodiment of the present invention, at least one of the first to third insulating layers 200-IL1 to 200-IL3 may be an organic layer. For example, the third insulating layer 200-IL3 may include an organic layer. The organic layer may include acryl-based resin, methacryl-based resin, polyisoprene, vinyl-based resin, epoxy-based resin, urethane-based resin, cellulose-based resin, siloxane-based resin, polyimide-based resin, polyamide-based resin, and/or perylene-based resin.

The anti-reflector 300 may be disposed on the input sensor 200. The anti-reflector 300 may include a light-shield pattern 310, a color filter 320, and a planarization layer 330. In an embodiment of the present invention, the light-shield pattern 310 may be omitted.

A material included in the light-shield pattern 310 may be any suitable material that has light-absorbing properties. The light-shield pattern 310 may be a black colored layer, and in an embodiment, may include a black coloring agent. The black coloring agent may include a black dye or a black pigment. The black coloring agent may include carbon black, metal such as chromium, or oxide thereof.

In a plan view, the light-shield pattern 310 may overlap the first conductive patterns 200-CL1 and the second conductive patterns 200-CL2. The light-shield pattern 310 may prevent external light from being reflected due to the first conductive patterns 200-CL1 and the second conductive patterns 200-CL2. The light-shield pattern 310 may have an opening 310-OP defined therein. The opening 310-OP of the light-shield pattern 310 may overlap the first electrode AE, and may have an area greater than that of the opening PDL-OP disposed in the pixel definition layer PDL. A pixel region PXA may be defined by the opening 310-OP of the light-shield pattern 310. The pixel region PXA may be defined as a region where light is outwardly discharged from the light-emitting element LD. An increase in area of the pixel region PXA may induce an increase in image brightness.

The color filter 320 may overlap at least the pixel region PXA. The color filter 320 may further overlap a non-pixel region NPXA. A portion of the color filter 320 may be disposed on the light-shield pattern 310. The color filter 320 may allow passage of light generated from the light-emitting element LD, and may block passage of external light having a certain wavelength range. Therefore, the color filter 320 may reduce external light from being reflected due to the first electrode AE or the second electrode CE.

The planarization layer 330 may cover the light-shield pattern 310 and the color filter 320. The planarization layer 330 may include an organic material, and the planarization layer 330 may provide a flat bottom surface.

Figure 7:
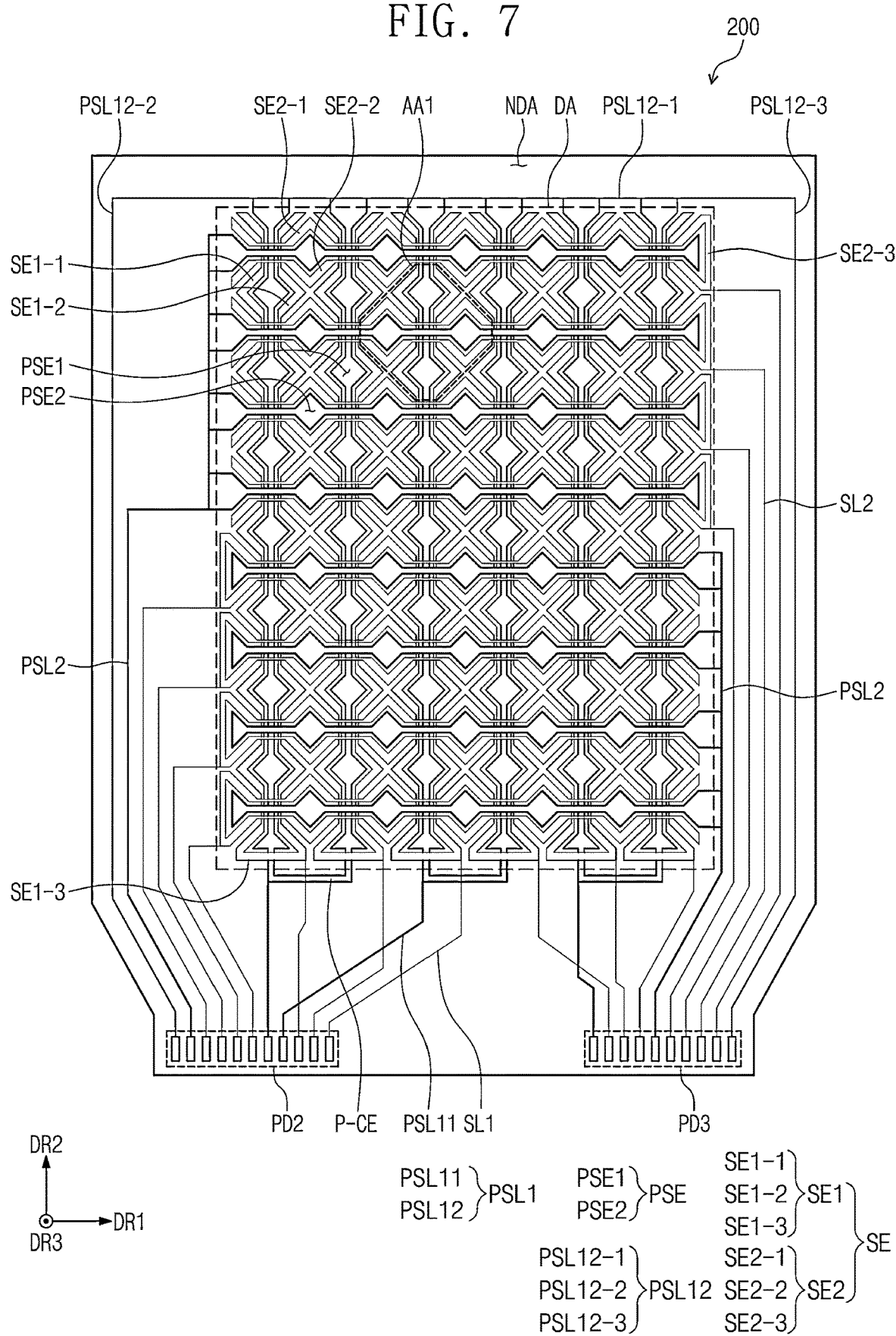
FIG. 7 is a plan view showing an input sensor according to an embodiment of the present invention.

FIG. 7 is a plan view showing the input sensor 200 according to an embodiment of the present invention.

Referring to FIG. 7, the input sensor 200 may use a capacitance method to detect a first input, and may also use an electromagnetic induction method to detect a second input. The first input may be an input by the user's body FG discussed with reference to FIG. 1A, and the second input may be an input by the stylus pen STP discussed with reference to FIG. 1A. For example, the first input may be an input that can change capacitance, and the second input may be an input that provides a magnetic field signal.

The input sensor 200 may be driven in time-division manner to detect the first input and the second input. A first operating period may be defined to indicate a period in which the input sensor 200 is operated in a first mode to detect the first input, and a second operating period may be defined to indicate a period in which the input sensor 200 is operated in a second mode to detect the second input. The first mode and the second mode may be switched by selection of user or activation of a specific application, or one of the first mode and the second mode may be activated by activation of a specific application. While the input sensor 200 is operated alternately between the first mode and the second mode, the first mode may be maintained when the first input is detected or the second mode may be maintained when the second input is detected.

The input sensor 200 may include first group of electrodes SE for detecting the first input and second group of electrodes PSE for detecting the second input. Six second group of electrodes PSE1 and eight second electrode of second groups PSE2 have been illustrated, but in practice, the input sensor 200 may include more than six second group of electrodes PSE1 and more than eight second electrode of second groups PSE2.

The first group of electrodes SE may include first electrode of first groups SE1 that are arranged in the first direction DR1 and extend in the second direction DR2, and may also include second electrode of first groups SE2 that intersect the first electrode of first groups SE1. The first electrode of first groups SE1 may be capacitively coupled to the second electrode of first groups SE2.

A driving circuit of the input sensor 200 may provide a driving signal to electrodes of one of the first electrode of first groups SE1 and the second electrode of first groups SE2, and a sensing circuit of the input sensor 200 may use an electrode of the other of the first electrode of first groups SE1 and the second electrode of first groups SE2 to measure a capacitance change of a mutual capacitor formed between the first electrode of first groups SE1 and the second electrode of second groups SE2. The operation mentioned above may be performed for a first interval in the first operating period, and then may be oppositely performed for a second interval in the first operating period. A set of the first interval and the second interval may be repeated.

The second group of electrodes PSE may include a first electrode of second groups PSE1 that are arranged in the first direction DR1 and extend in the second direction DR2, and may also include a second electrode of second groups PSE2 that intersect the first electrode of second groups PSEL. At least one of the first electrode of second groups PSE1 and the second electrode of second groups PSE2 may be used to charge a resonance circuit of the stylus pen (see STP of FIG. 1A), and the first electrode of second groups PSE1 and the second electrode of second groups PSE2 may be used to detect a magnetic field signal that is output from the stylus pen (see STP of FIG. 1A). The driving circuit of the input sensor 200 may provide a driving signal to at least one of the first electrode of second groups PSE1 and the second electrode of second groups PSE2, and the sensing circuit of the input sensor 200 may detect an electromagnetically induced current formed on the first electrode of second groups PSE1 and the second electrode of second groups PSE2.

The input sensor 200 may include a first signal line of first groups SL1 connected to ends of the first electrode of first groups SE1, a second signal line of first groups SL2 connected to ends of the second electrode of first groups SE2, a second group of first signal lines PSL1 connected to the first electrode of second groups PSE1, and a second group of second signal lines PSL2 connected to ends of the second group of the second electrodes PSE2. The second group of first signal lines PSL1 may include second group of 1-$1^{st}$ signal lines PSL11 connected to ends of the first electrode of second groups PSE1 and a second group of 1-$2^{nd}$ signal line PSL12 connected to other ends of the first electrode of second groups PSEL.

A display region DA may be disposed thereon with the first electrode of first groups SE1, the second electrode of first groups SE2, the first electrode of second groups PSE1, and the second electrode of second groups PSE2. A non-display region NDA may be disposed thereon with the first signal line of first groups SL1, the second signal line of first groups SL2, the second group of 1-$1^{st}$ signal lines PSL11, the second group of 1-$2^{nd}$ signal line PSL12, and the second group of second signal lines PSL2. The electrodes SE1, SE2, PSE1, and PSE2 may be disposed on a layer the same as or different from that of the signal lines SL1, SL2, PSL1, and PSL2. The display region DA of FIG. 7 is explained as the display region DA of FIG. 1, but may be explained as the display region 100-DA of FIG. 5, and the non-display region NDA of FIG. 7 is explained as the non-display region NDA of FIG. 1, but may be explained as the non-display region 100-NDA of FIG. 5.

The input sensor 200 may include second pads PD2 and third pads PD3. The second pads PD2 may be disposed on a region spaced apart in the first direction DR1 from a region on which the third pads PD3 are disposed. The first signal line of first groups SL1, the second signal line of first groups SL2, the second group of first signal lines PSL1, and the second group of second signal line PSL2 may each be connected to at least one corresponding pad of the second and third pads PD2 and PD3. In a plan view, the second pads PD2 and the third pads PD3 may be adjacent to a bottom end of the input sensor 200. In a plan view, the first pads PD1 depicted in FIG. 5 may be disposed between the second pads PD2 and the third pads PD3.

The input sensor 200 may be divided into a left region and a right region along the first direction DR1 about its center. The second pads PD2 may be disposed on the left region, and the third pads PD3 may be disposed on the right region. The first signal line of first groups SL1 coupled to the first electrodes SE1 disposed on the left region may be connected to the second pads PD2. The first signal line of first groups SL1 coupled to the first electrodes SE1 disposed on the right region may be connected to the third pads PD3.

The input sensor 200 may be divided into an upper region and a lower region along the second direction DR2 about its center. Some of the second signal line of first groups SL2 may be connected to left ends of the second electrode of first groups SE2 disposed on the upper region. The some of the second signal line of first groups SL2 may be connected to the second pads PD2. Others of the second signal line of first groups SL2 may be connected to right ends of the second electrode of first groups SE2 disposed on the lower region. The others of the second signal line of first groups SL2 may be connected to the third pads PD3.

Each of the first electrode of first groups SE1 may include a $1\text{-}1^{st}$ extension part SE1-1 and a $1\text{-}2^{nd}$ extension part SE1-2 that extend in the second direction DR2 and are spaced apart from each other in the first direction DR1. The $1\text{-}1^{nd}$ extension part SE1-1 and the $1\text{-}2^{nd}$ extension part SE1-2 may have shapes that are symmetric around the second direction DR2 (e.g., vertical symmetry or left-right symmetry).

Each of the first electrode of first groups SE1 may further include a first intermediate part SE1-3. It is illustrated by way of example that the first intermediate part SE1-3 is disposed on the lower region. The first intermediate part SE1-3 might not be disposed on the upper region. The first intermediate part SE1-3 may extend in the first direction DR1. The first intermediate part SE1-3 may be disposed between an end of the $1\text{-}1^{st}$ extension part SE1-1 and an end of the $1\text{-}2^{nd}$ extension part SE1-2. The first signal line of first group SL1 may be connected to the first intermediate part SE1-3.

The first intermediate part SE1-3 and the first electrode of second group PSE1 may intersect each other while being insulated from each other. A bridge may be disposed on an intersection region between conductive patterns, such as an intersection region between the first intermediate part SE1-3 and the first electrode of second group PSEL. The bridge may constitute a portion of a first conductive pattern among first and second conductive patterns. The second conductive pattern and a remaining portion of the first conductive pattern may be disposed on a different layer from that of the bridge.

Each of the second electrode of first groups SE2 may include a $2\text{-}1^{st}$ extension part SE2-1 and a $2\text{-}2^{nd}$ extension part SE2-2 that extend in the first direction DR1 and are spaced apart from each other in the second direction DR2. The $2\text{-}1^{st}$ extension part SE2-1 and the $2\text{-}2^{nd}$ extension part SE2-2 may have shapes that are symmetric around the first direction DR1 (e.g., horizontal symmetry or up-down symmetry). The second electrode of second group PSE2 may be disposed between the $2\text{-}1^{st}$ extension part SE2-1 and the $2\text{-}2^{nd}$ extension part SE2-2.

Each of the second electrode of first groups SE2 may further include a second intermediate part SE2-3. The second intermediate parts SE2-3 of the second electrode of first groups SE2 on the upper region may be disposed on the right region, but might not be disposed on the left region. The second intermediate parts SE2-3 of the second electrode of first groups SE2 on the lower region may be disposed on the left region.

The second intermediate part SE2-3 may extend in the second direction DR2. The second intermediate part SE2-3 may be disposed between an end of the $2\text{-}1^{st}$ extension part SE2-1 and an end of the $2\text{-}2^{nd}$ extension part SE2-2. The second signal line of first group SL2 may be connected to the second intermediate part SE2-3.

The first electrode of second groups PSE1 may extend in the second direction DR2 and may be spaced apart from each other in the first direction DR1. The first electrode of second groups PSE1 may be disposed on the same layer as that of the first electrode of first groups SE1. Each of the first electrode of second groups PSE1 may be disposed between the $1\text{-}1^{nd}$ extension part SE1-1 and the $1\text{-}2^{nd}$ extension part SE1-2 of a corresponding first electrode of first group SE1. It is illustrated in the present embodiment that two adjacent ones of the first electrode of second groups PSE1 are electrically connected through a connection part P-CE, but the present invention is not necessarily limited thereto. The first signal line of first group SL1 may intersect the connection part P-CE, and a bridge mentioned above may be disposed on an intersection region between the connection part P-CE and the first signal line of first group SL1. The bridge may be a portion of the first signal line of first group SL1 or a portion of the connection part P-CE.

A corresponding second group of $1\text{-}1^{st}$ signal line PSL11 may be connected to two adjacent first electrode of second groups PSEL. The corresponding second group of $1\text{-}1^{st}$ signal line PSL11 may be connected to the connection part P-CE. The present invention, however, is not necessarily limited thereto, and the corresponding second group of $1\text{-}1^{st}$ signal line PSL11 may be connected to an end (which is disposed on the lower region) of one of two first electrode of second groups PSEL.

On the upper region, ends of the first electrode of second groups PSE1 may be connected to each other through the second group of $1\text{-}2^{nd}$ signal line PSL12. An end of the second group of $1\text{-}2^{nd}$ signal line PSL12 may be connected to the second pad PD2, and another end of the second group of $1\text{-}2^{nd}$ signal line PSL12 may be connected to the third pad PD3. The second group of $1\text{-}2^{nd}$ signal line PSL12 may include a first part PSL12-1 that extends in the first direction DR1 and is connected to ends (which is disposed on the upper region) of the first electrode of second groups PSE1, a second part PSL12-2 bent from the first part PSL12-1 and connected to the second pad PD2, and a third part PSL12-3 bent from the first part PSL12-1 and connected to the third pad PD3.

The second electrode of second groups PSE2 may extend in the first direction DR1 and may be spaced apart from each other in the second direction DR2. The second electrode of second groups PSE2 may be disposed on the same layer as that of the second electrode of first groups SE2. Each of the second electrode of second groups PSE2 may be disposed between the $2\text{-}1^{st}$ extension part SE2-1 and the $2\text{-}2^{nd}$ extension part SE2-2 of a corresponding second electrode of first group SE2.

Left ends of the second electrode of second groups PSE2 disposed on the upper region may be connected to one of the second group of second signal lines PSL2. Right ends of the second electrode of second groups PSE2 disposed on the lower region may be connected to another of the second group of second signal lines PSL2. However, the above description does not necessarily limit the connection relationship between the second electrode of second groups PSE2 and the second group of second signal lines PSL2. For example, in an embodiment of the present invention, left ends or right ends of the second electrode of second groups PSE2 may all be connected to the same second group of second signal line PSL2.

Figure 8:
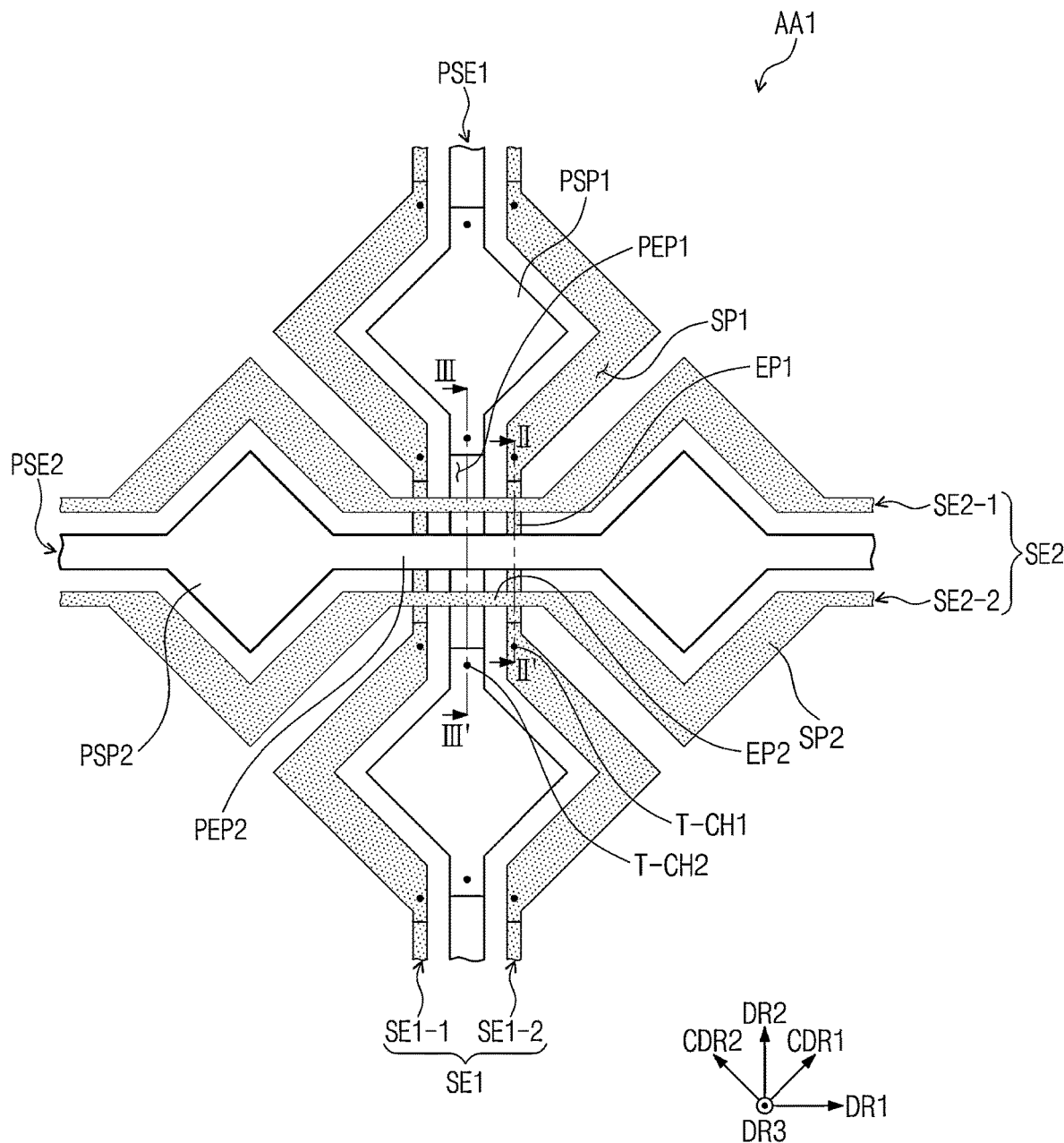
FIG. 8 is an enlarged plan view showing an intersection region of FIG. 7.
Figure 9:
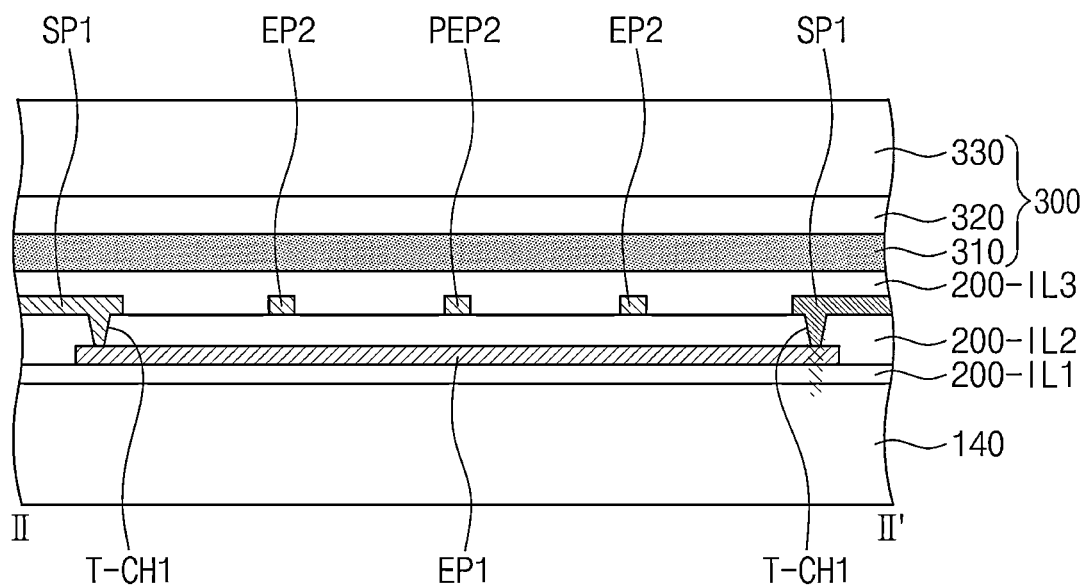
FIG. 9 is a cross-sectional view showing an input sensor taken along line II-II' of FIG. 8.
Figure 10:
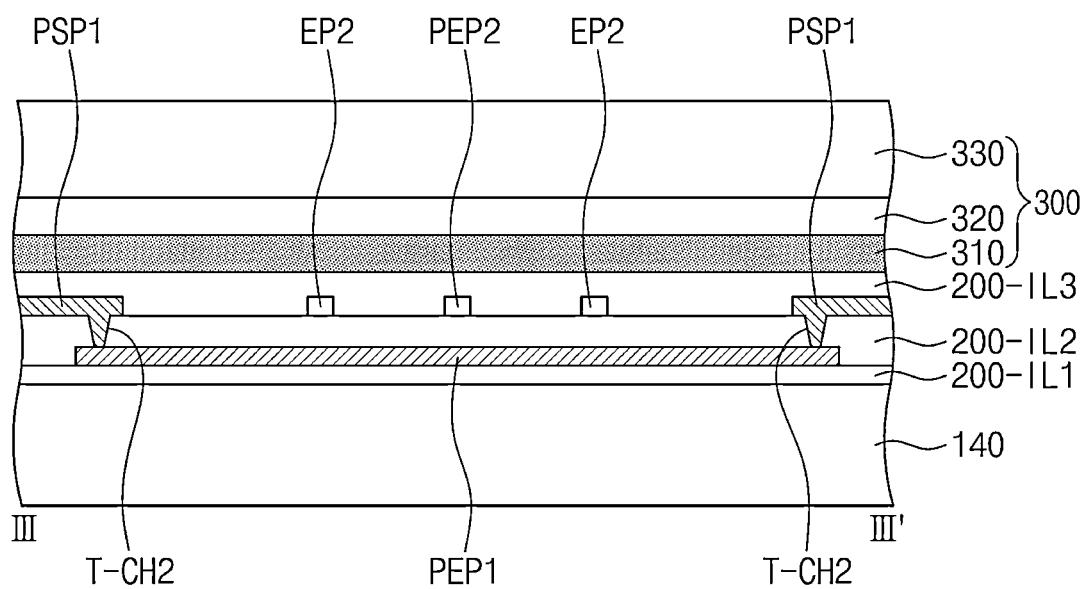
FIG. 10 is a cross-sectional view showing an input sensor taken along line III-III' of FIG. 8.
Figure 11:
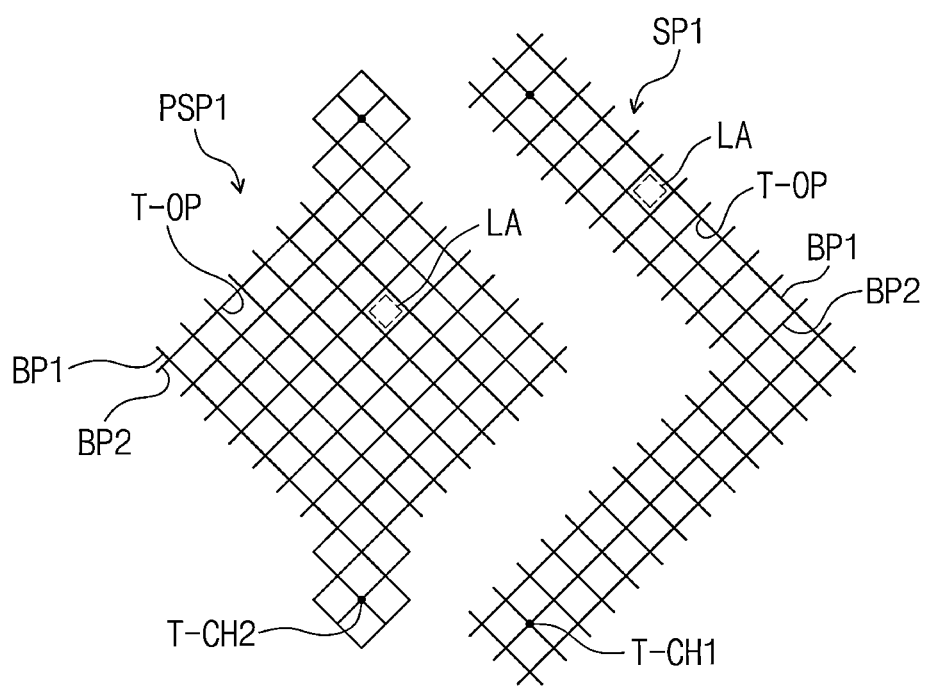
FIG. 11 is an enlarged plan view showing some of electrodes depicted in FIG. 8.
Figure 11:
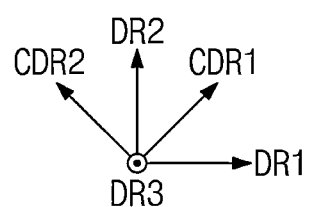

FIG. 8 is an enlarged plan view showing an intersection region AA1 of FIG. 7. FIG. 9 is a cross-sectional view showing an input sensor taken along line II-II' of FIG. 8. FIG. 10 is a cross-sectional view showing an input sensor taken along line III-III' of FIG. 8. FIG. 11 is an enlarged plan view showing some of electrodes depicted in FIG. 8.

Referring to FIGS. 8 and 9, the $1\text{-}1^{st}$ extension part SE1-1 and the $1\text{-}2^{nd}$ extension part SE1-2 of the first electrode of first group SE1 may each include first sensing parts SP1 that are arranged in the second direction DR2 and first intermediate parts EP1 (or intersection parts) that connect to each other two adjacent ones of the first sensing parts SP1. The first sensing parts SP1 may each have a bent shape. For example, the first sensing parts SP1 may have shapes that are bent leftwards or rightwards in the first direction DR1 to maintain a certain distance from the first electrode of second group PSEL. The first sensing parts SP1 may have their widths greater than those of the first intermediate parts EP1.

The first intermediate part EP1 may be disposed at a layer different from that of the first sensing parts SP1. The first intermediate part EP1 disposed in a lower portion of the second insulating layer 200-IL2 may correspond to a bridge. The first intermediate part EP1, or the bridge, may prevent short-circuits between one or more of the 1-$1^{st}$ extension part SE1-1 and the 1-$2^{nd}$ extension part SE1-2 and one or more of the second electrode of first group SE2 and the second electrode of second group PSE2. First contact holes T-CH1 penetrating the second insulating layer 200-IL2 may allow the first intermediate part EP1 to connect two adjacent first sensing parts SP1 to each other.

The 2-$1^{st}$ extension part SE2-1 and the 2-$2^{nd}$ extension part SE2-2 of the second electrode of first group SE2 may each include second sensing parts SP2 that are arranged in the first direction DR1 and second intermediate parts EP2 disposed between two adjacent ones of the second sensing parts SP2. The second sensing parts SP2 may each have a bent shape. For example, the second sensing parts SP2 may have shapes that are bent upwards or downwards in the second direction DR2 to maintain a certain distance from the second electrode of second group PSE2.

The second intermediate part EP2 may be disposed on the same layer (e.g., the second insulating layer 200-IL2) as that of the second sensing parts SP2. The second intermediate part EP2 and the second sensing parts SP2 may be connected to have a unitary shape.

The first sensing parts SP1 and the second sensing parts SP2 may be spaced apart from each other without overlapping each other. The first sensing parts SP1 and the second sensing parts SP2 may be alternately disposed with each other in a first cross direction CDR1 and a second cross direction CDR2. A mutual capacitor may be formed between the first sensing parts SP1 and the second sensing parts SP2.

Referring to FIGS. 8 and 10, the first electrode of second group PSE1 may include third sensing parts PSP1 that are arranged in the second direction DR2 and third intermediate parts PEP1 that connect to each other two adjacent ones of the third sensing parts PSP1. The third sensing parts PSP1 may have shapes that protrude leftwards or rightwards in the first direction DR1. The third sensing parts PSP1 may each have a shape similar to a rhombus.

The third intermediate part PEP1 may be disposed on a different layer from that of the third sensing parts PSP1. The third intermediate part PEP1 disposed in a lower portion of the second insulating layer 200-IL2 may correspond to a bridge. The third intermediate part PEP1, or the bridge, may prevent short-circuits between one or more of the 1-$1^{st}$ extension part SE1-1 and the 1-$2^{nd}$ extension part SE1-2 and one or more of the second electrode of first group SE2 and the second electrode of second group PSE2. Second contact holes T-CH2 penetrating the second insulating layer 200-IL2 may allow the third intermediate part PEP1 to connect two adjacent third sensing parts PSP1 to each other.

The second electrode of second group PSE2 may include fourth sensing parts PSP2 that are arranged in the first direction DR1 and fourth intermediate parts PEP2 disposed between two adjacent ones of the fourth sensing parts PSP2. The fourth sensing parts PSP2 may have shapes that protrude upwards or downwards in the second direction DR2. The fourth intermediate part PEP2 may be disposed on the same layer (e.g., the second insulating layer 200-IL2) as that of the fourth sensing parts PSP2. The fourth intermediate part PEP2 and the fourth sensing parts PSP2 may be connected to have a unitary shape.

A position of the bridge may be changed and a section including the bridge may be changed. According to an embodiment of the present invention, differently from the embodiments of FIGS. 8 to 10, a bridge may be provided to each of the second electrode of first group SE2 and the second electrode of second group PSE2.

Among the first signal line of first groups SL1, the second signal line of first groups SL2, the second group of 1-$1^{st}$ signal lines PSL11, the second group of 1-$2^{nd}$ signal line PSL12, and the second group of second signal lines PSL2, one or more may be disposed on the same layer as that of the third intermediate part PEP1, and another one or more may be disposed on the same layer as that of the third sensing parts PSP1. Such arrangement may be provided to prevent short-circuits between the above signal lines. In an embodiment of the present invention, most of the above signal lines may be disposed on the same layer. However, a bridge may be disposed on an intersection region between signal lines.

FIG. 11 depicts an enlarged illustration of the first sensing part SP1 and the third sensing part PSP1 shown in FIG. 8. The first sensing part SP1 is illustrated as a representative of the first group of electrodes SE, and the third sensing part PSP1 is illustrated as a representative of the second group of electrodes PSE.

Referring to FIG. 11, the first sensing part SP1 and the third sensing part PSP1 may each have a mesh shape. For example, each of the first sensing part SP1 and the third sensing part PSP1 may include first conductive lines BP1 that extend in the first cross direction CDR1 and second conductive lines BP2 that extend in the second cross direction CDR2. The first conductive lines BP1 and the second conductive lines BP2 may be formed in the same process and may have a unitary shape. A mesh-type sheet formed of the first conductive lines BP1 and the second conductive lines BP2 may be patterned to form the first electrode of first group SE1, the second electrode of second group SE2, the first electrode of second group PSE1, and the second electrode of second group PSE2 depicted in FIG. 8.

The first conductive lines BP1 and the second conductive lines BP2 may define openings T-OP each having a rhombic shape. The openings T-OP may correspond to the emission region LA of FIG. 6. For example, the first conductive lines BP1 and the second conductive lines BP2 may overlap the non-emission region NLA of FIG. 6.

Figure 12:
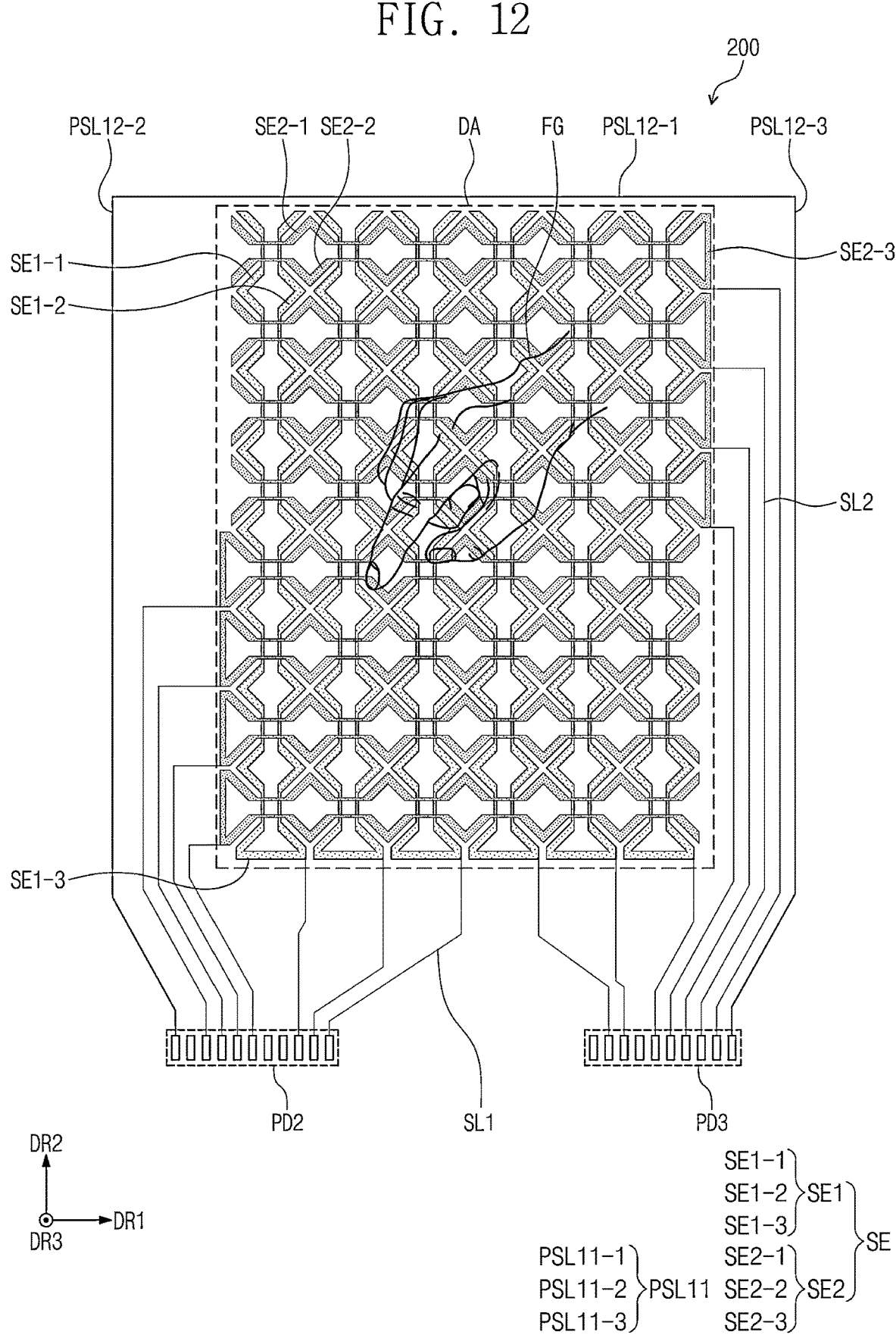
FIG. 12 is a plan view showing an operating period for a first group of electrodes depicted in FIG. 7.

FIG. 12 is a plan view showing an operating period for the first group of electrodes SE depicted in FIG. 7.

During the first operating period, the second group of electrodes PSE depicted in FIG. 7 might not participate in an operation of the input sensor 200. For example, no driving signal may be provided to the second group of electrodes PSE, and no signal may be detected from the second group of electrodes PSE. For brevity of drawing, FIG. 12 omits an illustration of the second group of electrodes PSE depicted in FIG. 7, but it may be part of the apparatus as shown in FIG. 7.

During the first operating period, the driving circuit of the input sensor 200 may provide driving signals to the first electrode of first groups SE1 or the second electrode of first groups SE2. The driving circuit of the input sensor 200 may scan the first electrode of first groups SE1 or the second electrode of first groups SE2. For example, a driving signal may be sequentially provided through the first signal line of first groups SL1 to the first electrode of first groups SE1. There may be a difference in activation period of the driving signal applied to the first electrode of first groups SE1. The driving signal may include a plurality of pulse waves or a plurality of sine waves in the activation period. The driving circuit of the input sensor 200 may be present in a driver chip separately equipped in the input sensor 200 or may be present in the driver chip (see DIC of FIG. 2) mounted on the display panel 100.

Current paths may be formed toward the second electrode of first groups SE2 from one of the first electrode of first groups SE1 that receives the driving signal. The current paths may pass through a mutual capacitor formed between the first electrode of first groups SE1 and the second electrode of first groups SE2. The second electrode of first groups SE2 may be used to detect a change in capacitance of the mutual capacitor. A sensing circuit of the input sensor 200 may use the second electrode of first groups SE2 to measure a current to calculate the change in capacitance. For example, when an input by the user's body FG is provided to one of the second electrode of first groups SE2, a current measured from the one of the second electrode of first groups SE2 may be different from that measured from other electrodes. The sensing circuit of the input sensor 200 may be present in a driver chip separately equipped in the input sensor 200 or may be present in the driver chip (see DIC of FIG. 2) mounted on the display panel 100.

Figure 13A:
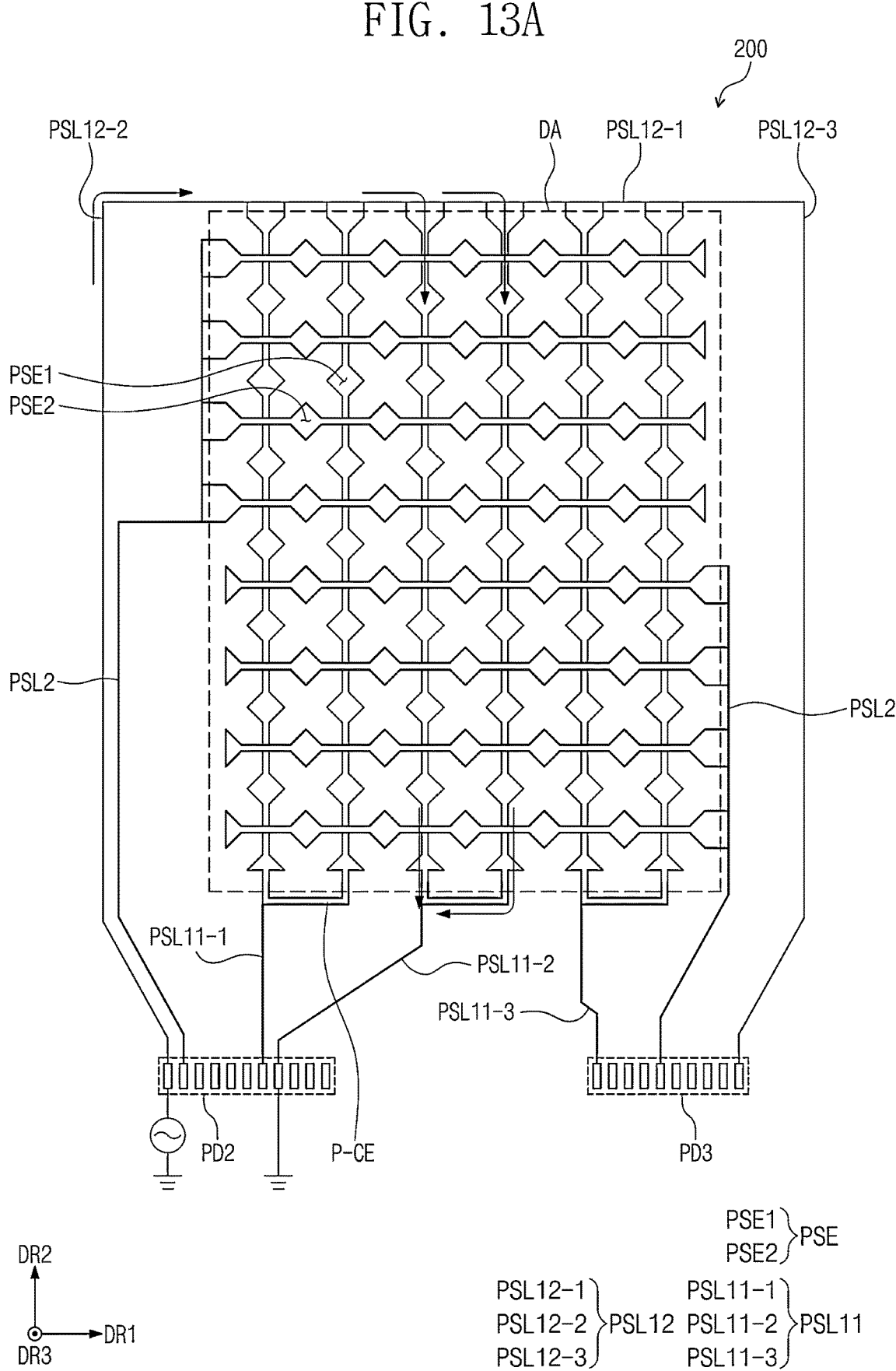
FIGS. 13A to 13C are plan views showing a charging period in an operating period for a second group of electrodes depicted in FIG. 7.
Figure 13B:
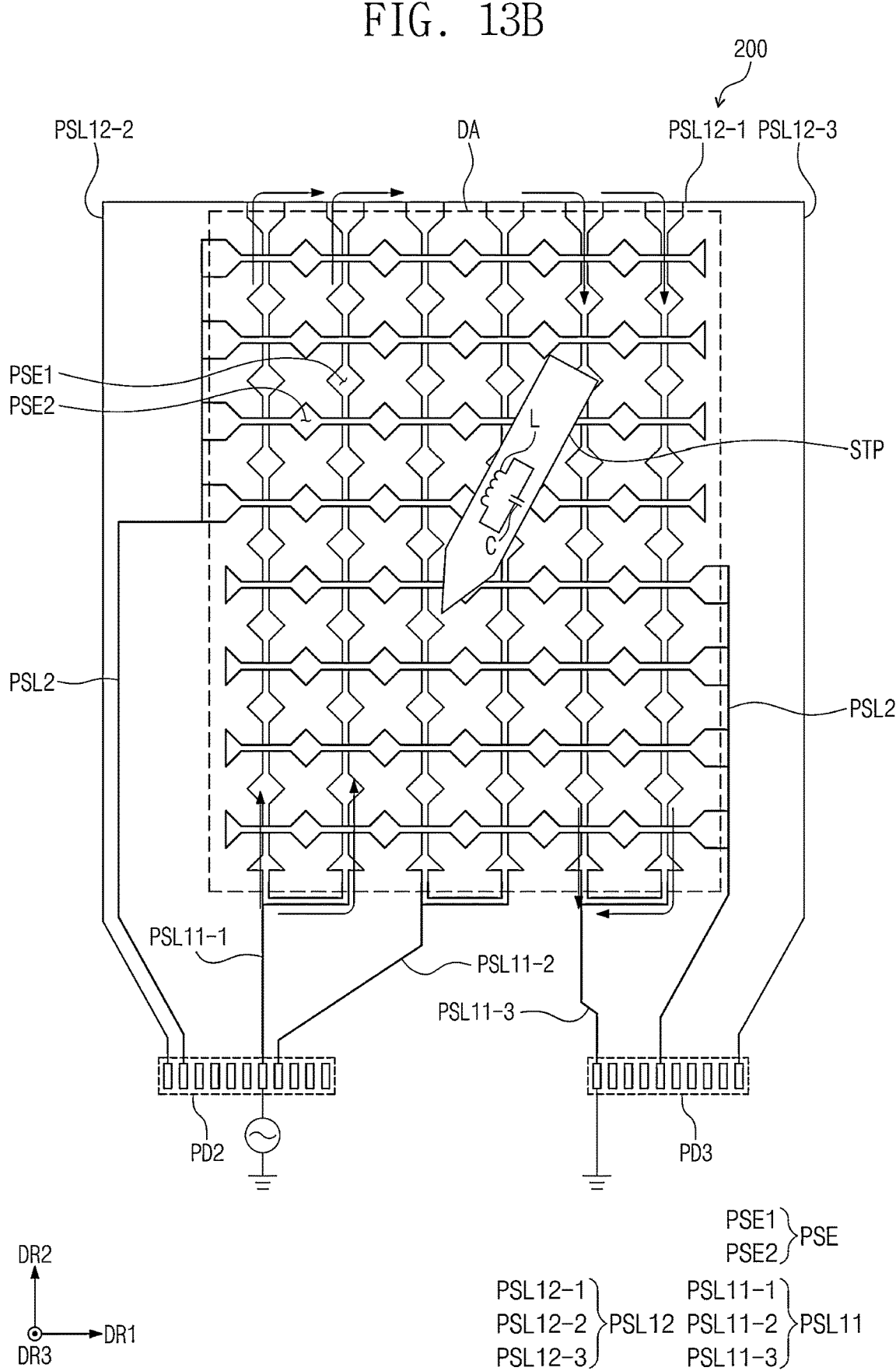
Figure 13C:
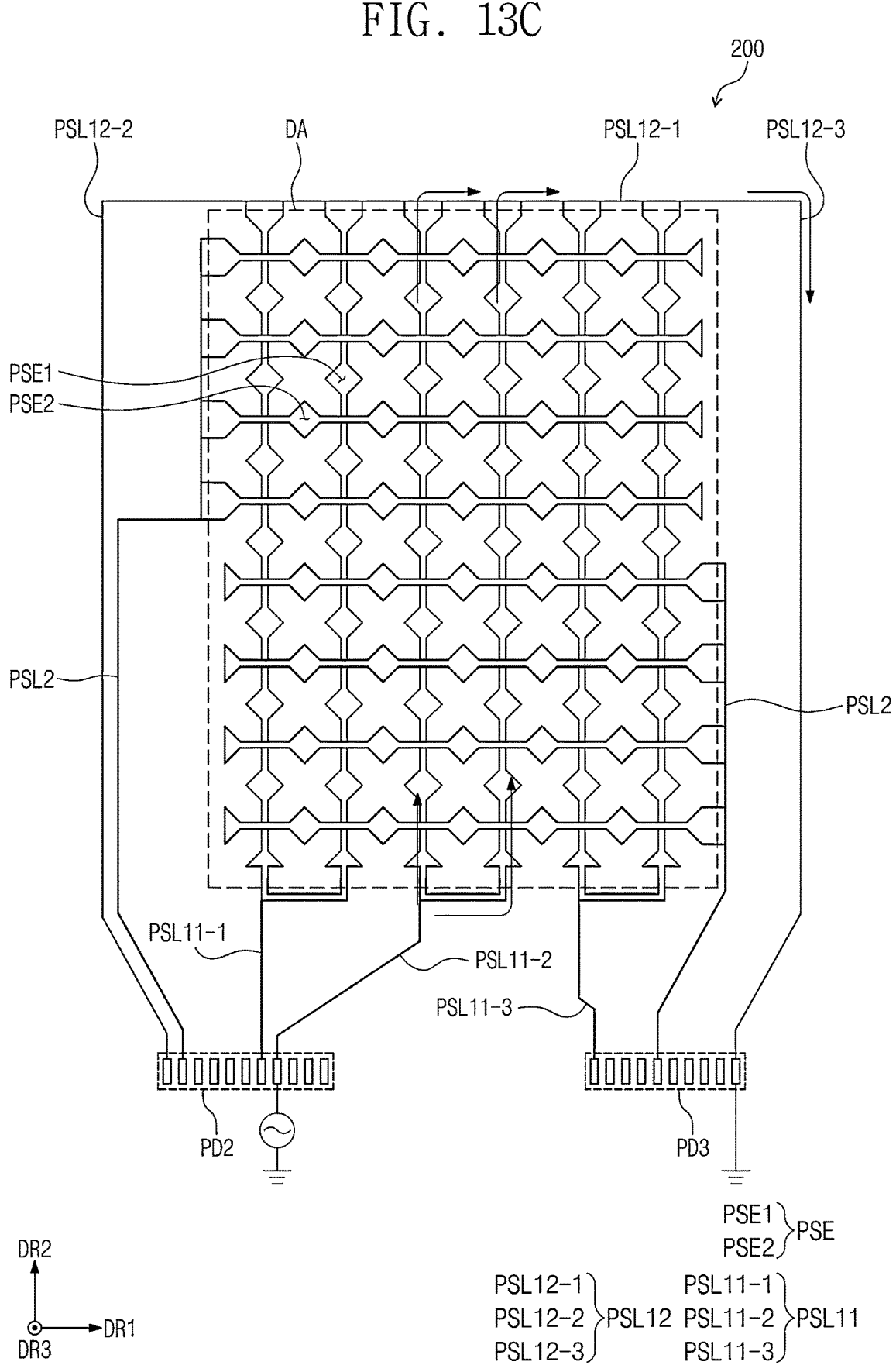
Figure 14:
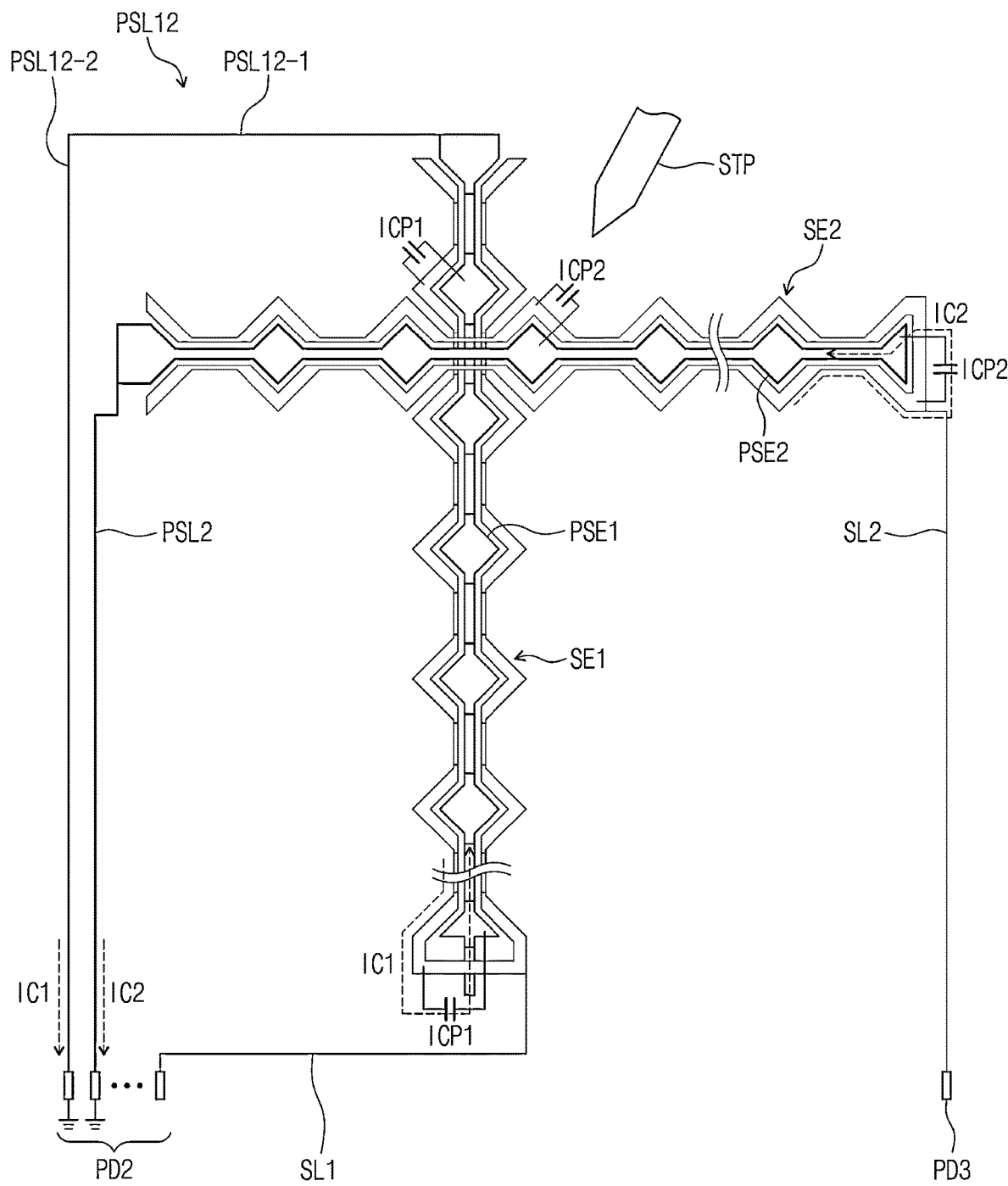
FIG. 14 is a plan view showing a sensing period in an operating period for a second group of electrodes depicted in FIG. 7.

FIGS. 13A to 13C are plan views showing a charging period in an operating period for the second group of electrodes PSE depicted in FIG. 7. FIG. 14 is a plan view showing a sensing period in an operating period for the second group of electrodes PSE depicted in FIG. 7.

During a charging period in the second operating period, the first group of electrodes SE depicted in FIG. 7 might not participate in an operation of the input sensor 200. For example, no driving signal may be provided to the first group of electrodes SE. For brevity of drawing, FIGS. 13A to 13C omit an illustration of the first group of electrodes SE depicted in FIG. 7 but it may be part of the apparatus as shown in FIGS. 13A to 13C. In FIGS. 13A to 13C, for convenience of description, among three $1$-$1^{st}$ signal lines PSL11 of the second group, a left-side $1$-$1^{st}$ signal line PSL11 may be defined as a first signal line PSL11-1, a middle-side $1$-$1^{st}$ signal line PSL11 may be defined as a second signal line PSL11-2, and a right-side $1$-$1^{st}$ signal line PSL11 may be defined as a third signal line PSL11-3.

During the charging period, the second group of $1$-$2^{nd}$ signal line PSL12 may receive a ground voltage or a driving signal from at least one of the second and third pads PD2 and PD3. Among the first signal line PSL11-1, the second signal line PSL11-2, and the third signal line PSL11-3, one may be selected and another may be non-selected. A selected signal line may receive a driving signal or a ground voltage. The first electrode of second group PSE1 connected to the selected signal line may also receive the driving signal or the ground voltage. A non-selected signal line may be floated. The second group of $1$-$2^{nd}$ signal line PSL12, the first electrode of second groups PSE1, and some of the second group of $1$-$1^{st}$ signal lines PSL11 may be selected to form a current path on a coil or to define a coil.

Referring to FIG. 13A, during a first interval in the charging period, the driving circuit of the input sensor 200 may select the second pad PD2 connected to the second group of $1$-$2^{nd}$ signal line PSL12 and the second pad PD2 connected to the second signal line PSL11-2. The driving circuit of the input sensor 200 may apply a driving signal to the second pad PD2 connected to the second group of $1$-$2^{nd}$ signal line PSL12, and may apply a ground voltage to the second pad PD2 connected to the second signal line PSL11-2. In this stage, the first signal line PSL11-1 and the third signal line PSL11-3 may be floated.

A coil-shaped current path may be defined by the second group of $1$-$2^{nd}$ signal line PSL12, the first electrode of second group PSE1 that is intermediately positioned, and the second signal line PSL11-2. The coil-shaped current path may generate a magnetic field.

Referring to FIG. 13B, during a second interval in the charging period, the driving circuit of the input sensor 200 may select the second pad PD2 connected to the first signal line PSL11-1 and the third pad PD3 connected to the third signal line PSL11-3. The driving circuit of the input sensor 200 may apply a driving signal to the second pad PD2 connected to the first signal line PSL11-1, and may apply a ground voltage to the third pad PD3 connected to the third signal line PSL11-3. A coil-shaped current path may be defined by the first signal line PSL11-1, the first electrode of second group PSE1 that is leftwardly positioned, the second group of $1$-$2^{nd}$ signal line PSL12, the first electrode of second groups PSE1 that is rightwardly positioned, and the third signal line PSL11-3.

Referring to FIG. 13C, during a third interval in the charging period, the driving circuit of the input sensor 200 may select the second pad PD2 connected to the second signal line PSL11-2 and the third pad PD3 connected to the second group of $1$-$2^{nd}$ signal line PSL12. The driving circuit of the input sensor 200 may apply a driving signal to the second pad PD2 connected to the second signal line PSL11-2, and may apply a ground voltage to the third pad PD3 connected to the second group of $1$-$2^{nd}$ signal line PSL12. A coil-shaped current path may be defined by the second signal line PSL11-2, the first electrode of second groups PSE1 that is intermediately positioned, and the second group of $1$-$2^{nd}$ signal line PSL12.

During the charging period discussed in FIGS. 13A to 13C, a constant voltage may be applied through the second group of second signal lines PSL2 to the second electrode of second groups PSE2. The driving sequence in the charging period discussed in FIGS. 13A to 13C is merely by way of example and is not always limited thereto. The sequence of the first to third intervals may be changed. In addition, two most adjacent ones among the first electrode of second groups PSE1 may define a portion of a coil-shaped current path.

Referring to FIG. 13B, during the second interval in the charging period, a resonance circuit of the stylus pen STP may be charged. The resonance circuit of the stylus pen STP on the first electrode of second group PSE that is intermediately positioned may receive a magnetic field generated in the current path discussed with reference to FIG. 13B. The resonance circuit of the stylus pen STP may resonate with a signal received through a change in magnetic field at the current path discussed with reference to FIG. 13B. The resonance circuit of the stylus pen STP may include an inductor L and a capacitor C connected to the inductor L. The inductor L and the capacitor C may form an LC resonance circuit. The capacitor C may be a variable capacitor whose capacitance is changeable.

FIG. 14 illustrates a sensing period in the second operating period. FIG. 14 depicts one first electrode of first group SE1 and one first electrode of second group PSE1 where an induced current is regenerated resulting from a magnetic field signal that is output from the stylus pen STP. The magnetic field signal that is output from the stylus pen STP may also generate an induced current on one second electrode of first group SE2 and one second electrode of second group PSE2 depicted in FIG. 14.

Referring to FIGS. 7 and 14, during the sensing period after the charging period, the sensing circuit of the input sensor 200 may ground the second group of 1-$2^{nd}$ signal line PSL12 and the second ground of second signal line PSL2. Referring to FIG. 14, a ground voltage may be applied to the second pad PD2 connected to the second group of 1-$2^{nd}$ signal line PSL12, and a ground voltage may be applied to the second pad PD2 connected to the second group of second signal line PSL2 disposed on the left region. A magnetic field may be generated while the resonance circuit of the stylus pen STP is discharged. The magnetic field released from the stylus pen STP may generate an induced current on the input sensor 200 inductively coupled to the resonance circuit of the stylus pen STP.

A first capacitor ICP1 may be defined between the first electrode of first group SE1 and the first electrode of second group PSE1, and a second capacitor ICP2 may be defined between the second electrode of first group SE2 and the second electrode of second group PSE2. As the second group of 1-$2^{nd}$ signal line PSL12 is grounded, a first induced current IC1 may flow from the first electrode of first group SE1 through the first capacitor ICP1 to the first electrode of second group PSEL. In addition, as the second group of second signal line PSL2 is grounded, a second induced current IC2 may flow from the second electrode of first group SE2 through the second capacitor ICP2 to the second electrode of second group PSE2. The sensing circuit of the input sensor 200 may use the first signal line of first group SL1 and its connected second pad PD2 to detect the first induced current IC1, and may use the second signal line of first group SL2 and its connected third pad PD3 to detect the second induced current IC2, thereby recognizing the input by the stylus pen STP.

Figure 15A:
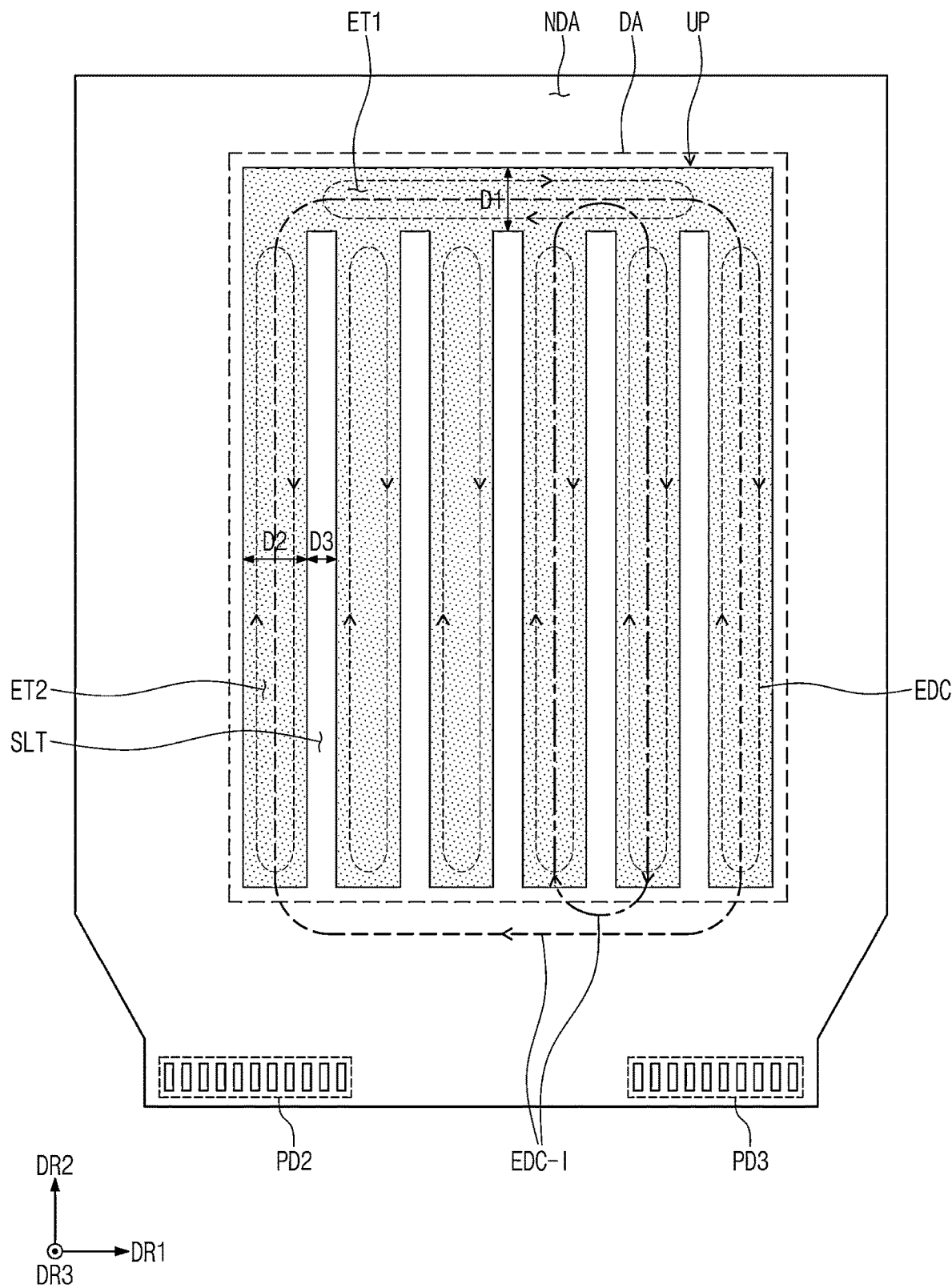
FIGS. 15A and 15B are plan views showing a unit pattern of a conductive layer depicted in FIG. 3.
Figure 15B:
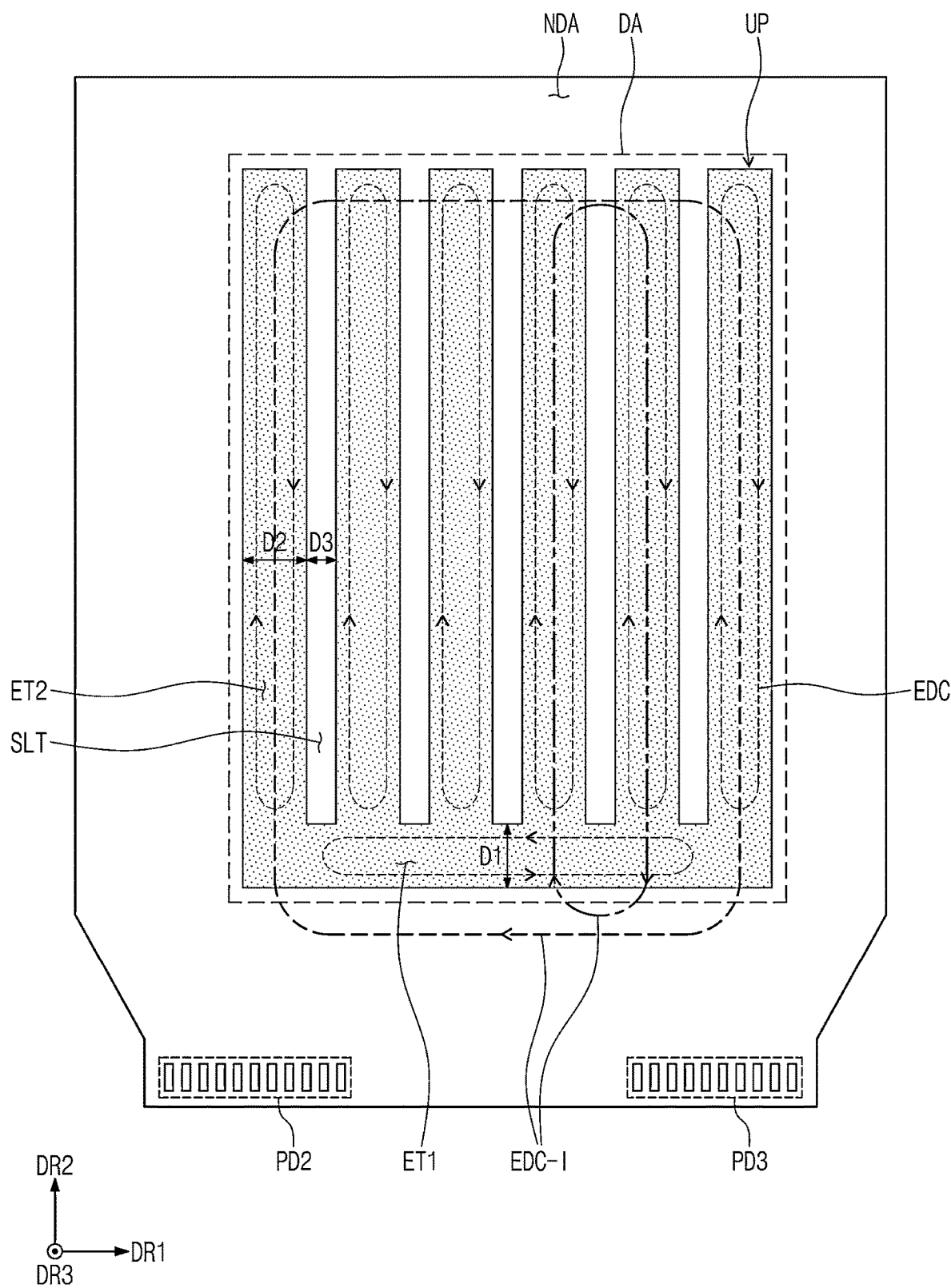
Figure 16:
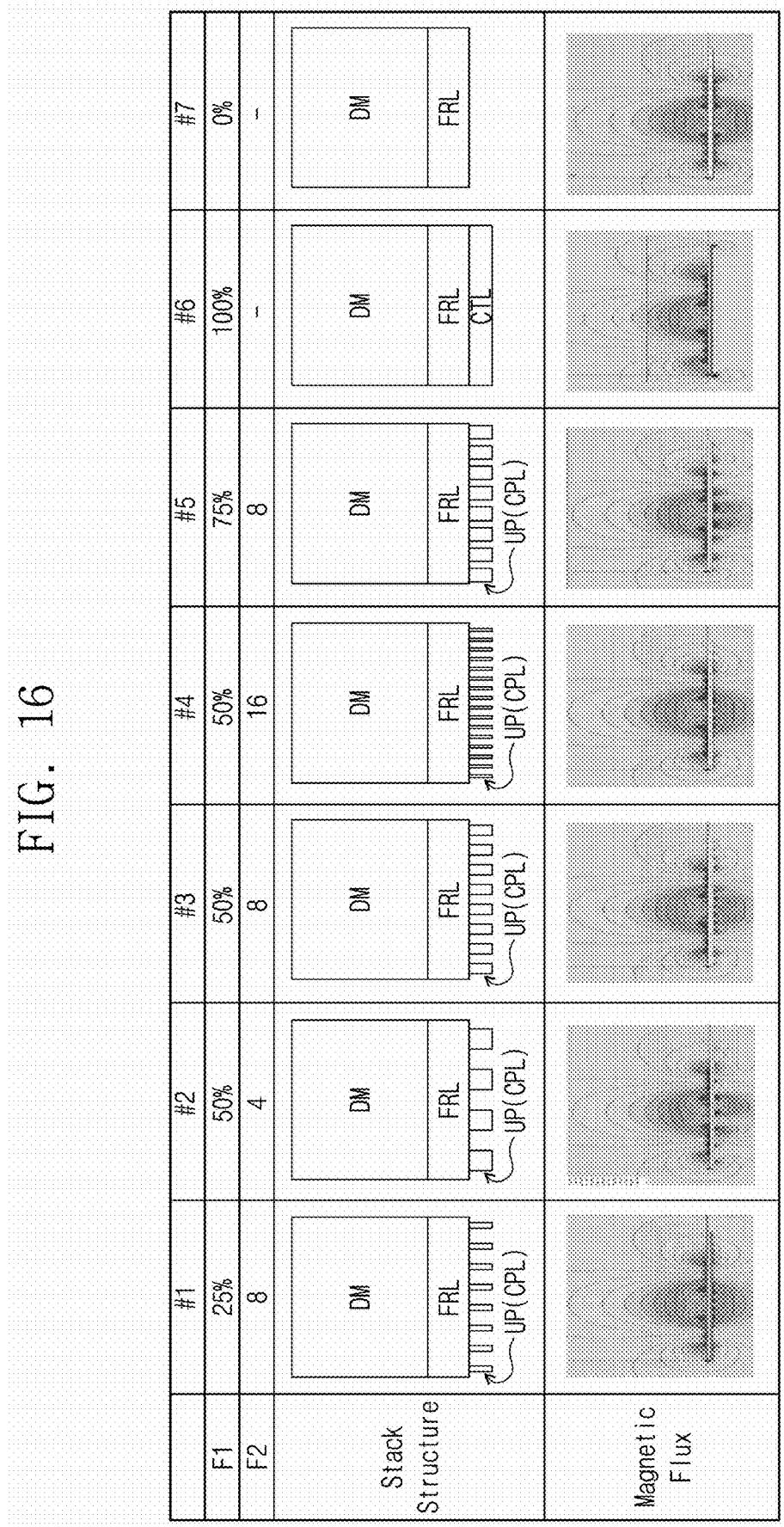
FIG. 16 is a diagram showing a variation in magnetic flux in accordance with a change of a conductive layer.

FIGS. 15A and 15B are plan views showing a unit pattern UP of the conductive layer CTL depicted in FIG. 3. FIG. 16 is a variation in magnetic flux in accordance with a change in the conductive layer CTL.

The display module DM discussed with reference to FIG. 3 may include the input sensor 200 discussed with reference to FIGS. 7 to 14. The conductive layer CTL discussed with reference to FIG. 3 may produce the thermal radiation effect and the noise shield effect that are described above, but may induce the occurrence of eddy current during the second operating period (e.g., the charging period of FIGS. 13A to 13C) discussed with reference to FIGS. 13A to 14. An eddy current may be a loop of electrical current electromagnetically induced in a second conductor adjacent to a first conductor when a magnetic field applied to the first conductor is changed over time. The second conductor may be provided with an eddy current whose flow direction is opposite to that of current applied to the first conductor. Therefore, the second conductor may be given with a magnetic field opposite to that induced in the first conductor, and as a result, the magnetic field induced in the first conductor decrease in intensity.

Referring to FIGS. 3, 7, and 13A to 13C, during the charging period in the second operating period, a coil-shaped current path may be formed in the input sensor 200, and this may produce a magnetic field to resonate the resonance circuit of the stylus pen STP. In this case, an eddy current may be generated in the conductive layer CTL discussed with reference to FIG. 3, and this may reduce an intensity of the magnetic field generated in the input sensor 200.

The unit pattern UP shown in FIGS. 15A and 15B may decrease an eddy current produced in the conductive layer CTL. It may thus be possible to suppress a reduction in magnetic field generated in the input sensor 200. The unit pattern UP will be further discussed in detail below with reference to FIGS. 15A and 15B.

The unit pattern UP may overlap at least the display region DA. The unit pattern UP may shield an electromagnetic wave that is generated from the electronic module EM of FIG. 2 and affects the display region 100-DA of the display panel 100. In addition, as the unit pattern UP overlaps the display region DA whose area is relatively large, the unit pattern UP may have an increased area to increase the noise shield effect and the thermal radiation effect. In an embodiment of the present invention, the unit pattern UP may further overlap the non-display region NDA.

The unit pattern UP may include a first extension part ET1 and a plurality of second extension parts ET2. The first extension part ET1 may have a shape that extends in a certain direction. FIGS. 15A and 15B depict by way of example the first extension part ET1 that extends in the first direction DR1 and has a uniform width.

The plurality of second extension parts ET2 may extend from the first extension part ET1 in a direction intersecting the first extension part ET1. FIGS. 15A and 15B depict by way of example the second extension parts ET2 each of which extends in the second direction DR2 and has a uniform width. The plurality of second extension parts ET2 may be disposed in the second direction DR2 on one side of the first extension part ET1.

The first extension part ET1 is illustrated to have a uniform width, but the width of the first extension part ET1 might not be uniform. The first extension part ET1 may have a width D1 that is equal to or less than about 8 mm. The second extension parts ET2 are illustrated to each have a uniform width, but the width of the second extension part ET2 might not be uniform. The second extension parts ET2 may each have a width D2 that is equal to or less than about 8 mm. The widths D2 of the second extension parts ET2 may be the same as each other, but the present invention is not necessarily limited thereto.

A certain spacing D3 may be provided between two adjacent ones of the second extension parts ET2. The spacing D3 between two second extension parts ET2 may be less than the width D2 of the second extension part ET2. The spacing D3 between two second extension parts ET2 may be equal to or less than about 1 mm. A reduction in the spacing D3 may cause an increase in the thermal radiation effect and the noise shield effect.

It is explained that the unit pattern UP includes the first extension part ET1 and a plurality of second extension parts ET2, but it may be explained that the unit pattern UP includes a plurality of slits SLT defined therein. The plurality of slits SLT may extend in a direction that is the same as that of the second extension part ET2, but the shape of the slit SLT is not necessarily limited to a straight line.

In the present embodiment, the plurality of slits SLT may extend in the second direction DR2 and may be spaced apart from each other in the first direction DR1. Each of the plurality of slits SLT may be connected to an outside of the unit pattern UP. For example, in a plan view, each of the plurality of slits SLT may be inwardly continuous from an outside of the unit pattern UP.

The unit pattern UP may decrease an area of a continuous or flat region to reduce an eddy current. As shown in FIGS. 15A and 15B, an eddy current EDC may be formed having a loop shape on the first extension part ET1 and each of the second extension parts ET2. One sides of the plurality of second extension parts ET2 may be connected to the first extension part ET1, which configuration may maintain the thermal radiation effect and the noise shield effect. The plurality of second extension parts ET2 and the first extension part ET1 may be connected to have a unitary shape, such that heat migration may become activated and the unit pattern UP may be grounded at many points to the electronic apparatus (see ED of FIG. 2).

One sides of the plurality of second extension parts ET2 may be separated to suppress the creation of a large-loop eddy current such as an imaginary eddy current EDC-I. To strengthen the above effects, the plurality of slits SLT may each have a length that is equal to or greater than about 80% of a length in the second direction DR2 of the unit pattern UP.

The unit pattern UP may provide the same effect to an input sensor that is driven by electromagnetic induction different from that of the input sensor 200 discussed with reference to FIGS. 7 to 14. For example, the effect mentioned above may be achieved by the unit pattern UP disposed below an input sensor including a coil pattern or a pattern to generate an induced current. According an embodiment of the present invention, the display panel 100 may be disposed thereon with a digitizer which replaces the input sensor 200 discussed with reference to FIGS. 7 to 14 or which is regardless of the input sensor 200 discussed with reference to FIGS. 7 to 14. The digitizer may include the coil pattern. The digitizer may include first coil patterns and second coil patterns that dielectrically intersect each other. The unit pattern UP may mitigate a reduction in magnetic field generated from the coil pattern when the digitizer is operated.

Referring to FIG. 16, magnetic fluxes are compared in accordance with first factors F1 and second factors F2 in first to fifth Embodiment Examples #1 to #5 according to the present invention and first and second Comparative Examples #6 and #7. The first factor F1 indicates an area where the unit pattern UP or the conductive layer CTL overlaps the display region DA depicted in FIGS. 15A and 15B, and the second factor F2 indicates the number of the second extension parts ET2. Stack structures of the first to fifth Embodiment Examples #1 to #5 and the first and second Comparative Examples #6 and #7 are substantially the same as each other, and the conductive layer CTL is omitted from the second Comparative Example #7.

Table 1 below lists magnetic fluxes measured in the first to fifth Embodiment Examples #1 to #5 and the first and second Comparative Examples #6 and #7. Table 1 shows simulation values measured at a height of about 10 mm from a window of a display device including the stack structure of FIG. 16. Table 1 contains measured magnetic fluxes of magnetic fields generated in the input sensor 200 disposed in the display module DM during the charging period discussed with reference to FIGS. 13A to 13C.

TABLE 1

|  | #1 | #2 | #3 | #4 | #5 | #6 | #7 |
|---|---|---|---|---|---|---|---|
| Magnetic flux (Tesla) | $1.88 \times 10^{-6}$ | $1.81 \times 10^{-6}$ | $1.85 \times 10^{-6}$ | $1.87 \times 10^{-6}$ | $1.79 \times 10^{-6}$ | $8.64 \times 10^{-7}$ | $1.88 \times 10^{-6}$ |

In comparison of the first to fifth Embodiment Examples #1 to #5 with the first Comparative Example #6, as the conductive layer CTL has the same shape as that of the unit pattern UP discussed with reference to FIGS. 15A and 15B, it is ascertained that the magnetic flux is increased to about 2.12 times. Referring to the second to fourth Embodiment Examples #2 to #4, in the unit pattern UP with the same area, an increase in the number of the second extension parts ET2 (or the number of the slits SLT) is accompanied by an increase in magnetic flux. It is ascertained that an increase in the number of the second extension parts ET2 causes a reduction in eddy current generated in the unit pattern UP. A position of the first extension part ET1 relative to the second and third pads PD2 and PD3 is different between the unit pattern UP of FIG. 15A and the unit pattern UP of FIG. 15B. The first extension part ET1 of the unit pattern UP in FIG. 15B is positioned close to the second and third pads PD2 and PD3. For example, the first extension part ET1 of the unit pattern UP is disposed adjacent to an end of the first electrode of second group PSE1 connected to the second group of $1\text{-}1^{st}$ signal line PSL11 depicted in FIG. 7. FIG. 15B omits an illustration of the first electrode of second group PSE1, but as shown in FIGS. 7 and 15B, the first extension part ET1 of the unit pattern UP may overlap an end of the first electrode of second group PSEL. As a result of the simulation, a greater magnetic flux is measured in a display device including the unit pattern UP of FIG. 15B than in a display device including the unit pattern UP of FIG. 15A.

Figure 17:
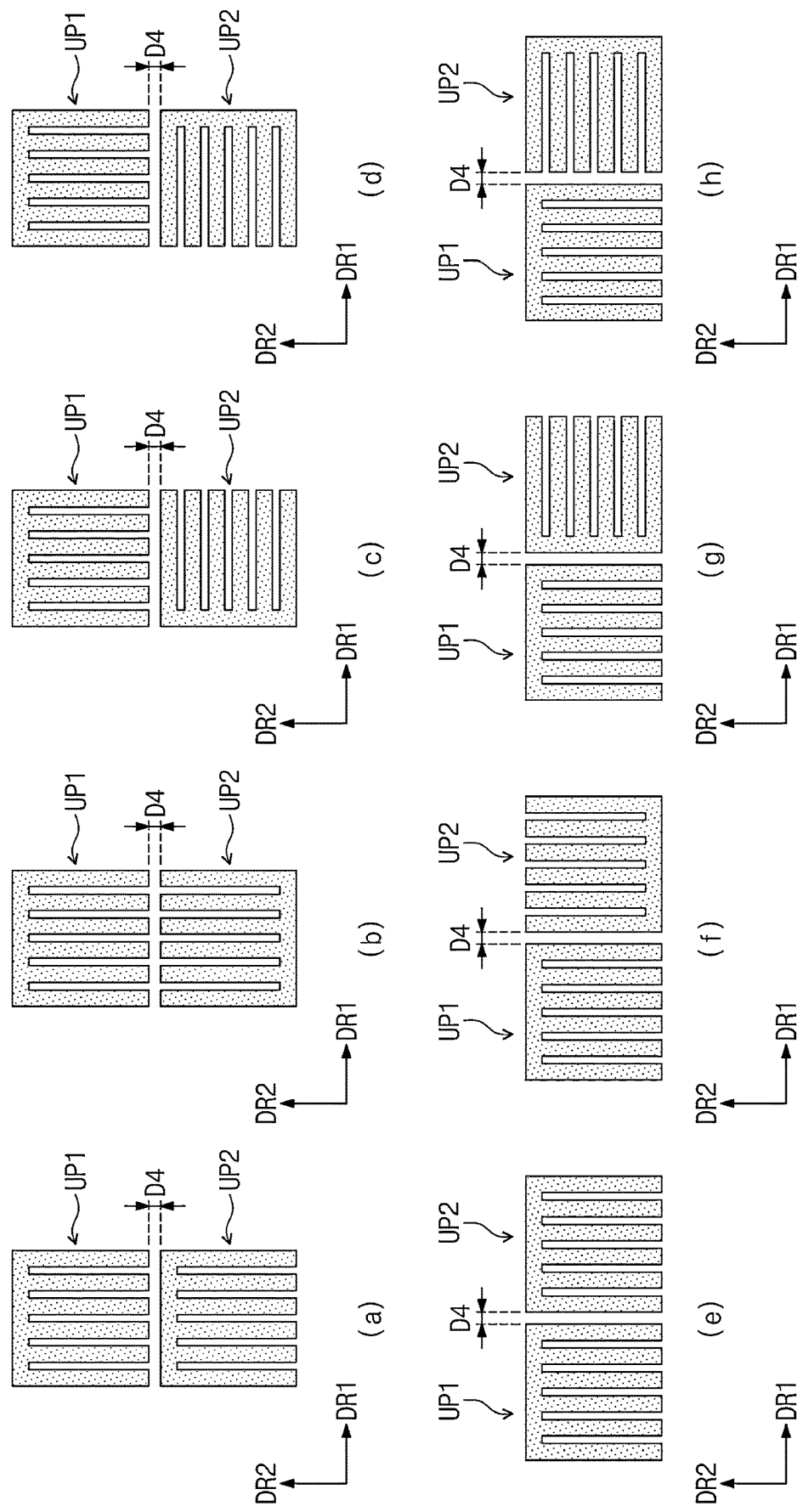
FIG. 17 is a plan view showing an arrangement relationship between a first unit pattern and a second unit pattern according to an embodiment of the present invention.
Figure 18:
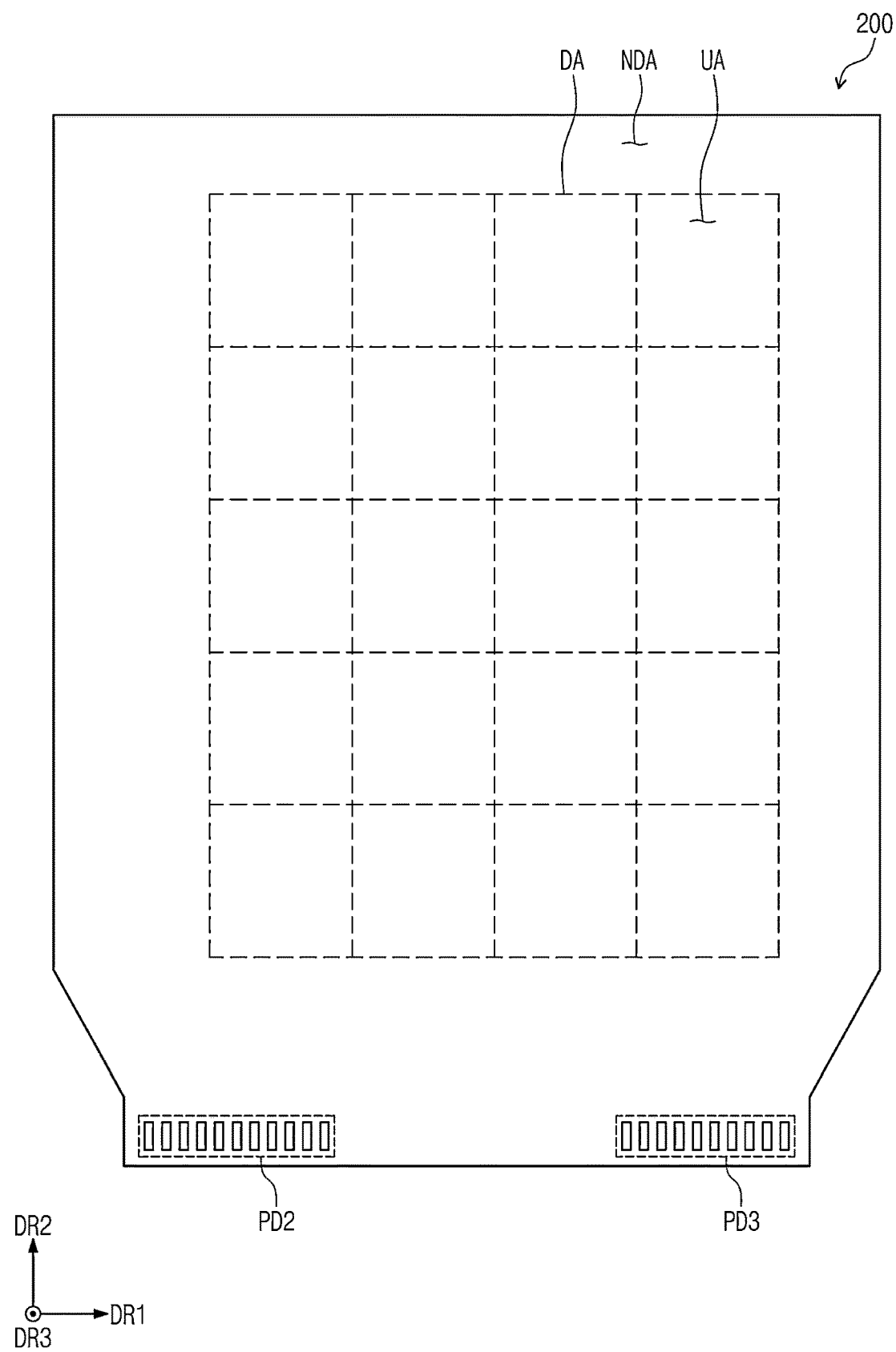
FIG. 18 is a plan view showing unit regions of an input sensor according to an embodiment of the present invention.

FIG. 17 is a plan view showing an arrangement relationship between a first unit pattern UP1 and a second unit pattern UP2 according to an embodiment of the present invention. FIG. 18 is a plan view showing unit regions UA of the input sensor 200 according to an embodiment of the present invention.

According to the present embodiment, the conductive layer CTL discussed with reference to FIG. 3 may include a first unit pattern UP1 and a second unit pattern UP2. The first unit pattern UP1 may be substantially the same as the unit pattern UP depicted in FIG. 15A.

According to embodiments (a) to (d), the second unit pattern UP2 may be spaced apart in the second direction DR2 at a certain spacing D4 from the first unit pattern UP1. According to embodiments (e) to (h), the second unit pattern UP2 may be spaced apart in the first direction DR1 at the certain spacing D4 from the first unit pattern UP1. The spacing D4 may be equal to or less than about 1 mm. The second unit pattern UP2 may have a shape the same as that of the first unit pattern UP1, or in a plan view, the second unit pattern UP2 may have a shape obtained by rotating the shape of the first unit pattern UP1.

Referring to FIG. 18, the input sensor 200 may include a plurality of unit regions UA. The plurality of unit regions UA may be arranged in a matrix shape. The unit pattern UP of FIG. 15A or FIG. 15B may be disposed on every one of the plurality of unit regions UA. In an embodiment of the present invention, the first unit pattern UP1 and the second unit pattern UP2 according to one of the embodiments (a) to (h) of FIG. 17 may be disposed on every one of the plurality of unit regions UA. The present invention is not necessarily limited to an example in which the same unit pattern is disposed on the plurality of unit regions UA.

Figure 19:
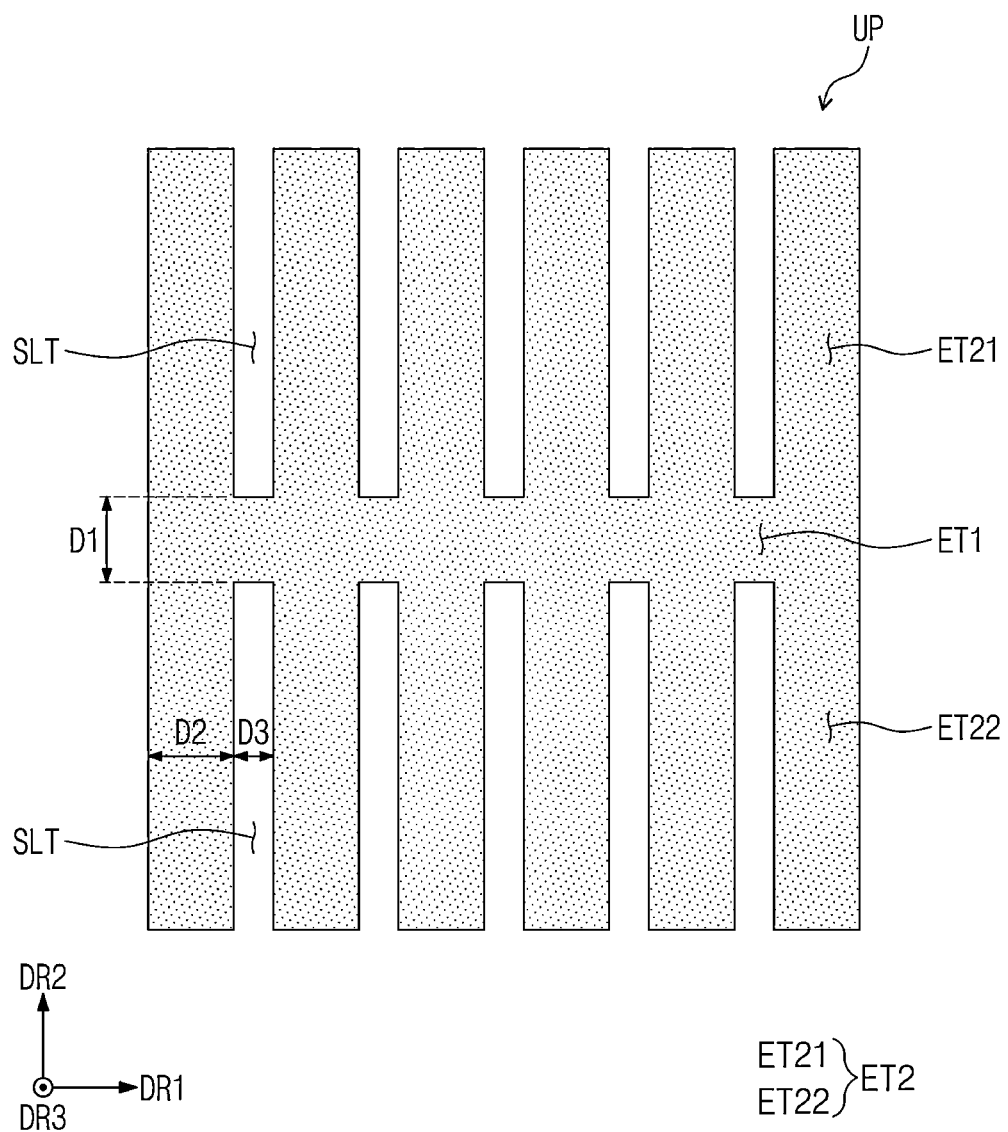
FIG. 19 is a plan view showing a unit pattern according to an embodiment of the present invention.
Figure 20:
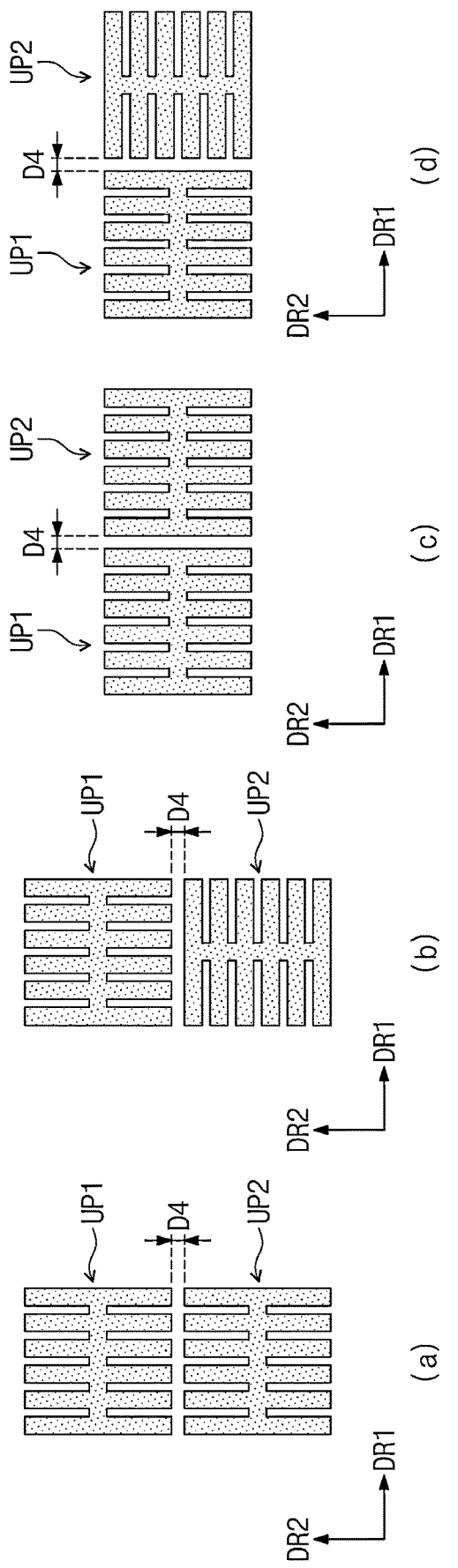
FIG. 20 is a plan view showing an arrangement relationship between a first unit pattern and a second unit pattern according to an embodiment of the present invention.

FIG. 19 is a plan view showing a unit pattern UP according to an embodiment of the present invention. FIG. 20 is a plan view showing an arrangement relationship between a first unit pattern UP1 and a second unit pattern UP2 according to an embodiment of the present invention.

In the embodiments that follow, the description of FIGS. 15A to 17 will be true of components the same as those discussed with reference to FIGS. 15A to 17.

According to the present embodiment, the unit pattern UP may include a first extension part ET1 and a plurality of second extension parts ET2. The first extension part ET1 may have a shape extending in a certain direction.

The plurality of second extension parts ET2 may extend from the first extension part ET1 in a direction intersecting the first extension part ET1. The plurality of second extension parts ET2 may include second extension parts ET21 (referred to hereinafter as first group of second extension parts) that are disposed in the second direction DR2 on one side of the first extension part ET1. The plurality of second extension parts ET2 may include second extension parts ET22 (referred to hereinafter as second group of second extension parts) that are disposed in the second direction DR2 on another side of the first extension part ET1. The first extension part ET1 may be disposed between the first group of second extension parts ET21 and the second group of second extension parts ET22.

The expression "the first group of second extension parts ET21 and the second group of second extension parts ET22" may be used to distinguish from each other the second extension parts ET2 disposed on different sides of the first extension part ET1. When the first group of second extensions parts ET21 are defined as second extension parts, the second group of second extension parts ET22 may be defined as third extension parts.

A sum of a length of a slit SLT between the first group of second extension parts ET21 and a length of a slit SLT between the second group of second extension parts ET22, or a sum of lengths of two slits SLT, may be equal to or greater than about 80% of a length in the second direction DR2 of the unit pattern UP.

According to embodiments (a) and (b) of FIG. 20, the second unit pattern UP2 may be spaced apart in the second direction DR2 at a certain spacing D4 from the first unit pattern UP1. According to embodiments (c) and (d) of FIG. 20, the second unit pattern UP2 may be spaced apart in the first direction DR1 at the certain spacing D4 from the first unit pattern UP1. The spacing D4 may be equal to or less than about 1 mm. The second unit pattern UP2 may have a shape the same as that of the first unit pattern UP1, or in a plan view, the second unit pattern UP2 may have a shape obtained by rotating the shape of the first unit pattern UP1. The unit pattern UP of FIG. 19 may be disposed on every one of the plurality of unit regions UA discussed with reference to FIG. 18, or according to the embodiments (a) to (d) of FIG. 20, the first unit pattern UP1 and the second unit pattern UP2 may be disposed on every one of the plurality of unit regions UA discussed with reference to FIG. 18.

Figure 21A:
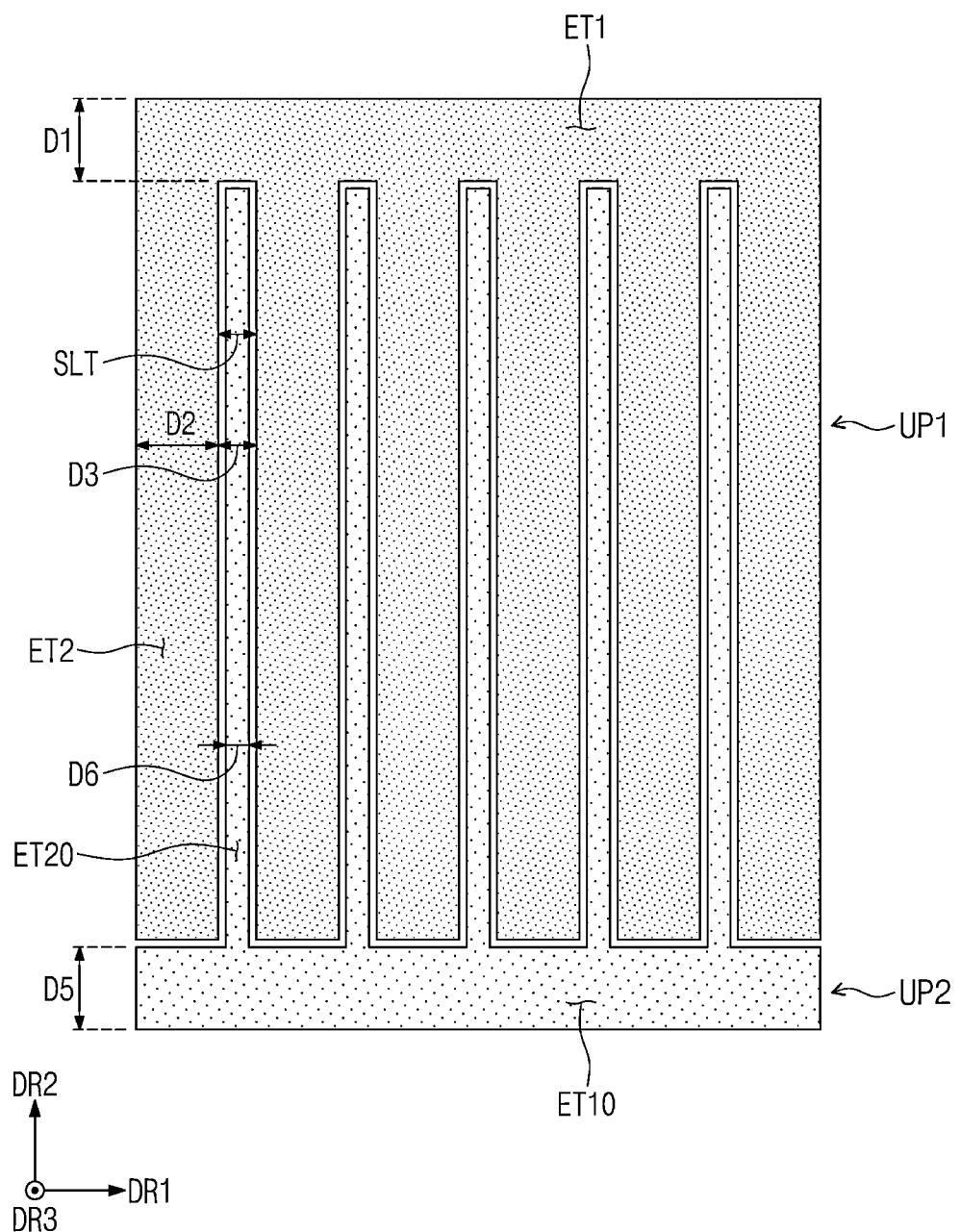
FIG. 21A is a plan view showing an arrangement relationship between a first unit pattern and a second unit pattern according to an embodiment of the present invention.
Figure 21B:
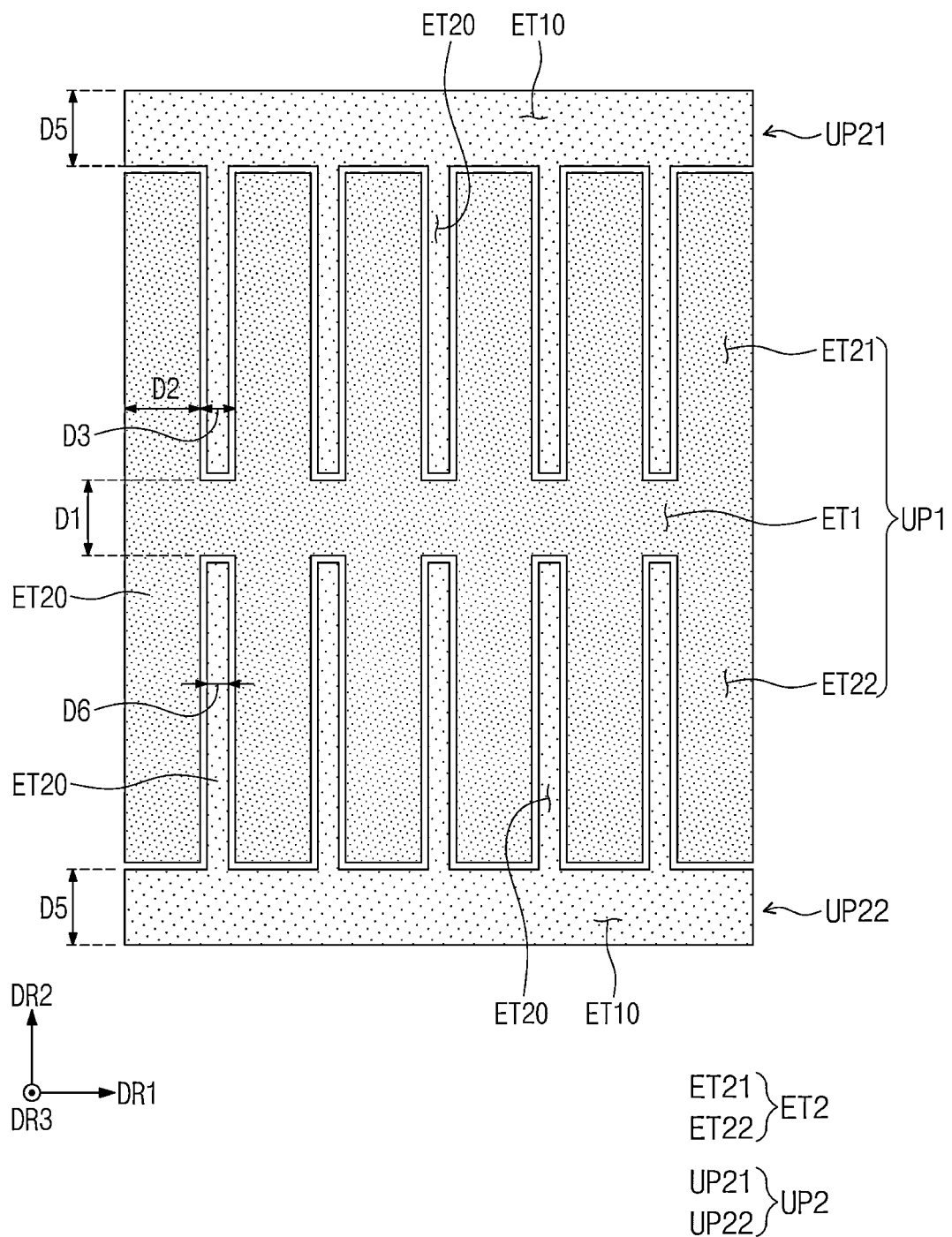
FIG. 21B is a plan view showing an arrangement relationship between a first unit pattern and a second unit pattern according to an embodiment of the present invention.

FIG. 21A is a plan view showing an arrangement relationship between a first unit pattern UP1 and a second unit pattern UP2 according to an embodiment of the present invention. FIG. 21B is a plan view showing an arrangement relationship between a first unit pattern UP1 and a second unit pattern UP2 according to an embodiment of the present invention. In the embodiments that follow, the description of FIGS. 15A to 20 will be true of components the same as those discussed with reference to FIGS. 15A to 20.

Referring to FIG. 21A, the conductive layer CTL discussed with reference to FIG. 3 may include a first unit pattern UP1 and a second unit pattern UP2. The first unit pattern UP1 may be substantially the same as the unit pattern UP depicted in FIG. 15A.

The second unit pattern UP2 may be spaced apart from the first unit pattern UP1. The second unit pattern UP2 may include a first extension part ET10 and a plurality of second extension parts ET20. The first extension part ET10 may have a shape extending in a certain direction. The first extension part ET10 may extend in a direction along which are arranged ends of the second extension parts ET2 included in the first unit pattern UP1. For example, the first extension part ET10 may face the ends of the second extension parts ET2 included in the first unit pattern UP1. FIG. 21A depicts by way of example the first extension part ET10 that extends in the first direction DR1 and has a uniform width D5.

The plurality of second extension parts ET20 may extend from the first extension part ET10 in a direction intersecting the first extension part ET10. FIG. 21A depicts by way of example the second extension parts ET20 each of which extends in the second direction DR2 and has a uniform width D6.

The plurality of second extension parts ET20 may be disposed in the second direction DR2 on one side of the first extension part ET10. The plurality of second extension parts ET20 may be disposed between the second extension parts ET2 of the first unit pattern UP1. For example, the plurality of second extension parts ET20 may be correspondingly disposed between a plurality of slits SLT of the first unit pattern UP1. Therefore, the width D6 of each of the plurality of second extension parts ET20 may be less than a width D3 of a corresponding one of the plurality of slits SLT. According to the present embodiment, as the plurality of second extension parts ET2 are disposed and the plurality of second extension parts ET20 are disposed, there may occur the effect of a reduction in eddy current, and as the plurality of second extension parts ET20 are disposed in the slits SLT, there may occur an increase in thermal radiation effect and noise shield effect.

Referring to FIG. 21B, the conductive layer CTL discussed with reference to FIG. 3 may include a first unit pattern UP1 and a second unit pattern UP2. The first unit pattern UP1 may be substantially the same as the unit pattern UP depicted in FIG. 19.

The second unit pattern UP2 may be spaced apart from the first unit pattern UP1. The second unit pattern UP2 may include a first sub-pattern UP21 and a second sub-pattern UP22. The first sub-pattern UP21 and the second sub-pattern UP22 may be spaced apart from each other in the second direction DR2, and the first unit pattern UP1 may be disposed between the first sub-pattern UP21 and the second sub-pattern UP22.

Each of the first sub-pattern UP21 and the second sub-pattern UP22 may include a first extension part ET10 and a plurality of second extension parts ET20. The first extension part ET10 may have a shape extending in a certain direction. FIG. 21B depicts by way of example the first extension part ET10 that extends in the first direction DR1 and has a uniform width D5. The first extension part ET10 of the first sub-pattern UP21 may face ends of the first group of second extension parts ET21, and the first extension part ET10 of the second sub-pattern UP22 may face ends of the second group of second extension parts ET22.

The plurality of second extension parts ET20 of each of the first sub-pattern UP21 and the second sub-pattern UP22 may extend from the first extension part ET10 in a direction intersecting the first extension part ET10. FIG. 21B depicts by way of example the second extension parts ET20 each of which extends in the second direction DR2 and has a uniform width D6.

The plurality of second extension parts ET20 of the first sub-pattern UP21 may be disposed between first group of second extension parts ET21. For example, the plurality of second extension parts ET20 of the first sub-pattern UP21 may be correspondingly disposed between a plurality of slits SLT defined between the first group of second extension parts ET21. The plurality of second extension parts ET20 of the second sub-pattern UP22 may be disposed between second group of second extension parts ET22. For example, the plurality of second extension parts ET20 of the second sub-pattern UP22 may be correspondingly disposed between a plurality of slits SLT defined between the second group of second extension parts ET22.

Figure 22A:
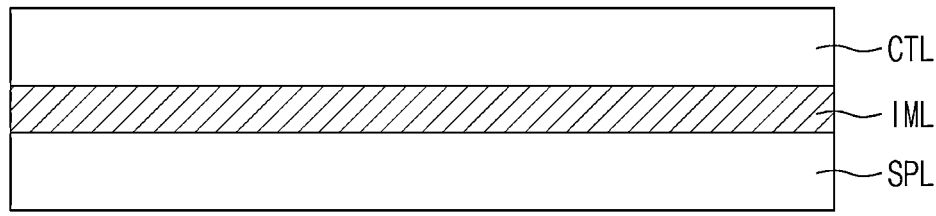
FIGS. 22A to 22C are cross-sectional views showing a stacking relationship between a conductive layer and a sub-conductive layer according to an embodiment of the present invention.
Figure 22B:
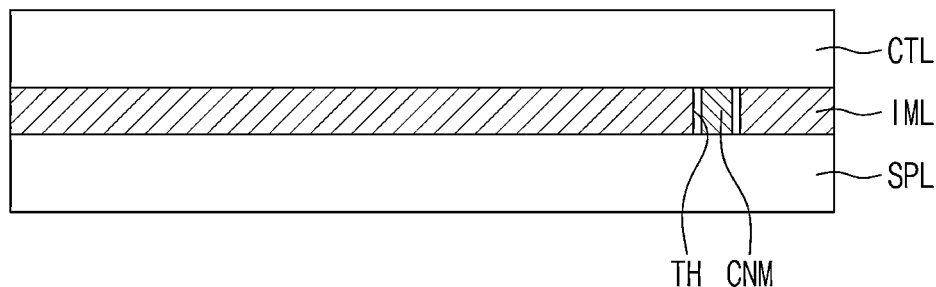
Figure 22C:
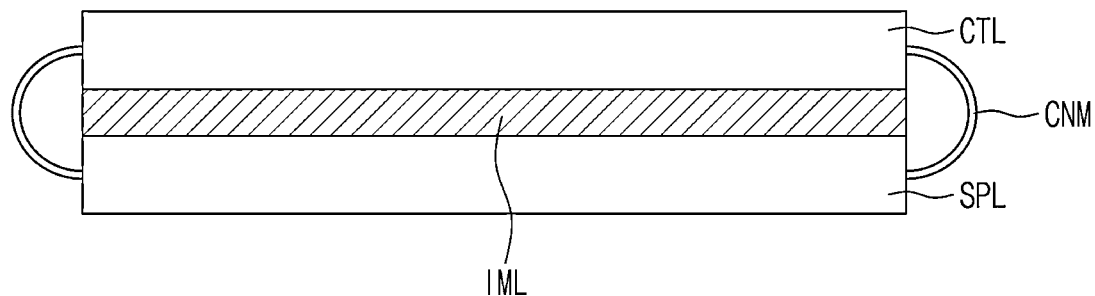

FIGS. 22A to 22C are cross-sectional views showing a stacking relationship between a conductive layer CTL and a sub-conductive layer SPL according to an embodiment of the present invention. FIGS. 22A to 22C depict a detailed stacking structure below the conductive layer CTL of FIG. 3. In the embodiments that follow, the description of FIGS. 15A to 20 will be true of components the same as those discussed with reference to FIGS. 3 to 21B.

Referring to FIGS. 3 and 22A, the display module DM may further include an intermediate layer IML disposed below the conductive layer CTL and the sub-conductive layer SPL disposed below the intermediate layer IML. The conductive layer CTL and the sub-conductive layer SPL may include either the unit pattern UP or the first and second unit patterns UP1 and UP2 discussed with reference to FIGS. 15A to 21B.

The intermediate layer IML may include one or both of a ferrite layer and an insulating layer. The ferrite layer may include a magnetic metal powder layer. The insulating layer may include a silicon dielectric material, such as silicon oxide or silicon nitride.

In an embodiment of the present invention, the conductive layer CTL may include the first unit pattern UP1 of FIGS. 21A and 21B, and the sub-conductive layer SPL may include the second unit pattern UP2 of FIGS. 21A and 21B. A planar arrangement relationship between the first unit pattern UP1 of the conductive layer CTL and the second unit pattern UP2 of the sub-conductive layer SPL may be the same as that discussed with reference to FIGS. 21A and 21B. Each of the first unit pattern UP1 of the conductive layer CTL and the second unit pattern UP2 of the sub-conductive layer SPL may be connected to a ground of the electronic apparatus (see ED of FIG. 2).

Referring to FIG. 22B, a through hole TH may be formed in the intermediate layer IML. A conductive connection member CNM may connect the conductive layer CTL and the sub-conductive layer SPL to each other via the through hole TH. For example, as discussed with reference to FIG. 22A, the conductive connection member CNM may connect the first unit pattern UP1 of the conductive layer CTL to the second unit pattern UP2 of the sub-conductive layer SPL. The conductive connection member CNM may be a protruding portion of the conductive layer CTL or the sub-conductive layer SPL, and may include an additional conductive material such as a metal pattern or a solder paste.

Referring to FIGS. 21A and 21B, the first unit pattern UP1 and the second unit pattern UP2 might not overlap each other in a plan view. To electrically connect the first unit pattern UP1 and the second unit pattern UP2 to each other through the conductive connection member CNM as shown in FIG. 22B, differently from the first unit pattern UP1 and the second unit pattern UP2 of FIGS. 21A and 21B, the first unit pattern UP1 and the second unit pattern UP2 may overlap each other on some region. For example, a rightmost second extension part ET2 of FIG. 21A may further extend to overlap the first extension part ET10. The through hole TH may be positioned on a region where the second extension part ET2 and the first extension part ET10 overlap each other.

Referring to FIG. 22C, the conductive connection member CNM may connect the conductive layer CTL and the sub-conductive layer SPL to each other. For example, as discussed with reference to FIG. 22A, the conductive connection member CNM may connect the first unit pattern UP1 of the conductive layer CTL to the second unit pattern UP2 of the sub-conductive layer SPL.

The conductive connection member CNM may be disposed outside the conductive layer CTL and the sub-conductive layer SPL, and may be provided in plural. The conductive connection member CNM may include a conductive wire or a flexible circuit board.

FIG. 23 is a variation in magnetic flux in accordance with changes of the conductive layer CTL and the sub-conductive layer SPL.

Referring to FIG. 23, magnetic fluxes are compared in accordance with first factors F1 and second factors F2 of first and second Embodiment Examples #1 and #2 according to the present invention and first and second Comparative Examples #3 and #4. The first factor F1 indicates an area where the conductive layer CTL and the sub-conductive layer SPL overlap the display region DA depicted in FIGS. 15A and 15B, and the second factor F2 indicates the number of the second extension parts ET2 of the first unit pattern UP1 and the number of the second extension parts ET20 of the second unit pattern UP2. The first and second Embodiment Examples #1 and #2 and the first and second Comparative Examples #3 and #4 include the same display module DM and the ferrite layer FRL below the display module DM.

The first Embodiment Example #1 is configured such that the conductive layer CTL and the sub-conductive layer SPL discussed with reference to FIG. 22A are disposed below the ferrite layer FRL. The ferrite layer FRL is disposed between the conductive layer CTL and the sub-conductive layer SPL. The second Embodiment Example #2 is configured such that the ferrite layer FRL is disposed thereunder with the conductive layer CTL and the sub-conductive layer SPL that are the same as those of the first Embodiment Example #1. Differently from the first Embodiment Example #1, the second Embodiment Example #2 is configured such that the ferrite layer FRL is replaced with a film disposed between the conductive layer CTL and the sub-conductive layer SPL. The film includes a dielectric material. Differently from the second Comparative Example #4, the first Comparative Example #3 is configured such that the ferrite layer FRI is disposed thereunder with the conductive layer CTL which is not patterned.

Table 2 below lists magnetic fluxes measured in the first and second Embodiment Examples #1 and #2 and the first and second Comparative Examples #3 and #4. Table 2 shows simulation values measured at a height of about 10 mm from a window of a display device including the stack structure of FIG. 23. Table 2 contains measured magnetic fluxes of magnetic fields generated in the input sensor 200 disposed in the display module DM during the charging period discussed with reference to FIGS. 13A to 13C.

TABLE 2

|  | #1 | #2 | #3 | #4 |
|---|---|---|---|---|
| Magnetic flux (Tesla) | $1.99 \times 10^{-6}$ | $1.80 \times 10^{-6}$ | $8.64 \times 10^{-7}$ | $1.88 \times 10^{-6}$ |

In comparison of the first and second Embodiment Examples #1 and #2 with the first Comparative Example #3, as discussed with reference to FIGS. 21A and 22A, as the conductive layer CTL includes the first unit pattern UP1 and the sub-conductive layer SPL includes the second unit pattern UP2, it is ascertained that the magnetic fluxes of the first and second Embodiment Examples #1 and #2 are respectively increased to about 2.30 times and about 2.08 times the magnetic flux of the first Comparative Example #3. The ferrite layer FRL has magnetic permeability greater than that of the film, such that the magnetic flux of the first Embodiment Example #1 is increased more than the magnetic flux of the second Embodiment Example #2.

FIGS. 24 to 27 are plan views showing a unit pattern UP according to an embodiment of the present invention. In the embodiments that follow, the description of FIGS. 15A to 17 will be true of components the same as those discussed with reference to FIGS. 15A to 23.

Figure 24:
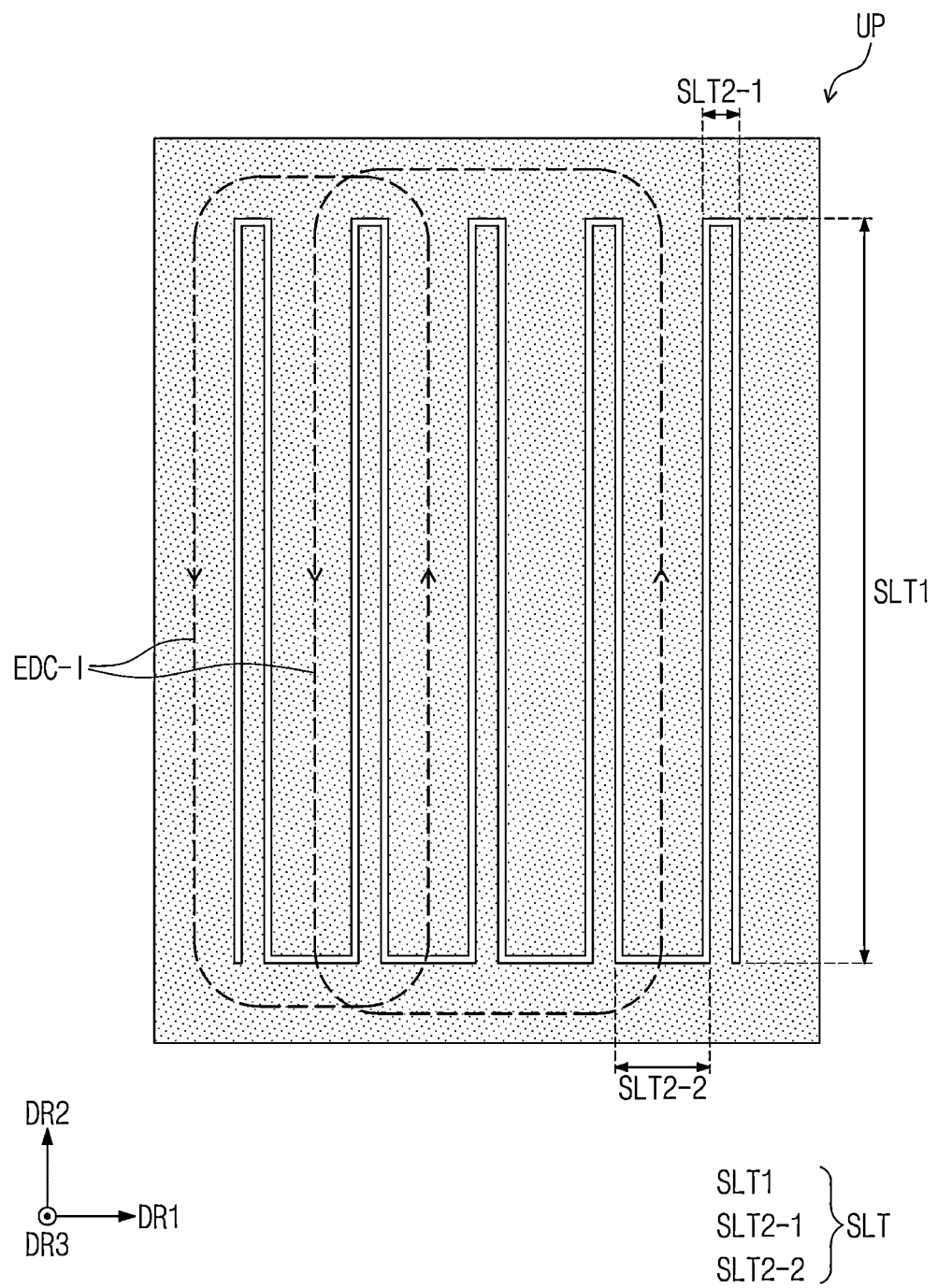
FIGS. 24 to 27 are plan views showing a unit pattern according to an embodiment of the present invention.
Figure 25:
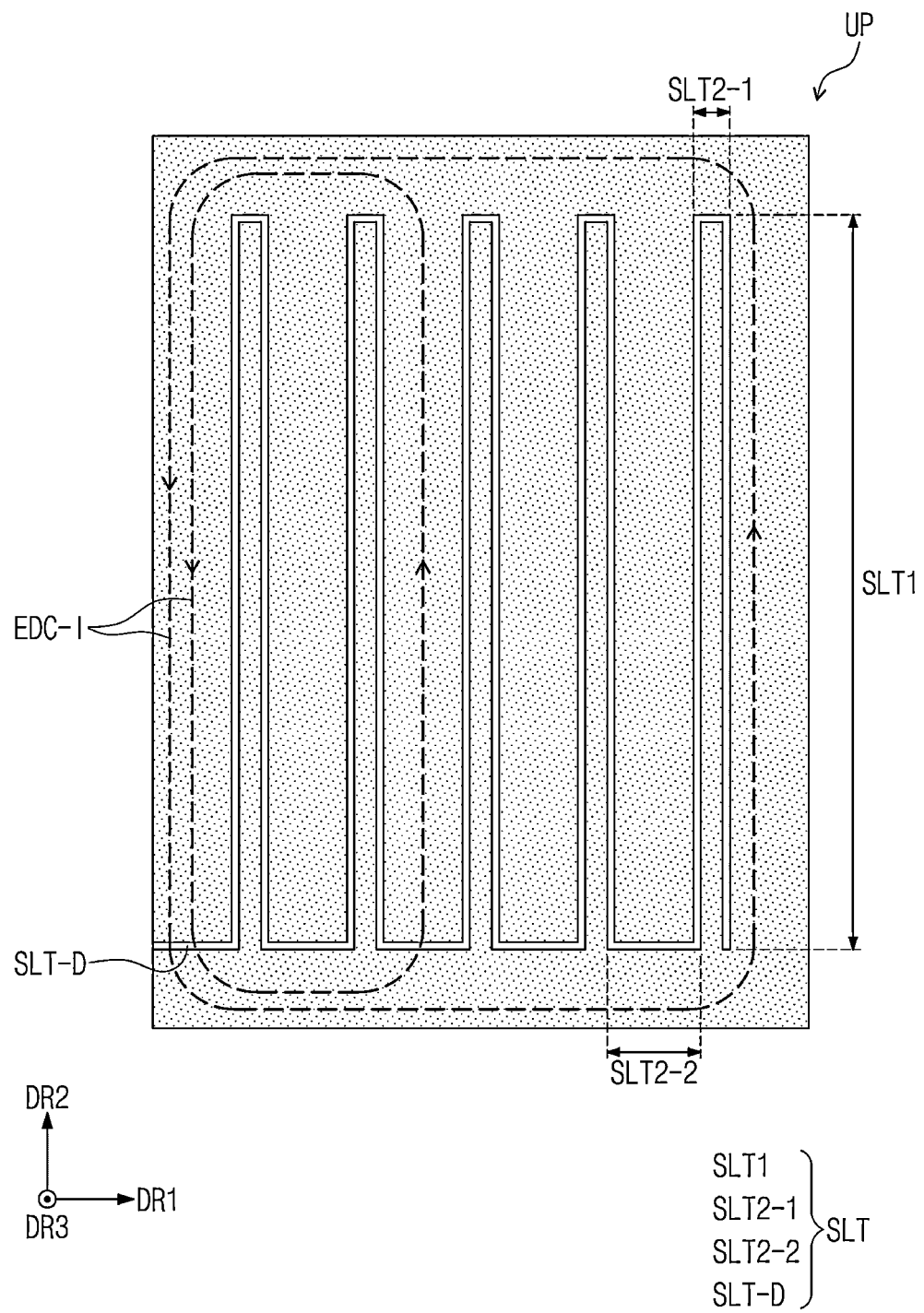

Referring to FIGS. 24 and 25, one slit SLT may be defined in the unit pattern UP. The slit SLT may include a plurality of first extension parts SLT1 that extend in the second direction DR2 and a plurality of second extension parts SLT2 that extend in the first direction DR1. The plurality of second extension parts SLT2 may include a plurality of $2-1^{st}$ extension parts SLT2-1 and a plurality of $2-2^{nd}$ extension parts SLT2-2. In an embodiment of the present invention, the plurality of first extension parts SLT1, the plurality of $2-1^{st}$ extension parts SLT2-1, and the plurality of $2-2^{nd}$ extension parts SLT2-2 may each be defined as a slit. For example, each of the plurality of first extension parts SLT1 may be defined as a first slit, and each of the plurality of $2-1^{st}$ and $2-2^{nd}$ extension parts SLT2-1 and SLT2-2 may be defined as a second slit. In addition, it may be explained that the plurality of slits define one continuous slit.

The plurality of first extension parts SLT1 may be spaced apart from each other along the first direction DR1. The plurality of first extension parts SLT1 may each have a length equal to or greater than about 80% of a length in the second direction DR2 of the unit pattern UP. Each of the plurality of $2-1^{st}$ extension parts SLT2-1 may connect to each other two adjacent ones of the plurality of first extension parts SLT1. Each of the plurality of $2-2^{nd}$ extension parts SLT2-2 may connect to each other two adjacent ones of the plurality of first extension parts SLT1.

The plurality of $2-1^{st}$ extension parts SLT2-1 may extend from corresponding ends of the first extension part SLT1. The plurality of $2-2^{nd}$ extension parts SLT2-2 may extend from corresponding other ends of the first extension part SLT1 that stand opposite in the second direction DR2 to the ends of the first extension part SLT1. When the $2-1^{st}$ extension part SLT2-1 is disposed between one end of an $n^{th}$ one (where, n is a positive integer) of the plurality of first extension parts SLT1 and one end of an $(n+1)$th one of the plurality of first extension parts SLT1, the $2-2^{nd}$ extension part SLT2-2 may be disposed between another end of the $(n+1)^{th}$ one of the plurality of first extension parts SLT1 and another end of an $(n+2)^{th}$ one of the plurality of first extension parts SLT1.

The slit SLT depicted in FIG. 24 may be defined in the unit pattern UP. In contrast, an end of the slit SLT depicted in FIG. 25 may be connected to an outside of the unit pattern UP. A dummy part SLT-D (or a dummy slit) may be defined to denote a part that connects the first extension part SLT1 to the outside of the unit pattern UP.

Referring to FIG. 24, the $2-2^{nd}$ extension part SLT2-2 may suppress the creation of a large-loop eddy current such as an imaginary eddy current EDC-I. This may be caused by the fact that the $2-2^{nd}$ extension part SLT2-2 breaks the imaginary eddy current EDC-I. Referring to FIG. 25, the $2-2^{nd}$ extension part SLT2-2 may suppress the creation of a large-loop eddy current such as an imaginary eddy current EDC-I. For example, a leftmost dummy part SLT-D may break the imaginary eddy current EDC-I depicted on outer region. In an embodiment of the present invention, the dummy part SLT-D may be disposed on a rightmost position.

In an embodiment of the present invention, the first unit pattern UP1 and the second unit pattern UP2 discussed with reference to FIG. 21A may be obtained by allowing the unit pattern UP of FIG. 24 to further include a first dummy part (or a first dummy slit) that connects a first one (or a leftmost one) of the plurality of first extension parts SLT1 to an outside of the unit pattern UP and to also further include a second dummy part (or a second dummy slit) that connects a last one (or a rightmost one) of the plurality of first extension parts SLT1 to an outside of the unit pattern UP.

Figure 26:
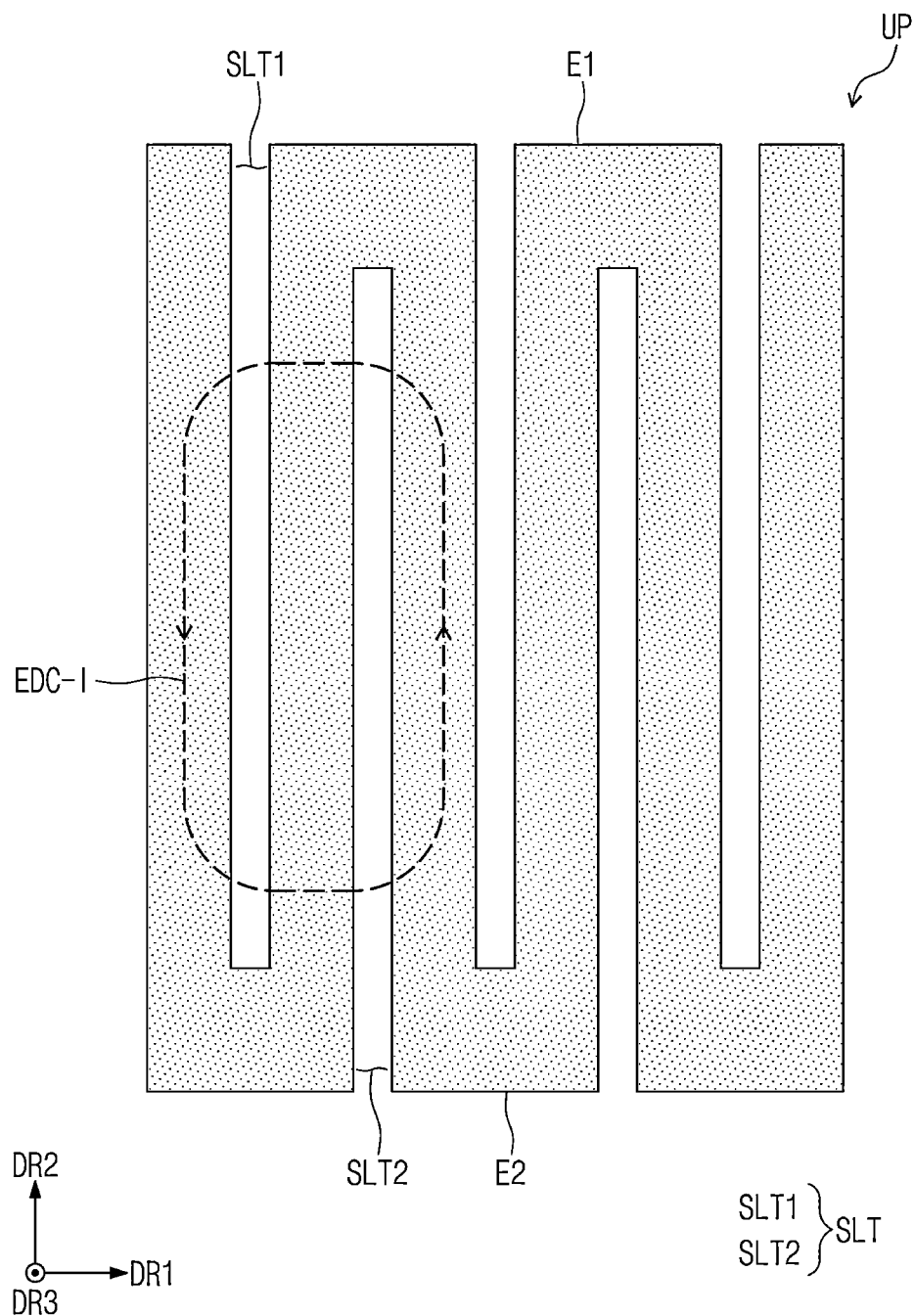

Referring to FIG. 26, a plurality of slits SLT may be defined in the unit pattern UP. The slits SLT may extend in the second direction DR2. The slits SLT may include first slits SLT1 that extend in the second direction DR2 from a first edge E1 of the unit pattern UP. The slits SLT may include second slits SLT2 that extend in the second direction DR2 from a second edge E2 of the unit pattern UP. The first edge E1 may face in the second direction DR2 toward the second edge E2.

The first slits SLT1 and the second slits SLT2 may each be connected to an outside of the unit pattern UP. Three first slits SLT1 and two second slits SLT2 are depicted by way of example. The first slits SLT1 and the second slits SLT2 may be disposed alternately with each other along the first direction DR1.

Figure 27:
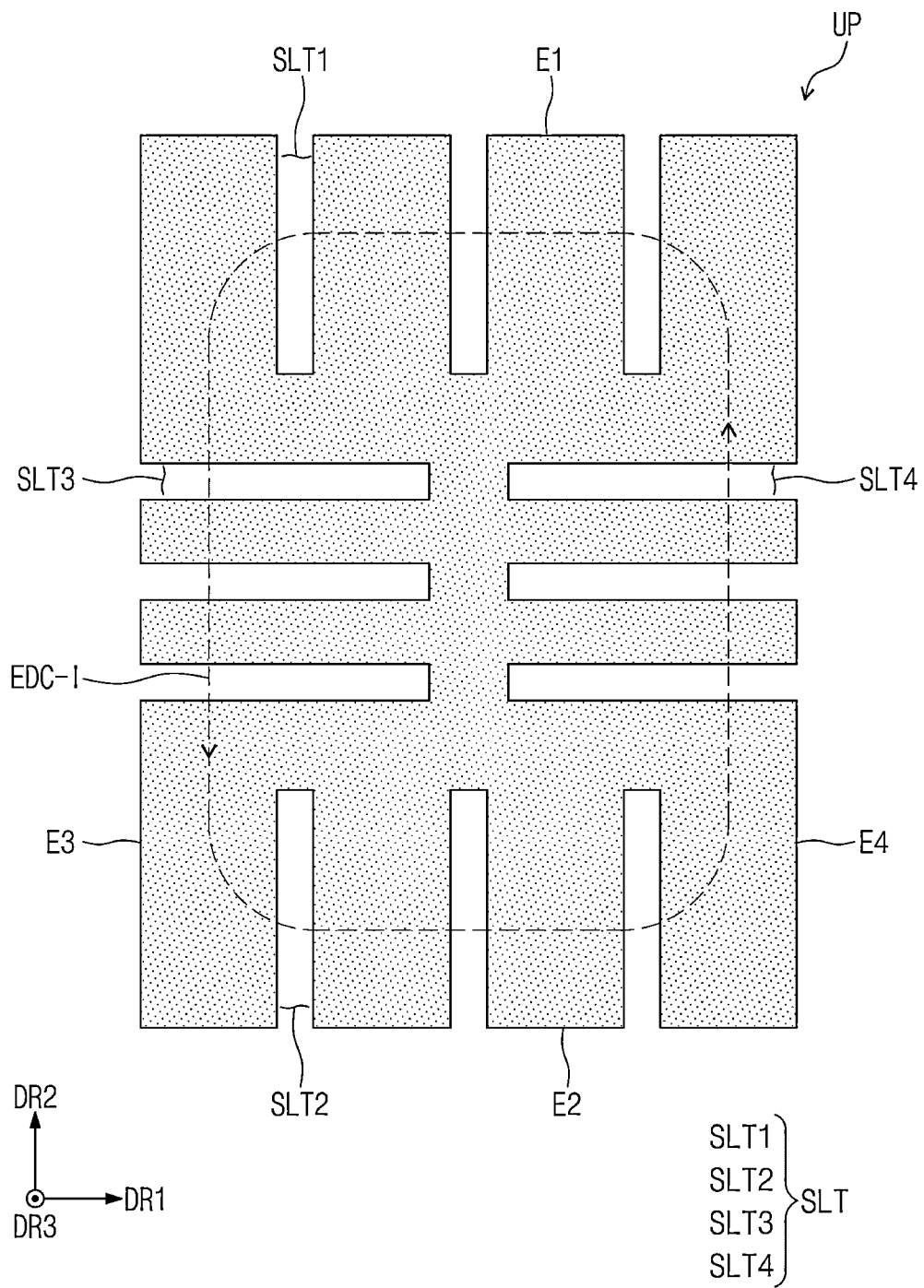

Referring to FIG. 27, the slits SLT may further include third slits SLT3 and fourth slits SLT4 each of which extends in the first direction DR1. The slits SLT may further include one or more of third slits SLT3 and fourth slits SLT4. The third slits SLT3 and the fourth slits SLT4 may each be connected to an outside of the unit pattern UP. The third slits SLT3 may extend in the first direction DR1 from a third edge E3. The fourth slits SLT4 may extend in the first direction DR1 from a fourth edge E4. The third edge E3 may face in the first direction DR1 toward the fourth edge E4.

The slit SLT depicted in FIGS. 26 and 27 may suppress the creation of a large-loop eddy current such as an imaginary eddy current EDC-I. This may be caused by the fact that the slit SLT breaks the imaginary eddy current EDC-I.

Figure 28:
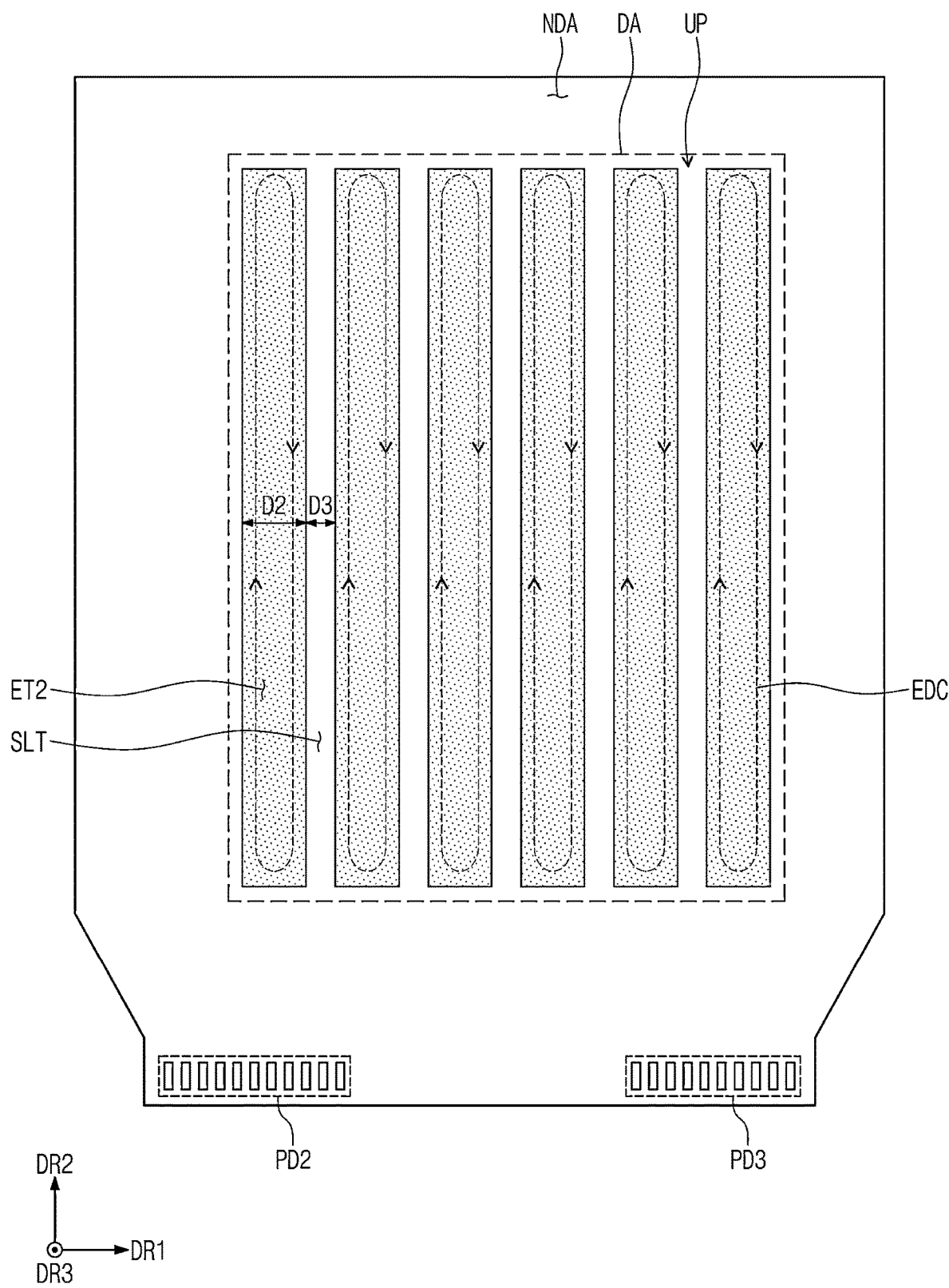
FIG. 28 is a plan view showing a unit pattern according to an embodiment of the present invention.

FIG. 28 is a plan view showing a unit pattern UP according to an embodiment of the present invention. In the embodiments that follow, the description of FIGS. 15A and 15B will be true of components the same as those discussed with reference to FIGS. 15A and 15B.

The first extension part ET10 may be omitted from the unit pattern UP of FIG. 28, compared to the unit pattern UP of FIGS. 15A and 15B. A length in the second direction DR2 of each of the plurality of second extension parts ET2 may be the same as or greater than a length in the second direction DR2 of the display region DA. The slit SLT may be disposed between every two adjacent ones of the plurality of second extension parts ET2.

According to an embodiment of the present invention, the unit pattern UP may include a plurality of extension parts that extend in the first direction DR1 or in an oblique direction. The slit SLT may be disposed between every two adjacent ones of the plurality of extension parts.

According to an embodiment of the present invention, a conductive layer may shield electromagnetic waves that affect a display panel. Therefore, it may be possible to prevent or decrease a reduction in display quality due to external noise.

The conductive layer may outwardly radiate heat generated from the display panel or generated from a driving circuit connected to the display panel. Hence, it may be possible to suppress thermal damage to the display panel or the driving circuit.

A slit may be formed in the conductive layer, and this may reduce an eddy current produced during an operating period of an input sensor driven by electromagnetic induction. Accordingly, it may be possible to mitigate a reduction in magnetic flux that is output from the input sensor during a charging period and to increase charging efficiency of stylus pens.

Although embodiments of the present disclosure have been described with reference to a number of illustrative examples thereof, it will be understood by those of ordinary skill in the art that various changes in form and details may be made without departing from the spirit and scope of the present invention.

Thus, the technical scope of the present invention is not necessarily limited by the embodiments and examples described above.

What is claimed is:

1. A display device, comprising:
a display panel including a display region on which a pixel is disposed and a non-display region at least partially surrounding the display region;
an input sensor disposed on the display panel and configured to detect an electromagnetically induced current; and
a conductive layer disposed below the display panel and at least partially overlapping the display region,
wherein the conductive layer includes a first unit pattern, and
wherein the first unit pattern includes:
a first extension part extending in a first direction; and
a plurality of second extension parts that extend from the first extension part in a second direction intersecting the first direction, the plurality of second extension parts being disposed on one side of the first extension part,
wherein the input sensor includes:
a first electrode;
a second electrode that extends in a direction intersecting the first electrode and is capacitively coupled to the first electrode;
a third electrode that detects the electromagnetically induced current;
a fourth electrode that extends a direction intersecting the third electrode and detects the electromagnetically induced current;
a first signal line connected to a first end of the first electrode;
a second signal line connected to a first end of the second electrode;
a 1-1st signal line connected to a first end of the third electrode and overlapped with the non-display region;
a 1-2nd signal line of connected to a second end of the third electrode and overlapped with the non-display region; and
a third signal line connected to a first end of the fourth electrode,
wherein a first signal is applied to the 1-1st signal line when a second signal is applied to the 1-2nd signal line at a first time,
wherein the first signal is different from the second signal, and
wherein the first end of the third electrode and the second end of the third electrode are positioned oppositely in a direction in which the third electrode extends.

2. The display device of claim 1, wherein a width of each of two adjacent second extension parts, of the plurality of second extension parts, is greater than a spacing between the two adjacent second extension parts.

3. The display device of claim 2, wherein:
the width of each of the two adjacent second extension parts is equal to or less than about 8 mm, and
the spacing between the two adjacent second extension parts is equal to or less than about 1 mm.

4. The display device of claim 1, wherein
the conductive layer includes a plurality of first unit patterns, and
the plurality of first unit patterns are spaced apart from each other.

5. The display device of claim 1, wherein the conductive layer further includes a second unit pattern, and
wherein the second unit pattern has a shape obtained by rotating a shape of the first unit pattern.

6. The display device of claim 1, wherein
the first extension part is closer to the first end of the third electrode than to the second end of the third electrode.

7. The display device of claim 6, wherein the first extension part at least partially overlaps the first end of the third electrode.

8. The display device of claim 1, wherein the first electrode includes:
a $1\text{-}1^{st}$ extension part that extends in the direction in which the third electrode extends;
a $1\text{-}2^{nd}$ extension part that extends in the direction in which the third electrode extends and is spaced apart in the direction intersecting the third electrode from the $1\text{-}1^{st}$ extension part; and
a first intermediate part disposed between one end of the $1\text{-}1^{st}$ extension part and one end of the $1\text{-}2^{nd}$ extension part,
wherein the third electrode is disposed between the $1\text{-}1^{st}$ extension part and the $1\text{-}2^{nd}$ extension part.

9. The display device of claim 1, wherein the second electrode includes:
a $2\text{-}1^{st}$ extension part that extends in the direction intersecting the third electrode;
a $2\text{-}2^{nd}$ extension part that extends in the intersecting the third electrode direction and is spaced apart in the direction in which the third electrode extends from the $2\text{-}1^{st}$ extension part; and
a second intermediate part disposed between one end of the $2\text{-}1^{st}$ extension part and one end of the $2\text{-}2^{nd}$ extension part,
wherein the fourth electrode is disposed between the $2\text{-}1^{st}$ extension part and the $2\text{-}2^{nd}$ extension part.

10. The display device of claim 1, wherein the first unit pattern further includes a plurality of third extension parts that each extend from the first extension part and are disposed on another side of the first extension part.

11. The display device of claim 1,
wherein the conductive layer further includes a second unit pattern,
wherein the second unit pattern includes:
  a first extension part; and
  a plurality of second extension parts that each extend from the first extension part of the second unit pattern in a direction intersecting a direction of the first extension part of the second unit pattern and are disposed on one side of the first extension part of the second unit pattern,
wherein each of the plurality of second extension parts of the second unit pattern is disposed between two adjacent ones of the plurality of second extension parts of the first unit pattern.

12. The display device of claim 1, further comprising a ferrite layer disposed between the display panel and the conductive layer.

13. The display device of claim 1, further comprising a cushion layer disposed between the display panel and the conductive layer.

14. The display device of claim 1, further comprising:
  a sub-conductive layer disposed below the conductive layer; and
  a ferrite layer and/or an insulating layer disposed between the conductive layer and the sub-conductive layer.

15. The display device of claim 14,
wherein the sub-conductive layer includes a second unit pattern,
wherein the second unit pattern includes:
  a first extension part; and
  a plurality of second extension parts that each extend from the first extension part of the second unit pattern in a direction intersecting that of the first extension part of the second unit pattern and are disposed on one side of the first extension part of the second unit pattern,
wherein each of the plurality of second extension parts of the second unit pattern is disposed between two adjacent ones of the plurality of second extension parts of the first unit pattern.

16. The display device of claim 15, wherein the first unit pattern and the second unit pattern are electrically connected to each other.

17. A display device, comprising:
  a display panel including a display region on which a pixel is disposed and a non-display region at least partially surrounding the display region;
  an input sensor disposed on the display panel and configured to detect an electromagnetically induced current; and
  a conductive layer disposed below the display panel and at least partially overlapping the display region,
  wherein the conductive layer includes a unit pattern,
  wherein the unit pattern includes:
    a plurality of first slits each of which extends in a first direction and spaced apart from each other in a second direction intersecting the first direction; and
    a plurality of second slits that connect to adjacent ones of the plurality of first slits,
  wherein the input sensor includes:
    a first electrode;
    a second electrode that extends in a direction intersecting the first electrode and is capacitively coupled to the first electrode;
    a third electrode that detects the electromagnetically induced current;
    a fourth electrode that extends a direction intersecting the third electrode and detects the electromagnetically induced current;
    a first signal line connected to a first end of the first electrode;
    a second signal line connected to a first end of the second electrode;
    a 1-1st signal line connected to a first end of the third electrode and overlapped with the non-display region;
    a 1-2nd signal line of connected to a second end of the third electrode and overlapped with the non-display region; and
    a third signal line connected to a first end of the fourth electrode,
  wherein a first signal is applied to the 1-1st signal line when a second signal is applied to the 1-2nd signal line at a first time,
  wherein the first signal is different from the second signal, and
  wherein the first end of the third electrode and the second end of the third electrode are positioned oppositely in a direction in which the third electrode extends.

18. The display device of claim 17, wherein the plurality of first slits and the plurality of second slits define one continuous slit.

19. The display device of claim 17, wherein the plurality of second slits include a 2-$1^{st}$ slit and a 2-$2^{nd}$ slit,
wherein the 2-$1^{st}$ slit connects one end of an $n^{th}$ one of the plurality of first slits to one end of an $(n+1)^{th}$ one of the plurality of first slits, where n is a positive integer, and
wherein the 2-$2^{nd}$ slit connects another end of the $(n+1)^{th}$ one of the plurality of first slits to another end of an $(n+2)^{th}$ one of the plurality of first slits.

20. The display device of claim 17, wherein the unit pattern further includes a dummy slit that connects an outside of the unit pattern to a first or last one of the plurality of first slits.

21. The display device of claim 17, wherein the unit pattern further includes:
  a first dummy slit that connects an outside of the unit pattern to a first one of the plurality of first slits; and
  a second dummy slit that connects the outside of the unit pattern to a last one of the plurality of first slits.

22. The display device of claim 17, wherein a length in the first direction of the plurality of first slits is equal to or greater than about 80% of a length in the first direction of the unit pattern.

23. A display device, comprising:
  a display panel including a display region on which a pixel is disposed and a non-display region at least partially surrounding the display region;
  an input sensor disposed on the display panel and configured to detect an electromagnetically induced current; and
  a conductive layer disposed below the display panel and at least partially overlapping the display region,
  wherein the conductive layer includes a unit pattern,
  wherein the unit pattern includes a plurality of first slits,
  wherein a length, in a first direction of the plurality of first slits, is equal to or greater than about 80% of a length, in the first direction, of the unit pattern, and
  wherein the plurality of first slits are connected to an outside of the unit pattern, wherein the input sensor includes:

a first electrode;

a second electrode that extends in a direction intersecting the first electrode and is capacitively coupled to the first electrode;

a third electrode that detects the electromagnetically induced current;

a fourth electrode that extends a direction intersecting the third electrode and detects the electromagnetically induced current;

a first signal line connected to a first end of the first electrode;

a second signal line connected to a first end of the second electrode;

a 1-1st signal line connected to a first end of the third electrode and overlapped with the non-display region;

a 1-2nd signal line of connected to a second end of the third electrode and overlapped with the non-display region; and a third signal line connected to a first end of the fourth electrode, wherein a first signal is applied to the 1-1st signal line when a second signal is applied to the 1-2nd signal line at a first time, wherein the first signal is different from the second signal, and wherein the first end of the third electrode and the second end of the third electrode are positioned oppositely in a direction in which the third electrode extends.

24. The display device of claim 23, wherein:

the plurality of first slits extend from a first edge of the unit pattern toward the inside of the unit pattern, and the unit pattern further includes a plurality of second slits that extend from a second edge of the unit pattern toward the inside of the unit pattern, wherein the second edge faces in the first direction toward the first edge.

25. The display device of claim 24, wherein the plurality of first slits and the plurality of second slits are disposed alternately in a second direction intersecting the first direction.

26. The display device of claim 23, wherein the unit pattern further includes at least one second slit that extends in a second direction intersecting the first direction.

27. The display device of claim 26, wherein the at least one second slit is connected to at least one of the plurality of first slits.

28. An electronic apparatus, comprising:

a housing;

an electronic module disposed in the housing;

a display device at least partially overlapping the electronic module; and a stylus pen that includes a resonance circuit, wherein the display device includes:

a display panel that includes a display region on which a pixel is disposed and a non-display region at least partially surrounding the display region;

an input sensor disposed on the display panel and configured to detect a resonance signal that is output from the stylus pen; and a conductive layer disposed below the display panel and at least partially overlapping the display region, wherein the conductive layer includes a first unit pattern, wherein the first unit pattern includes:

a first extension part; and a plurality of second extension parts that each extend from the first extension part in a direction intersecting that of the first extension part and are disposed on one side of the first extension part, wherein the input sensor includes:

a first electrode;

a second electrode that extends in a direction intersecting the first electrode and is capacitively coupled to the first electrode;

a third electrode that detects an electromagnetically induced current;

a fourth electrode that extends a direction intersecting the third electrode and detects the electromagnetically induced current;

a first signal line connected to a first end of the first electrode;

a second signal line connected to a first end of the second electrode;

a 1-1st signal line connected to a first end of the third electrode and overlapped with the non-display region;

a 1-2nd signal line of connected to a second end of the third electrode and overlapped with the non-display region; and a third signal line connected to a first end of the fourth electrode, wherein a first signal is applied to the 1-1st signal line when a second signal is applied to the 1-2nd signal line at a first time, wherein the first signal is different from the second signal, and wherein the first end of the third electrode and the second end of the third electrode are positioned oppositely in a direction in which the third electrode extends.

* * * * *